US008870711B2

(12) United States Patent
Pohl et al.

(10) Patent No.: US 8,870,711 B2
(45) Date of Patent: *Oct. 28, 2014

(54) CONTINUOUSLY VARIABLE TRANSMISSION

(71) Applicant: Fallbrook Intellectual Property Company LLC, Ceder Park, TX (US)

(72) Inventors: Brad P. Pohl, Leander, TX (US); Fernand A. Thomassy, Liberty Hill, TX (US); Charles B. Lohr, Austin, TX (US); Scott T. McBroom, Round Rock, TX (US)

(73) Assignee: Fallbrook Intellectual Property Company LLC, Cedar Park, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/953,533

(22) Filed: Jul. 29, 2013

(65) Prior Publication Data
US 2013/0310214 A1    Nov. 21, 2013

Related U.S. Application Data

(60) Division of application No. 13/426,269, filed on Mar. 21, 2012, now Pat. No. 8,496,554, which is a continuation of application No. 12/251,325, filed on Oct. 14, 2008, now Pat. No. 8,167,759.

(51) Int. Cl.
*F16H 15/48* (2006.01)
*F16H 15/26* (2006.01)
*B60K 17/28* (2006.01)

(52) U.S. Cl.
USPC ............... 477/37; 475/189; 476/38; 180/53.8

(58) Field of Classification Search
USPC ............ 477/37; 475/183, 185, 189, 190, 192, 475/196, 197; 476/38; 180/53.1, 53.8
See application file for complete search history.

(56) References Cited

U.S. PATENT DOCUMENTS

| 719,595 A | 2/1903 | Huss |
| 1,121,210 A | 12/1914 | Techel |

(Continued)

FOREIGN PATENT DOCUMENTS

| CH | 118064 | 12/1926 |
| CN | 1054340 | 9/1991 |

(Continued)

OTHER PUBLICATIONS

International Search Report and Written Opinion dated Jul. 27, 2009 for PCT Application No. PCT/US2008/079879.

(Continued)

*Primary Examiner* — Roger Pang
(74) *Attorney, Agent, or Firm* — Knobbe Martens Olson & Bear LLP

(57) ABSTRACT

Inventive embodiments are directed to components, subassemblies, systems, and/or methods for continuously variable accessory drives (CVAD). In one embodiment, a skew-based control system is adapted to facilitate a change in the ratio of a CVAD. In another embodiment, a skew-based control system includes a skew actuator coupled to a carrier member. In some embodiments, the skew actuator is configured to rotate a carrier member of a CVT. Various inventive traction planet assemblies can be used to facilitate shifting the ratio of a CVT. In some embodiments, the traction planet assemblies include legs configured to cooperate with the carrier members. In some embodiments, a traction planet assembly is operably coupled to the carrier members. Embodiments of a shift cam and traction sun are adapted to cooperate with other components of the CVT to support operation and/or functionality of the CVT. Among other things, shift control interfaces for a CVT are disclosed.

14 Claims, 43 Drawing Sheets

(56) References Cited

U.S. PATENT DOCUMENTS

| | | |
|---|---|---|
| 1,175,677 A | 3/1916 | Barnes |
| 1,207,985 A | 12/1916 | Null et al. |
| 1,380,006 A | 5/1921 | Nielson |
| 1,390,971 A | 9/1921 | Sarnain |
| 1,558,222 A | 10/1925 | Beetow |
| 1,629,902 A | 5/1927 | Arter et al. |
| 1,686,446 A | 10/1928 | Gilman |
| 1,774,254 A | 8/1930 | Daukus |
| 1,793,571 A | 2/1931 | Vaughn |
| 1,847,027 A | 2/1932 | Thomsen et al. |
| 1,850,189 A | 3/1932 | Weiss |
| 1,858,696 A | 5/1932 | Weiss |
| 1,865,102 A | 6/1932 | Hayes |
| 1,903,228 A | 3/1933 | Thomson |
| 1,978,439 A | 10/1934 | Sharpe |
| 2,030,203 A | 2/1936 | Gove et al. |
| 2,060,884 A | 11/1936 | Madle |
| 2,086,491 A | 7/1937 | Dodge |
| 2,100,629 A | 11/1937 | Chilton |
| 2,109,845 A | 3/1938 | Madle |
| 2,112,763 A | 3/1938 | Cloudsley |
| 2,134,225 A | 10/1938 | Christiansen |
| 2,152,796 A | 4/1939 | Erban |
| 2,196,064 A | 4/1940 | Erban |
| 2,209,254 A | 7/1940 | Ahnger |
| 2,259,933 A | 10/1941 | Holloway |
| 2,269,434 A | 1/1942 | Brooks |
| 2,325,502 A | 7/1943 | Georges |
| RE22,761 E | 5/1946 | Wemp |
| 2,461,258 A | 2/1949 | Brooks |
| 2,469,653 A | 5/1949 | Kopp |
| 2,480,968 A | 9/1949 | Ronai |
| 2,596,538 A | 5/1952 | Dicke |
| 2,597,849 A | 5/1952 | Alfredeen |
| 2,675,713 A | 4/1954 | Acker |
| 2,730,904 A | 1/1956 | Rennerfelt |
| 2,748,614 A | 6/1956 | Weisel |
| 2,868,038 A | 1/1959 | Billeter |
| 2,959,070 A | 1/1959 | Flinn |
| 2,873,911 A | 2/1959 | Perrine |
| 2,874,592 A | 2/1959 | Oehrli |
| 2,883,883 A | 4/1959 | Chillson |
| 2,891,213 A | 6/1959 | Kern |
| 2,913,932 A | 11/1959 | Oehru |
| 2,931,234 A | 4/1960 | Hayward |
| 2,931,235 A | 4/1960 | Hayward |
| 3,204,476 A | 4/1960 | Rouverol |
| 2,949,800 A | 8/1960 | Neuschotz |
| 2,959,063 A | 11/1960 | Perry |
| 2,959,972 A | 11/1960 | Madson |
| 2,964,959 A | 12/1960 | Beck |
| 3,008,061 A | 11/1961 | Mims et al. |
| 3,048,056 A | 8/1962 | Wolfram |
| 3,051,020 A | 8/1962 | Hartupee |
| 3,086,704 A | 4/1963 | Hurtt |
| 3,087,348 A | 4/1963 | Kraus |
| 3,154,957 A | 11/1964 | Kashihara |
| 3,163,050 A | 12/1964 | Kraus |
| 3,176,542 A | 4/1965 | Monch |
| 3,184,983 A | 5/1965 | Kraus |
| 3,209,606 A | 10/1965 | Yamamoto |
| 3,211,364 A | 10/1965 | Wentling et al. |
| 3,216,283 A | 11/1965 | General |
| 3,246,531 A | 4/1966 | Kashihara |
| 3,248,960 A | 5/1966 | Schottler |
| 3,273,468 A | 9/1966 | Allen |
| 3,280,646 A | 10/1966 | Lemieux |
| 3,292,443 A | 12/1966 | Felix |
| 3,340,895 A | 9/1967 | Osgood, Jr. et al. |
| 3,407,687 A | 10/1968 | Hayashi |
| 3,440,895 A | 4/1969 | Fellows |
| 3,464,281 A | 9/1969 | Azuma et al. |
| 3,477,315 A | 11/1969 | Macks |
| 3,487,726 A | 1/1970 | Burnett |
| 3,487,727 A | 1/1970 | Gustafsson |
| 3,574,289 A | 4/1971 | Scheiter et al. |
| 3,661,404 A | 5/1972 | Bossaer |
| 3,695,120 A | 10/1972 | Titt |
| 3,707,888 A | 1/1973 | Schottler |
| 3,727,473 A | 4/1973 | Bayer |
| 3,727,474 A | 4/1973 | Fullerton |
| 3,736,803 A | 6/1973 | Horowitz et al. |
| 3,768,715 A | 10/1973 | Tout |
| 3,800,607 A | 4/1974 | Zurcher |
| 3,802,284 A | 4/1974 | Sharpe et al. |
| 3,810,398 A | 5/1974 | Kraus |
| 3,820,416 A | 6/1974 | Kraus |
| 3,866,985 A | 2/1975 | Whitehurst |
| 3,891,235 A | 6/1975 | Shelly |
| 3,934,493 A | 1/1976 | Hillyer |
| 3,954,282 A | 5/1976 | Hege |
| 3,987,681 A | 10/1976 | Keithley et al. |
| 3,996,807 A | 12/1976 | Adams |
| 4,098,146 A | 7/1978 | McLarty |
| 4,103,514 A | 8/1978 | Grosse-Entrup |
| 4,159,653 A | 7/1979 | Koivunen |
| 4,169,609 A | 10/1979 | Zampedro |
| 4,177,683 A | 12/1979 | Moses |
| 4,227,712 A | 10/1980 | Dick |
| 4,314,485 A | 2/1982 | Adams |
| 4,345,486 A | 8/1982 | Olesen |
| 4,369,667 A | 1/1983 | Kemper |
| 4,382,188 A | 5/1983 | Cronin |
| 4,391,156 A | 7/1983 | Tibbals |
| 4,459,873 A | 7/1984 | Black |
| 4,464,952 A | 8/1984 | Stubbs |
| 4,468,984 A | 9/1984 | Castelli et al. |
| 4,494,524 A | 1/1985 | Wagner |
| 4,496,051 A | 1/1985 | Ortner |
| 4,526,255 A | 7/1985 | Hennessey et al. |
| 4,546,673 A | 10/1985 | Shigematsu et al. |
| 4,560,369 A | 12/1985 | Hattori |
| 4,567,781 A | 2/1986 | Russ |
| 4,574,649 A | 3/1986 | Seol |
| 4,585,429 A | 4/1986 | Marier |
| 4,630,839 A | 12/1986 | Seol |
| 4,631,469 A | 12/1986 | Tsuboi et al. |
| 4,651,082 A | 3/1987 | Kaneyuki |
| 4,700,581 A | 10/1987 | Tibbals, Jr. |
| 4,713,976 A | 12/1987 | Wilkes |
| 4,717,368 A | 1/1988 | Yamaguchi et al. |
| 4,735,430 A | 4/1988 | Tomkinson |
| 4,738,164 A | 4/1988 | Kaneyuki |
| 4,744,261 A | 5/1988 | Jacobson |
| 4,756,211 A | 7/1988 | Fellows |
| 4,781,663 A | 11/1988 | Reswick |
| 4,838,122 A | 6/1989 | Takamiya et al. |
| 4,856,374 A | 8/1989 | Kreuzer |
| 4,869,130 A | 9/1989 | Wiecko |
| 4,881,925 A | 11/1989 | Hattori |
| 4,900,046 A | 2/1990 | Aranceta-Angoitia |
| 4,909,101 A | 3/1990 | Terry |
| 4,918,344 A | 4/1990 | Chikamori et al. |
| 4,964,312 A | 10/1990 | Kraus |
| 5,006,093 A | 4/1991 | Itoh et al. |
| 5,020,384 A | 6/1991 | Kraus |
| 5,033,322 A | 7/1991 | Nakano |
| 5,037,361 A | 8/1991 | Takahashi |
| 5,069,655 A | 12/1991 | Schievelbusch |
| 5,121,654 A | 6/1992 | Fasce |
| 5,125,677 A | 6/1992 | Ogilvie et al. |
| 5,138,894 A | 8/1992 | Kraus |
| 5,156,412 A | 10/1992 | Meguerditchian |
| 5,230,258 A | 7/1993 | Nakano |
| 5,236,211 A | 8/1993 | Meguerditchian |
| 5,236,403 A | 8/1993 | Schievelbusch |
| 5,267,920 A | 12/1993 | Hibi |
| 5,273,501 A | 12/1993 | Schievelbusch |
| 5,318,486 A | 6/1994 | Lutz |
| 5,319,486 A | 6/1994 | Vogel et al. |
| 5,330,396 A | 7/1994 | Lohr et al. |
| 5,355,749 A | 10/1994 | Obara et al. |
| 5,375,865 A | 12/1994 | Terry, Sr. |
| 5,379,661 A | 1/1995 | Nakano |

(56) References Cited

U.S. PATENT DOCUMENTS

| | | |
|---|---|---|
| 5,383,677 A | 1/1995 | Thomas |
| 5,387,000 A | 2/1995 | Sato |
| 5,401,221 A | 3/1995 | Fellows et al. |
| 5,451,070 A | 9/1995 | Lindsay et al. |
| 5,489,003 A | 2/1996 | Ohyama et al. |
| 5,508,574 A | 4/1996 | Vlock |
| 5,562,564 A | 10/1996 | Foline |
| 5,564,998 A | 10/1996 | Fellows |
| 5,601,301 A | 2/1997 | Liu |
| 5,607,373 A | 3/1997 | Ochiari et al. |
| 5,645,507 A | 7/1997 | Hathaway |
| 5,651,750 A | 7/1997 | Imanishi et al. |
| 5,664,636 A | 9/1997 | Ikuma et al. |
| 5,669,845 A * | 9/1997 | Muramoto et al. ........... 475/186 |
| 5,690,346 A | 11/1997 | Keskitalo |
| 5,722,502 A | 3/1998 | Kubo |
| 5,746,676 A | 5/1998 | Kawase et al. |
| 5,755,303 A | 5/1998 | Yamamoto et al. |
| 5,799,541 A | 9/1998 | Arbeiter |
| 5,823,052 A | 10/1998 | Nobumoto |
| 5,846,155 A | 12/1998 | Taniguchi et al. |
| 5,888,160 A | 3/1999 | Miyata et al. |
| 5,899,827 A | 5/1999 | Nakano et al. |
| 5,902,207 A | 5/1999 | Sugihara |
| 5,967,933 A | 10/1999 | Valdenaire |
| 5,984,826 A | 11/1999 | Nakano |
| 6,000,707 A | 12/1999 | Miller |
| 6,004,239 A | 12/1999 | Makino |
| 6,006,151 A | 12/1999 | Graf |
| 6,015,359 A | 1/2000 | Kunii |
| 6,019,701 A | 2/2000 | Mori et al. |
| 6,029,990 A | 2/2000 | Busby |
| 6,042,132 A | 3/2000 | Suenaga et al. |
| 6,045,477 A | 4/2000 | Schmidt |
| 6,045,481 A | 4/2000 | Kumagai |
| 6,053,833 A | 4/2000 | Masaki |
| 6,053,841 A | 4/2000 | Kolde et al. |
| 6,054,844 A | 4/2000 | Frank |
| 6,066,067 A | 5/2000 | Greenwood |
| 6,071,210 A | 6/2000 | Kato |
| 6,076,846 A | 6/2000 | Clardy |
| 6,079,726 A | 6/2000 | Busby |
| 6,095,940 A | 8/2000 | Ai et al. |
| 6,099,431 A | 8/2000 | Hoge et al. |
| 6,113,513 A | 9/2000 | Itoh et al. |
| 6,119,539 A | 9/2000 | Papanicolaou |
| 6,119,800 A | 9/2000 | McComber |
| 6,159,126 A | 12/2000 | Oshidari |
| 6,171,210 B1 | 1/2001 | Miyata et al. |
| 6,174,260 B1 | 1/2001 | Tsukada et al. |
| 6,186,922 B1 | 2/2001 | Bursal et al. |
| 6,217,473 B1 | 4/2001 | Ueda et al. |
| 6,241,636 B1 | 6/2001 | Miller |
| 6,243,638 B1 | 6/2001 | Abo et al. |
| 6,251,038 B1 | 6/2001 | Ishikawa et al. |
| 6,258,003 B1 | 7/2001 | Hirano et al. |
| 6,261,200 B1 | 7/2001 | Miyata et al. |
| 6,311,113 B1 | 10/2001 | Danz et al. |
| 6,312,358 B1 | 11/2001 | Goi et al. |
| 6,322,475 B2 | 11/2001 | Miller |
| 6,325,386 B1 | 12/2001 | Shoge |
| 6,358,178 B1 | 3/2002 | Wittkopp |
| 6,375,412 B1 | 4/2002 | Dial |
| 6,390,945 B1 | 5/2002 | Young |
| 6,390,946 B1 | 5/2002 | Hibi et al. |
| 6,406,399 B1 | 6/2002 | Ai |
| 6,414,401 B1 | 7/2002 | Kuroda et al. |
| 6,419,608 B1 | 7/2002 | Miller |
| 6,425,838 B1 | 7/2002 | Matsubara et al. |
| 6,434,960 B1 | 8/2002 | Rousseau |
| 6,461,268 B1 | 10/2002 | Milner |
| 6,482,094 B2 | 11/2002 | Kefes |
| 6,492,785 B1 | 12/2002 | Kasten et al. |
| 6,494,805 B2 | 12/2002 | Ooyama et al. |
| 6,499,373 B2 | 12/2002 | Van Cor |
| 6,514,175 B2 | 2/2003 | Taniguchi et al. |
| 6,532,890 B2 | 3/2003 | Chen |
| 6,551,210 B2 | 4/2003 | Miller |
| 6,575,047 B2 | 6/2003 | Reik et al. |
| 6,659,901 B2 | 12/2003 | Sakai et al. |
| 6,672,418 B1 | 1/2004 | Makino |
| 6,676,559 B2 | 1/2004 | Miller |
| 6,679,109 B2 | 1/2004 | Gierling et al. |
| 6,682,432 B1 | 1/2004 | Shinozuka |
| 6,689,012 B2 | 2/2004 | Miller |
| 6,721,637 B2 | 4/2004 | Abe et al. |
| 6,723,016 B2 | 4/2004 | Sumi |
| 6,805,654 B2 | 10/2004 | Nishii |
| 6,839,617 B2 * | 1/2005 | Mensler et al. ................. 701/61 |
| 6,849,020 B2 | 2/2005 | Sumi |
| 6,859,709 B2 | 2/2005 | Joe et al. |
| 6,931,316 B2 | 8/2005 | Joe et al. |
| 6,932,739 B2 | 8/2005 | Miyata et al. |
| 6,942,593 B2 | 9/2005 | Nishii et al. |
| 6,945,903 B2 | 9/2005 | Miller |
| 6,949,049 B2 | 9/2005 | Miller |
| 6,958,029 B2 | 10/2005 | Inoue |
| 6,991,575 B2 | 1/2006 | Inoue |
| 6,991,579 B2 | 1/2006 | Kobayashi et al. |
| 7,011,600 B2 | 3/2006 | Miller et al. |
| 7,011,601 B2 | 3/2006 | Miller |
| 7,014,591 B2 | 3/2006 | Miller |
| 7,029,418 B2 | 4/2006 | Taketsuna et al. |
| 7,032,914 B2 | 4/2006 | Miller |
| 7,036,620 B2 | 5/2006 | Miller et al. |
| 7,044,884 B2 | 5/2006 | Miller |
| 7,063,640 B2 | 6/2006 | Miller |
| 7,074,007 B2 | 7/2006 | Miller |
| 7,074,154 B2 | 7/2006 | Miller |
| 7,074,155 B2 | 7/2006 | Miller |
| 7,077,777 B2 | 7/2006 | Miyata et al. |
| 7,086,979 B2 | 8/2006 | Frenken |
| 7,086,981 B2 | 8/2006 | Ali et al. |
| 7,094,171 B2 | 8/2006 | Inoue |
| 7,111,860 B1 | 9/2006 | Grimaldos |
| 7,112,158 B2 | 9/2006 | Miller |
| 7,112,159 B2 | 9/2006 | Miller et al. |
| 7,125,297 B2 | 10/2006 | Miller et al. |
| 7,131,930 B2 | 11/2006 | Miller et al. |
| 7,140,999 B2 | 11/2006 | Miller |
| 7,147,586 B2 | 12/2006 | Miller et al. |
| 7,153,233 B2 | 12/2006 | Miller et al. |
| 7,156,770 B2 | 1/2007 | Miller |
| 7,160,220 B2 | 1/2007 | Shinojima et al. |
| 7,160,222 B2 | 1/2007 | Miller |
| 7,163,485 B2 | 1/2007 | Miller |
| 7,163,486 B2 | 1/2007 | Miller et al. |
| 7,166,052 B2 | 1/2007 | Miller et al. |
| 7,166,056 B2 | 1/2007 | Miller et al. |
| 7,166,057 B2 | 1/2007 | Miller et al. |
| 7,166,058 B2 | 1/2007 | Miller et al. |
| 7,169,076 B2 | 1/2007 | Miller et al. |
| 7,172,529 B2 | 2/2007 | Miller et al. |
| 7,175,564 B2 | 2/2007 | Miller |
| 7,175,565 B2 | 2/2007 | Miller et al. |
| 7,175,566 B2 | 2/2007 | Miller et al. |
| 7,192,381 B2 | 3/2007 | Miller et al. |
| 7,197,915 B2 | 4/2007 | Luh et al. |
| 7,198,582 B2 | 4/2007 | Miller et al. |
| 7,198,583 B2 | 4/2007 | Miller et al. |
| 7,198,584 B2 | 4/2007 | Miller et al. |
| 7,198,585 B2 | 4/2007 | Miller et al. |
| 7,201,693 B2 | 4/2007 | Miller et al. |
| 7,201,694 B2 | 4/2007 | Miller et al. |
| 7,201,695 B2 | 4/2007 | Miller et al. |
| 7,204,777 B2 | 4/2007 | Miller et al. |
| 7,214,159 B2 | 5/2007 | Miller et al. |
| 7,217,215 B2 | 5/2007 | Miller et al. |
| 7,217,216 B2 | 5/2007 | Inoue |
| 7,217,219 B2 | 5/2007 | Miller |
| 7,217,220 B2 | 5/2007 | Careau et al. |
| 7,232,395 B2 | 6/2007 | Miller et al. |
| 7,234,873 B2 | 6/2007 | Kato et al. |
| 7,235,031 B2 | 6/2007 | Miller et al. |

(56) References Cited

U.S. PATENT DOCUMENTS

| | | | |
|---|---|---|---|
| 7,238,136 B2 | 7/2007 | Miller et al. |
| 7,238,137 B2 | 7/2007 | Miller et al. |
| 7,238,138 B2 | 7/2007 | Miller et al. |
| 7,238,139 B2 | 7/2007 | Roethler et al. |
| 7,246,672 B2 | 7/2007 | Shirai et al. |
| 7,250,018 B2 | 7/2007 | Miller et al. |
| 7,261,663 B2 | 8/2007 | Miller et al. |
| 7,275,610 B2 | 10/2007 | Kuang et al. |
| 7,285,068 B2 | 10/2007 | Hosoi |
| 7,288,042 B2 | 10/2007 | Miller et al. |
| 7,288,043 B2 | 10/2007 | Shiori et al. |
| 7,320,660 B2 | 1/2008 | Miller |
| 7,322,901 B2 | 1/2008 | Miller et al. |
| 7,343,236 B2 | 3/2008 | Wilson |
| 7,347,801 B2 | 3/2008 | Guenter et al. |
| 7,384,370 B2 | 6/2008 | Miller |
| 7,393,300 B2 | 7/2008 | Miller et al. |
| 7,393,302 B2 | 7/2008 | Miller |
| 7,393,303 B2 | 7/2008 | Miller |
| 7,395,731 B2 | 7/2008 | Miller et al. |
| 7,396,209 B2 | 7/2008 | Miller et al. |
| 7,402,122 B2 | 7/2008 | Miller |
| 7,410,443 B2 | 8/2008 | Miller |
| 7,419,451 B2 | 9/2008 | Miller |
| 7,422,541 B2 | 9/2008 | Miller |
| 7,422,546 B2 | 9/2008 | Miller et al. |
| 7,427,253 B2 | 9/2008 | Miller |
| 7,431,677 B2 | 10/2008 | Miller et al. |
| 7,452,297 B2 | 11/2008 | Miller et al. |
| 7,455,611 B2 | 11/2008 | Miller et al. |
| 7,455,617 B2 | 11/2008 | Miller et al. |
| 7,462,123 B2 | 12/2008 | Miller et al. |
| 7,462,127 B2 | 12/2008 | Miller et al. |
| 7,470,210 B2 | 12/2008 | Miller et al. |
| 7,481,736 B2 | 1/2009 | Miller et al. |
| 7,510,499 B2 | 3/2009 | Miller et al. |
| 7,540,818 B2 | 6/2009 | Miller et al. |
| 7,547,264 B2 | 6/2009 | Usoro |
| 7,574,935 B2 | 8/2009 | Rohs et al. |
| 7,591,755 B2 | 9/2009 | Petriz et al. |
| 7,632,203 B2 | 12/2009 | Miller |
| 7,651,437 B2 | 1/2010 | Miller et al. |
| 7,654,928 B2 | 2/2010 | Miller et al. |
| 7,670,243 B2 | 3/2010 | Miller |
| 7,686,729 B2 | 3/2010 | Miller et al. |
| 7,727,101 B2 | 6/2010 | Miller |
| 7,727,107 B2 | 6/2010 | Miller |
| 7,727,108 B2 | 6/2010 | Miller et al. |
| 7,727,110 B2 | 6/2010 | Miller et al. |
| 7,727,115 B2 | 6/2010 | Serkh |
| 7,731,615 B2 | 6/2010 | Miller et al. |
| 7,762,919 B2 | 7/2010 | Smithson et al. |
| 7,762,920 B2 | 7/2010 | Smithson et al. |
| 7,785,228 B2 | 8/2010 | Smithson et al. |
| 7,828,685 B2 | 11/2010 | Miller |
| 7,837,592 B2 | 11/2010 | Miller |
| 7,871,353 B2 | 1/2011 | Nichols et al. |
| 7,882,762 B2 | 2/2011 | Armstrong et al. |
| 7,883,442 B2 | 2/2011 | Miller et al. |
| 7,885,747 B2 | 2/2011 | Miller et al. |
| 7,887,032 B2 | 2/2011 | Malone |
| 7,909,727 B2 | 3/2011 | Smithson et al. |
| 7,914,029 B2 | 3/2011 | Miller et al. |
| 7,959,533 B2 | 6/2011 | Nichols et al. |
| 7,963,880 B2 | 6/2011 | Smithson et al. |
| 7,967,719 B2 | 6/2011 | Smithson et al. |
| 7,976,426 B2 | 7/2011 | Smithson et al. |
| 8,066,613 B2 | 11/2011 | Smithson et al. |
| 8,066,614 B2 | 11/2011 | Miller et al. |
| 8,070,635 B2 | 12/2011 | Miller |
| 8,087,482 B2 | 1/2012 | Miles et al. |
| 8,123,653 B2 | 2/2012 | Smithson et al. |
| 8,133,149 B2 | 3/2012 | Smithson et al. |
| 8,142,323 B2 | 3/2012 | Tsuchiya et al. |
| 8,167,759 B2 | 5/2012 | Pohl et al. |
| 8,171,636 B2 | 5/2012 | Smithson et al. |
| 8,262,536 B2 | 9/2012 | Nichols et al. |
| 8,267,829 B2 | 9/2012 | Miller et al. |
| 8,313,404 B2 | 11/2012 | Carter et al. |
| 8,313,405 B2 | 11/2012 | Bazyn et al. |
| 8,317,650 B2 | 11/2012 | Nichols et al. |
| 8,317,651 B2 | 11/2012 | Lohr |
| 8,321,097 B2 | 11/2012 | Vasiliotis et al. |
| 8,342,999 B2 | 1/2013 | Miller |
| 8,360,917 B2 | 1/2013 | Nichols et al. |
| 8,376,903 B2 | 2/2013 | Pohl et al. |
| 8,382,637 B2 | 2/2013 | Tange |
| 8,393,989 B2 | 3/2013 | Pohl |
| 8,398,518 B2 | 3/2013 | Nichols et al. |
| 8,469,853 B2 | 6/2013 | Miller et al. |
| 8,480,529 B2 | 7/2013 | Pohl et al. |
| 8,496,554 B2 | 7/2013 | Pohl et al. |
| 8,506,452 B2 | 8/2013 | Pohl et al. |
| 8,512,195 B2 * | 8/2013 | Lohr et al. ............... 475/189 |
| 8,535,199 B2 | 9/2013 | Lohr et al. |
| 8,550,949 B2 | 10/2013 | Miller |
| 8,585,528 B2 | 11/2013 | Carter et al. |
| 8,628,443 B2 | 1/2014 | Miller et al. |
| 8,641,572 B2 | 2/2014 | Nichols et al. |
| 8,641,577 B2 | 2/2014 | Nichols et al. |
| 8,721,485 B2 | 5/2014 | Lohr et al. |
| 8,738,255 B2 | 5/2014 | Carter et al. |
| 2001/0008192 A1 | 7/2001 | Morisawa |
| 2001/0041644 A1 | 11/2001 | Yasuoka et al. |
| 2001/0044361 A1 | 11/2001 | Taniguchi et al. |
| 2002/0019285 A1 | 2/2002 | Henzler |
| 2002/0028722 A1 | 3/2002 | Sakai et al. |
| 2002/0045511 A1 | 4/2002 | Geiberger et al. |
| 2002/0169051 A1 | 11/2002 | Oshidari |
| 2003/0015358 A1 | 1/2003 | Abe et al. |
| 2003/0015874 A1 | 1/2003 | Abe et al. |
| 2003/0022753 A1 | 1/2003 | Mizuno et al. |
| 2003/0036456 A1 | 2/2003 | Skrabs |
| 2003/0132051 A1 | 7/2003 | Nishii et al. |
| 2003/0216216 A1 | 11/2003 | Inoue et al. |
| 2003/0221892 A1 | 12/2003 | Matsumoto et al. |
| 2004/0058772 A1 | 3/2004 | Inoue et al. |
| 2004/0082421 A1 | 4/2004 | Wafzig |
| 2004/0119345 A1 | 6/2004 | Takano |
| 2004/0171457 A1 * | 9/2004 | Fuller ................... 477/37 |
| 2004/0204283 A1 | 10/2004 | Inoue |
| 2004/0231331 A1 | 11/2004 | Iwanami et al. |
| 2004/0254047 A1 | 12/2004 | Frank et al. |
| 2005/0037876 A1 | 2/2005 | Unno et al. |
| 2005/0227809 A1 | 10/2005 | Bitzer et al. |
| 2006/0052204 A1 | 3/2006 | Eckert et al. |
| 2006/0084549 A1 | 4/2006 | Smithson et al. |
| 2006/0108956 A1 | 5/2006 | Clark |
| 2006/0111212 A9 | 5/2006 | Ai et al. |
| 2006/0180363 A1 | 8/2006 | Uchisasai |
| 2006/0223667 A1 | 10/2006 | Nakazeki |
| 2006/0234822 A1 | 10/2006 | Morscheck et al. |
| 2006/0276299 A1 | 12/2006 | Imanishi |
| 2007/0004552 A1 | 1/2007 | Matsudaira et al. |
| 2007/0004556 A1 | 1/2007 | Rohs et al. |
| 2007/0149342 A1 | 6/2007 | Guenter et al. |
| 2007/0155567 A1 | 7/2007 | Miller et al. |
| 2007/0193391 A1 | 8/2007 | Armstrong et al. |
| 2008/0032852 A1 | 2/2008 | Smithson et al. |
| 2008/0032854 A1 | 2/2008 | Smithson et al. |
| 2008/0039269 A1 | 2/2008 | Smithson et al. |
| 2008/0039273 A1 | 2/2008 | Smithson et al. |
| 2008/0039276 A1 | 2/2008 | Smithson et al. |
| 2008/0081728 A1 | 4/2008 | Faulring et al. |
| 2008/0139363 A1 | 6/2008 | Williams |
| 2008/0141809 A1 | 6/2008 | Miller et al. |
| 2008/0149407 A1 | 6/2008 | Shibata et al. |
| 2008/0200300 A1 | 8/2008 | Smithson et al. |
| 2008/0228362 A1 | 9/2008 | Muller et al. |
| 2008/0284170 A1 | 11/2008 | Cory |
| 2008/0305920 A1 | 12/2008 | Nishii et al. |
| 2009/0023545 A1 | 1/2009 | Beaudoin |
| 2009/0082169 A1 | 3/2009 | Kolstrup |
| 2009/0107454 A1 | 4/2009 | Hiyoshi et al. |

(56) References Cited

U.S. PATENT DOCUMENTS

| | | |
|---|---|---|
| 2009/0251013 A1 | 10/2009 | Vollmer et al. |
| 2010/0056322 A1 | 3/2010 | Thomassy |
| 2010/0093479 A1 | 4/2010 | Carter et al. |
| 2011/0088503 A1 | 4/2011 | Armstrong et al. |
| 2011/0127096 A1 | 6/2011 | Schneidewind |
| 2011/0184614 A1 | 7/2011 | Keilers et al. |
| 2011/0218072 A1 | 9/2011 | Lohr et al. |
| 2011/0230297 A1 | 9/2011 | Shiina et al. |
| 2011/0291507 A1 | 12/2011 | Post |
| 2011/0319222 A1 | 12/2011 | Ogawa et al. |
| 2012/0035015 A1 | 2/2012 | Ogawa et al. |
| 2012/0258839 A1 | 10/2012 | Smithson et al. |
| 2013/0035200 A1 | 2/2013 | Noji et al. |
| 2013/0053211 A1 | 2/2013 | Fukuda et al. |
| 2013/0072340 A1 | 3/2013 | Bazyn et al. |
| 2013/0079191 A1 | 3/2013 | Lohr |
| 2013/0080006 A1 | 3/2013 | Vasiliotis et al. |
| 2013/0095977 A1 | 4/2013 | Smithson et al. |
| 2013/0102434 A1 | 4/2013 | Nichols et al. |
| 2013/0146406 A1 | 6/2013 | Nichols et al. |
| 2013/0152715 A1 | 6/2013 | Pohl et al. |
| 2013/0190123 A1 | 7/2013 | Pohl et al. |
| 2013/0288844 A1 | 10/2013 | Thomassy |
| 2013/0288848 A1 | 10/2013 | Carter et al. |
| 2013/0324344 A1 | 12/2013 | Pohl et al. |
| 2013/0337971 A1 | 12/2013 | Kostrup |
| 2014/0011619 A1 | 1/2014 | Pohl et al. |
| 2014/0011628 A1 | 1/2014 | Lohr et al. |
| 2014/0038771 A1 | 2/2014 | Miller |
| 2014/0073470 A1 | 3/2014 | Carter et al. |
| 2014/0121922 A1 | 5/2014 | Vasiliotis et al. |
| 2014/0128195 A1 | 5/2014 | Miller et al. |

FOREIGN PATENT DOCUMENTS

| | | |
|---|---|---|
| CN | 1157379 A | 8/1997 |
| CN | 1281540 A | 1/2001 |
| CN | 1283258 | 2/2001 |
| CN | 1940348 | 4/2007 |
| DE | 498 701 | 5/1930 |
| DE | 1171692 | 6/1964 |
| DE | 2 310880 | 9/1974 |
| DE | 2 136 243 | 1/1975 |
| DE | 2436496 | 2/1975 |
| DE | 39 40 919 A1 | 6/1991 |
| DE | 19851738 A | 5/2000 |
| DE | 10155372 A1 | 5/2003 |
| EP | 0 432 742 | 12/1990 |
| EP | 0528381 | 2/1993 |
| EP | 0528382 | 2/1993 |
| EP | 635639 A1 | 1/1995 |
| EP | 0638741 | 2/1995 |
| EP | 0976956 | 2/2000 |
| EP | 1136724 | 9/2001 |
| EP | 1366978 | 3/2003 |
| EP | 1 433 641 | 6/2004 |
| EP | 1 624 230 | 2/2006 |
| EP | 1 811 202 | 7/2007 |
| FR | 620375 | 4/1927 |
| FR | 2460427 | 1/1981 |
| FR | 2590638 | 5/1987 |
| FR | 2909938 | 6/2008 |
| GB | 391448 | 4/1933 |
| GB | 592320 | 9/1947 |
| GB | 906 002 A | 9/1962 |
| GB | 919430 A | 2/1963 |
| GB | 1132473 | 11/1968 |
| GB | 1165545 | 10/1969 |
| GB | 1 376 057 | 12/1974 |
| GB | 2031822 | 4/1980 |
| GB | 2 035 482 | 6/1980 |
| GB | 2 080 452 | 8/1982 |
| JP | 44-1098 | 1/1944 |
| JP | 42-2843 | 2/1967 |
| JP | 42-2844 | 2/1967 |
| JP | 47-000448 | 7/1972 |
| JP | 47-29762 | 11/1972 |
| JP | 48-54371 | 7/1973 |
| JP | 49-12742 | 3/1974 |
| JP | 50-114581 | 9/1975 |
| JP | 51-25903 | 8/1976 |
| JP | 51-150380 | 12/1976 |
| JP | 47-20535 | 8/1977 |
| JP | 53-048166 | 1/1978 |
| JP | 55-135259 | 4/1979 |
| JP | 56-047231 | 4/1981 |
| JP | A-S56-127852 | 10/1981 |
| JP | 58-065361 | 4/1983 |
| JP | 59-069565 | 4/1984 |
| JP | 59-144826 | 8/1984 |
| JP | 60-247011 | 12/1985 |
| JP | 61-031754 | 2/1986 |
| JP | 61-144466 | 7/1986 |
| JP | 61-173722 | 10/1986 |
| JP | 61-270552 | 11/1986 |
| JP | 62-075170 | 4/1987 |
| JP | 63-219953 | 9/1988 |
| JP | 63-160465 | 10/1988 |
| JP | 01-308142 | 12/1989 |
| JP | 02-157483 | 6/1990 |
| JP | 02-271142 | 6/1990 |
| JP | 04-166619 | 6/1992 |
| JP | 04-272553 | 9/1992 |
| JP | 4-351361 | 12/1992 |
| JP | 5-87154 | 4/1993 |
| JP | 52-35481 | 9/1993 |
| JP | 6-50358 | 2/1994 |
| JP | 7-42799 | 2/1995 |
| JP | 07-42799 | 2/1995 |
| JP | 07-139600 | 5/1995 |
| JP | 08-170706 A | 7/1996 |
| JP | 09-024743 A | 1/1997 |
| JP | 09-089064 | 3/1997 |
| JP | 10-115356 | 5/1998 |
| JP | 10-194186 | 7/1998 |
| JP | 411063130 | 3/1999 |
| JP | 11-257479 | 9/1999 |
| JP | 2000-46135 | 2/2000 |
| JP | 2001-27298 | 1/2001 |
| JP | 2001-107827 | 4/2001 |
| JP | 2001-165296 | 6/2001 |
| JP | 2001-521109 A | 11/2001 |
| JP | 2002-147558 | 5/2002 |
| JP | 2002-250421 | 6/2002 |
| JP | 2003-028257 | 1/2003 |
| JP | 2003-56662 | 2/2003 |
| JP | 2003-161357 | 6/2003 |
| JP | 2003-524119 | 8/2003 |
| JP | 2003-336732 | 11/2003 |
| JP | 2004-162652 A | 6/2004 |
| JP | 8-247245 | 9/2004 |
| JP | 2004-526917 | 9/2004 |
| JP | 2005-240928 A | 9/2005 |
| JP | 2006-015025 | 1/2006 |
| JP | 2006-300241 | 11/2006 |
| JP | 2007-535715 | 12/2007 |
| JP | 2008-002687 | 1/2008 |
| JP | 03-149442 | 1/2009 |
| JP | 2010-069005 | 4/2010 |
| NE | 98467 | 7/1961 |
| TW | 74007 | 1/1984 |
| TW | 175100 | 12/1991 |
| TW | 218909 | 1/1994 |
| TW | 227206 | 7/1994 |
| TW | 360184 | 6/1999 |
| TW | 512211 | 12/2002 |
| TW | 582363 | 4/2004 |
| TW | 590955 | 6/2004 |
| TW | I225129 | 12/2004 |
| TW | 1235214 | 1/2005 |
| TW | I225912 | 1/2005 |
| TW | M294598 | 7/2006 |
| TW | 200637745 A | 11/2006 |

(56) References Cited

FOREIGN PATENT DOCUMENTS

| WO | WO 99/20918 | 4/1999 |
|---|---|---|
| WO | WO 01/73319 | 10/2001 |
| WO | WO 02/088573 | 11/2002 |
| WO | WO 03/100294 | 12/2003 |
| WO | WO 2005/083305 | 9/2005 |
| WO | WO 2006/091503 | 8/2006 |
| WO | WO 2007/077502 | 7/2007 |
| WO | WO 2008/057507 | 5/2008 |
| WO | WO 2008/078047 | 7/2008 |
| WO | WO 2008/095116 | 8/2008 |
| WO | WO 2008/100792 | 8/2008 |
| WO | WO 2008/101070 | 8/2008 |
| WO | WO 2008/131353 | 10/2008 |
| WO | WO 2008/154437 | 12/2008 |
| WO | WO 2009/006481 | 1/2009 |
| WO | WO 2009/148461 | 12/2009 |
| WO | WO 2009/157920 | 12/2009 |
| WO | WO 2010/017242 | 2/2010 |
| WO | WO 2010/024809 | 3/2010 |
| WO | WO 2010/044778 | 4/2010 |
| WO | WO 2010/135407 | 11/2010 |
| WO | WO 2011/101991 | 8/2011 |
| WO | WO 2013/112408 | 8/2013 |

OTHER PUBLICATIONS

Office Action dated Aug. 11, 2011 for U.S. Appl. No. 12/251,325.
Office Action dated Sep. 18, 2012 for U.S. Appl. No. 13/426,269.
Office Action dated Nov. 16, 2012 for U.S. Appl. No. 13/426,269.
Japanese Office Action dated Feb. 12, 2013 for Japanese Patent Application No. 2011-531007.
Goi et al., Development of Traction Drive IDG (T-IDG), Proceedings of International Congress on Continuously Variable and Hybrid Transmissions, Sep. 2009, 6 pages.
Masashi, U. et al., "Continuously Variable Transmission for Accessory Drive System", 1999 Proceedings, JSAE Annual Congress.
Pohl, Brad., CVT Split Power Transmissions, A Configuration versus Performance Study with an Emphasis on the Hydromechanical Type, Society of Automotive Engineers, Mar. 4, 2002, 11 pages.
Pohl, et al., Configuration Analysis of a Spherical Traction Drive CVT/IVT, SAE International, 2004 International Continuously Variable and Hybrid Transmission Congress, Sep. 23, 2004, 6 pages.
Smithson et al., Scalability for an Alternative Rolling Traction CVT, Society of Automotive Engineers, Mar. 8, 2004, 6 pages.
Thomassy: An Engineering Approach to Simulating Traction EHL. CVT-Hybrid International Conference Mecc/Maastricht/The Netherlands, Nov. 17-19, 2010, p. 97.
Van der Lieijaen, A.C., "Continuously Variable Accessory Drive and other methods to reduce additional fuel consumption caused by engine accessories", Technische Universiteit Eindhoven Department Mechanical Engineering, Eindhoven, Jul. 2004.
"An Evaluation of the Morse Constant Speed Accessory Drive", Technology Assessment & Evaluation Branch, Office of Mobile Source Air Pollution Control, US EPA, Jun. 1976.
First Office Action dated Aug. 5, 2013 in Chinese Patent Application No. 200880132101.7.
Extended European Search Report dated Jun. 28, 2013 in patent application No. 13163601.1.
Office Action dated Apr. 1, 2014 in Japanese Patent Application No. 2013-157358.

\* cited by examiner

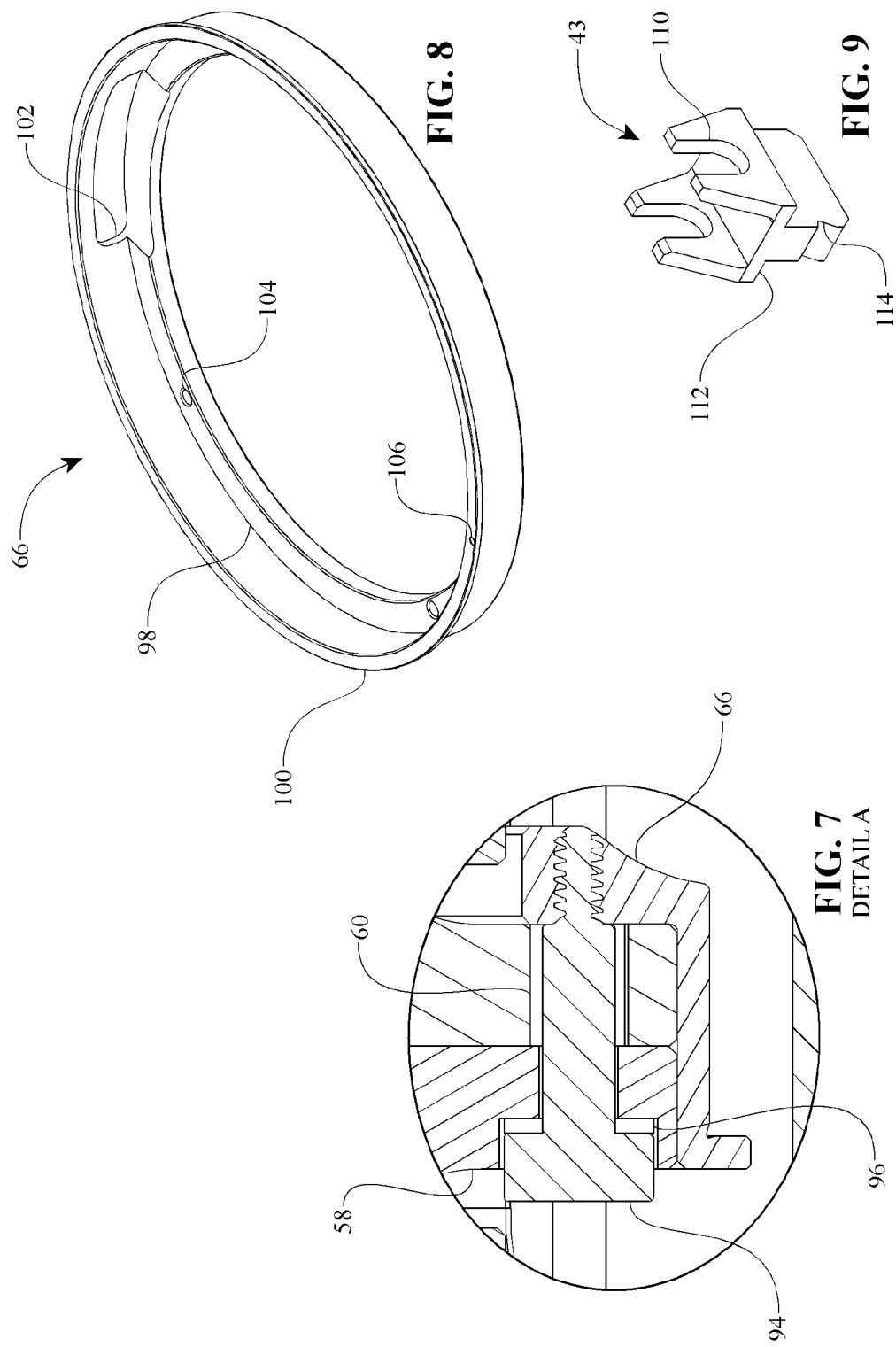

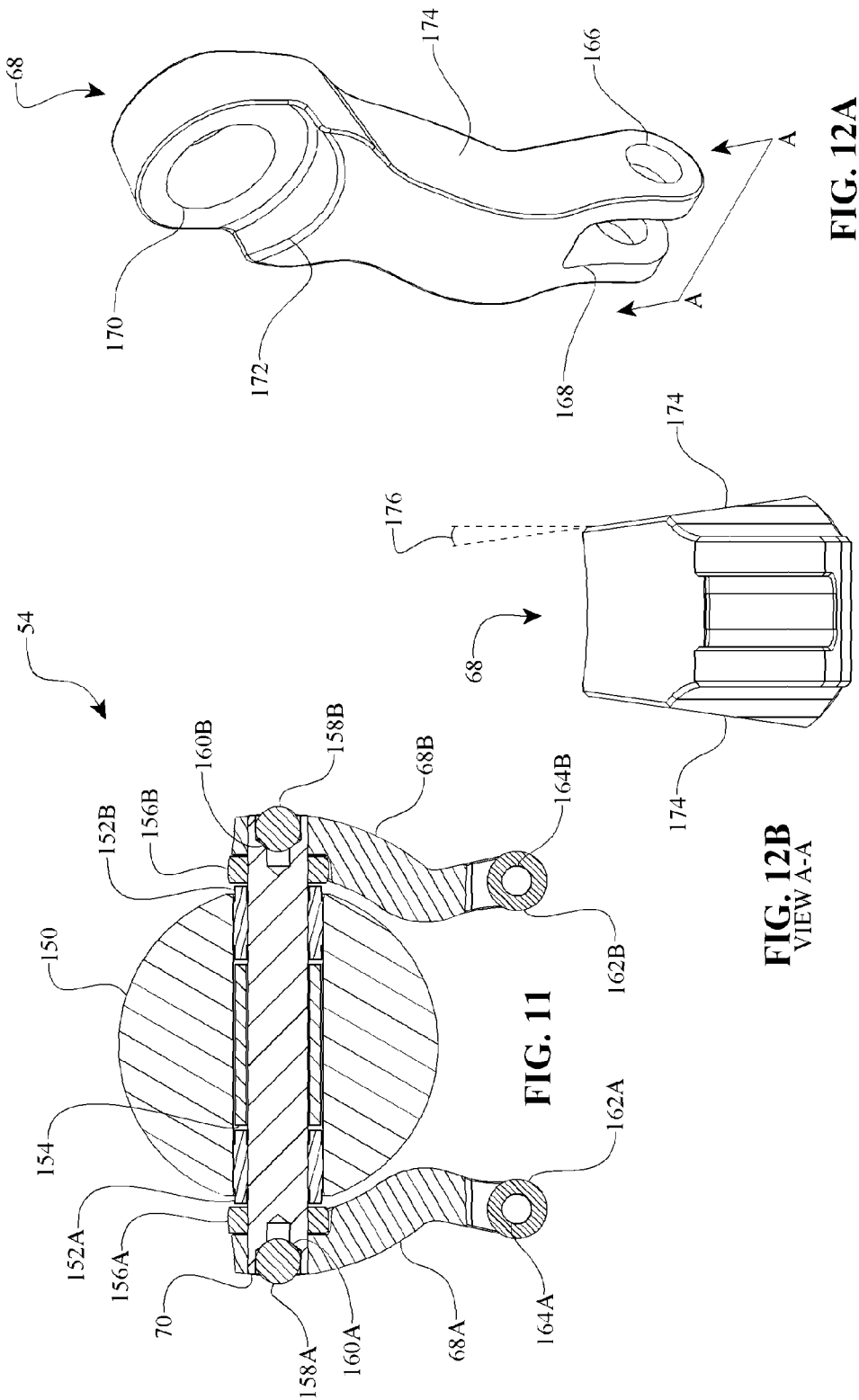

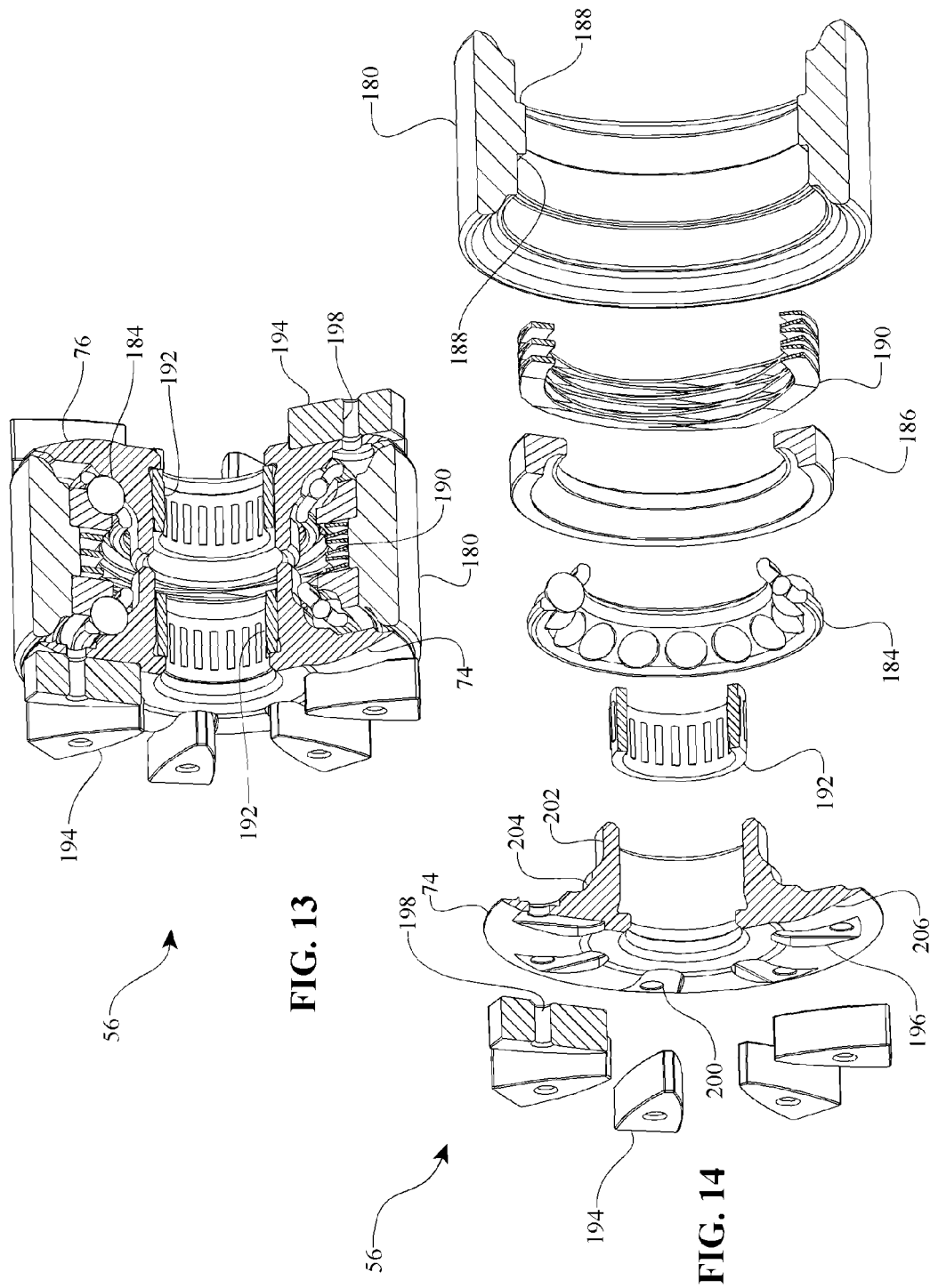

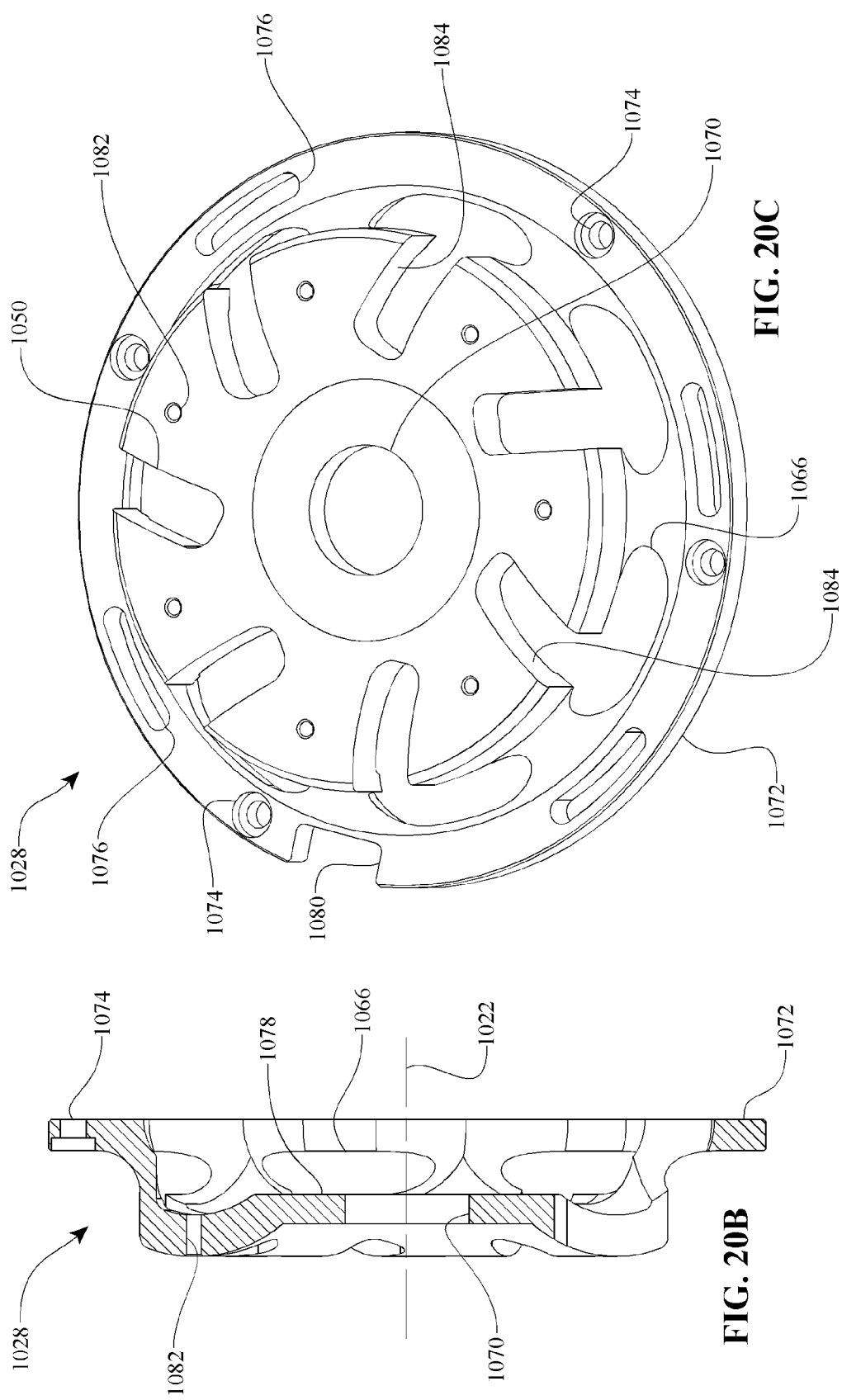

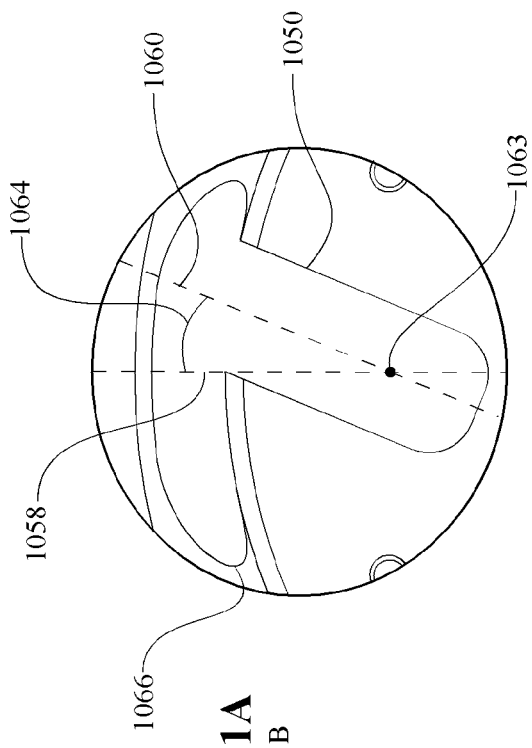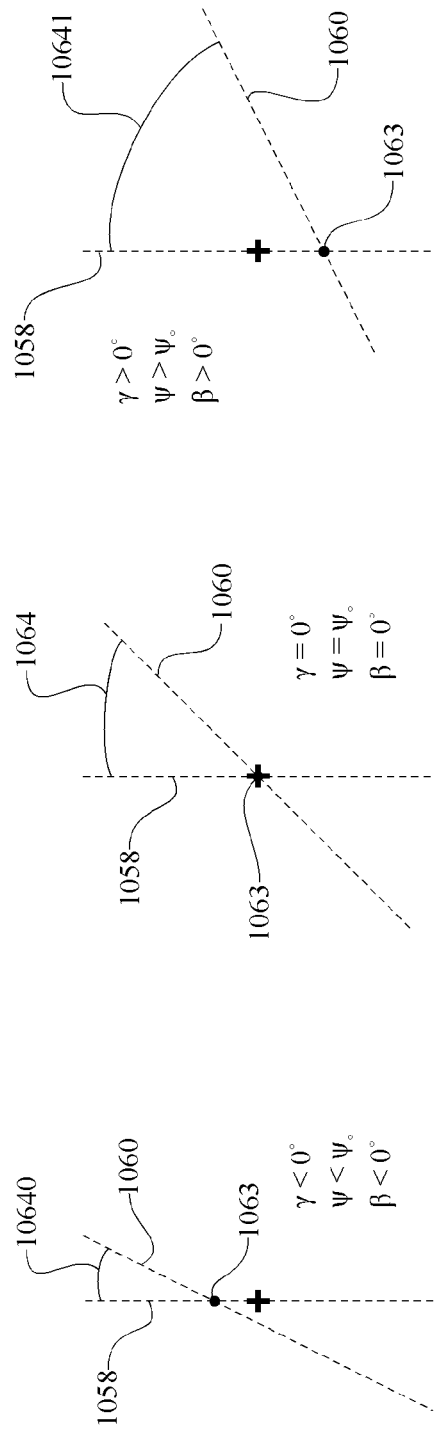
FIG. 21A
DETAIL B
FIG. 21B
FIG. 21C
FIG. 21D

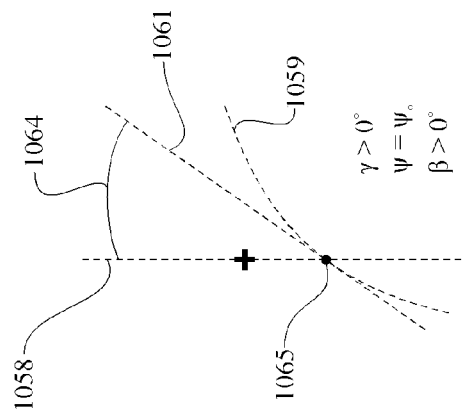
FIG. 21E
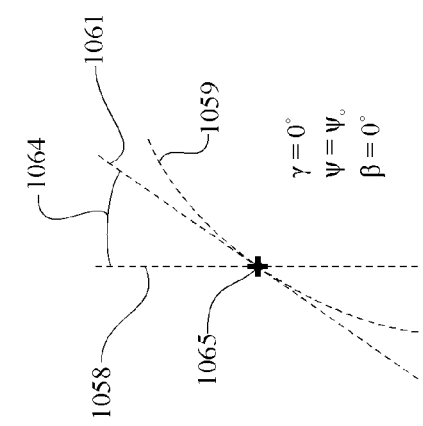
FIG. 21H
FIG. 21G
FIG. 21F

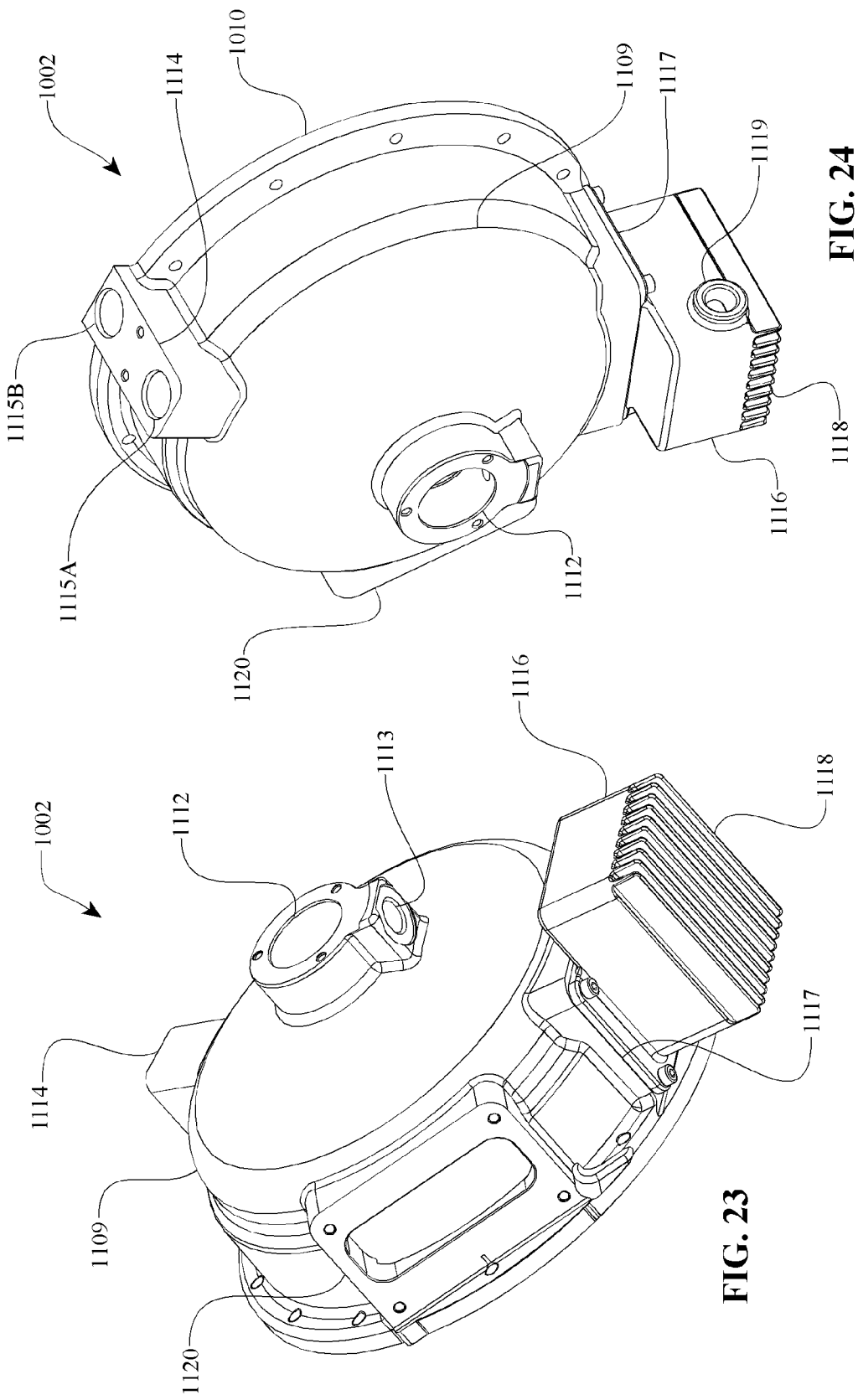

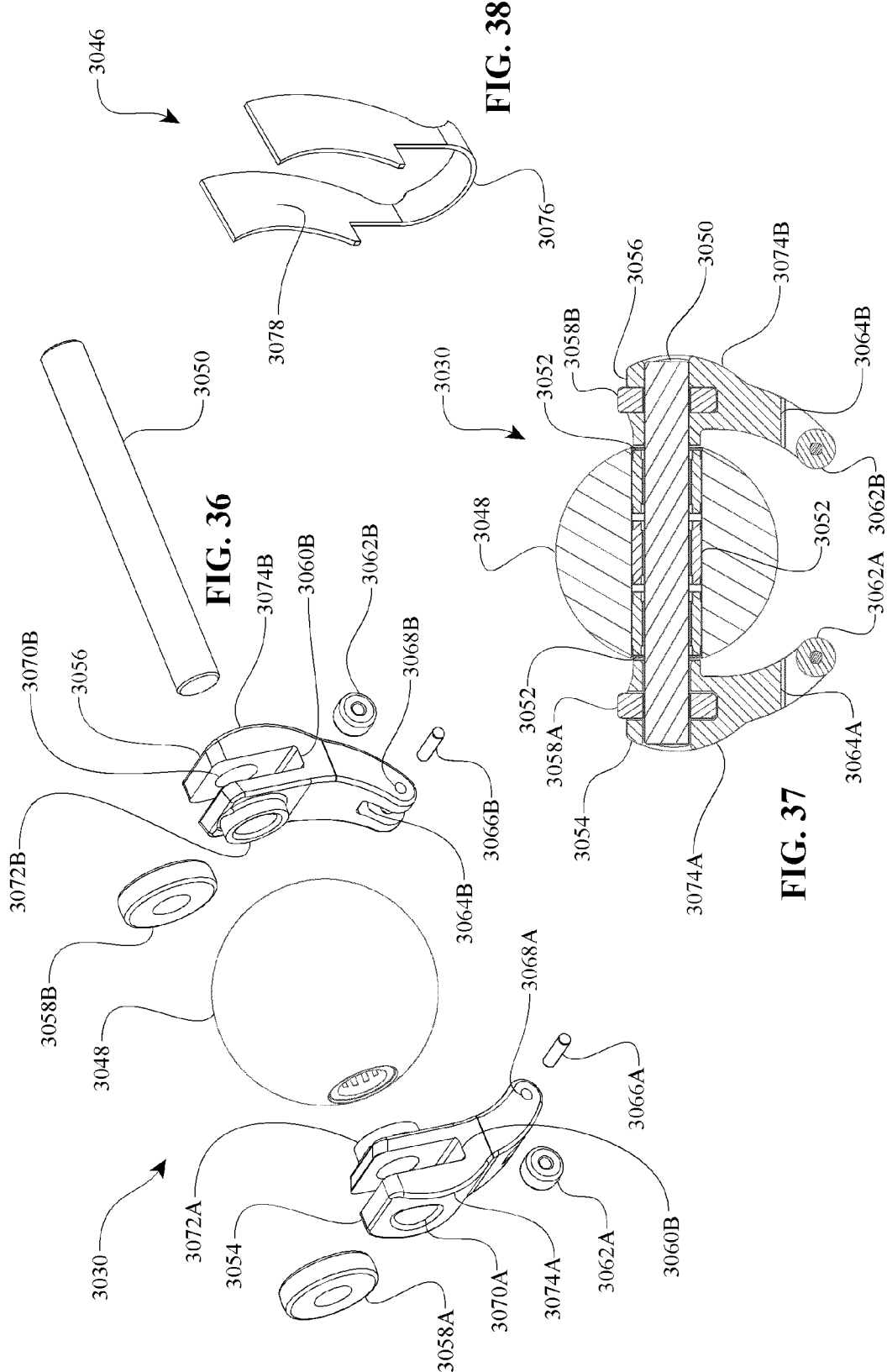

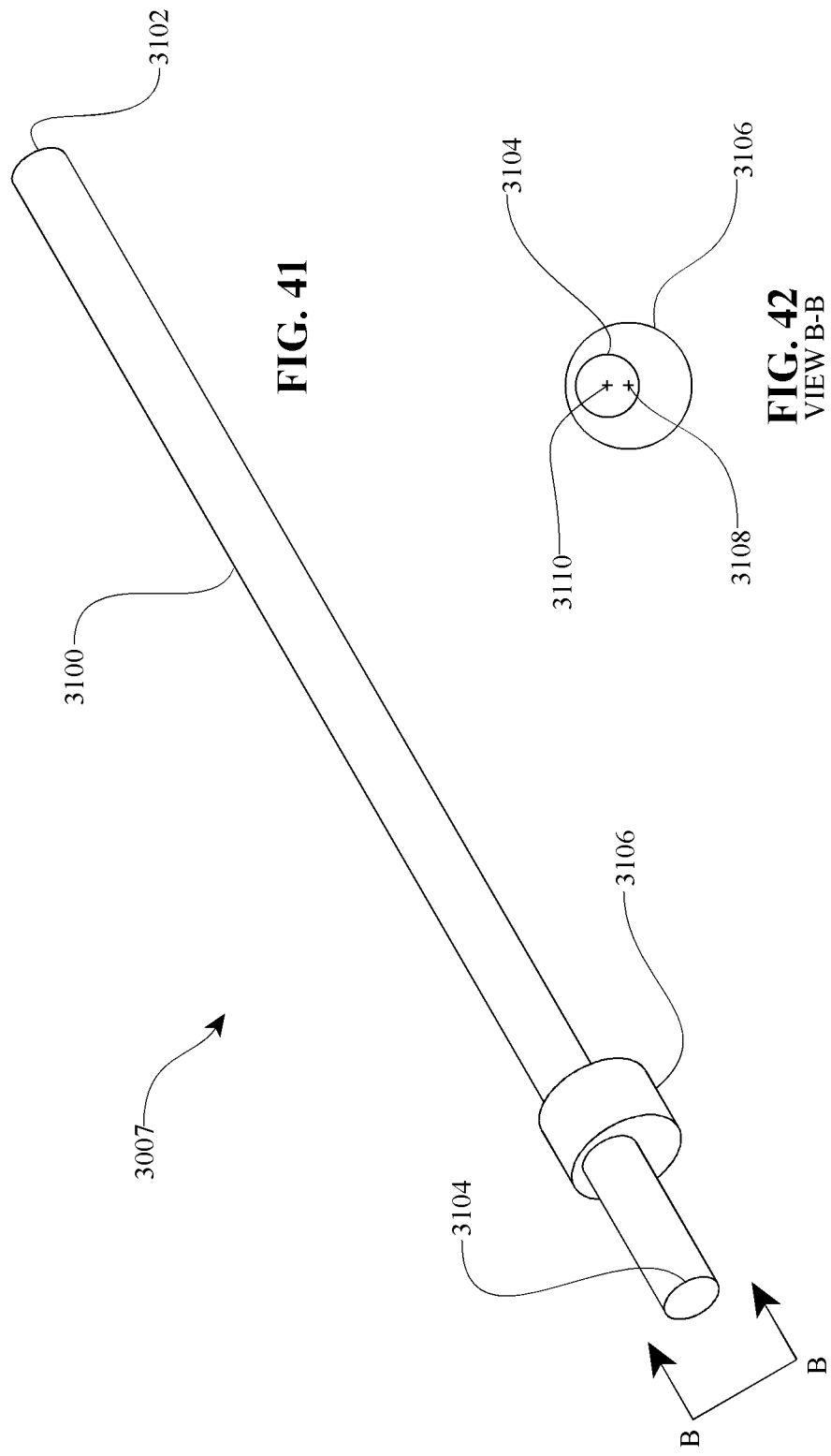

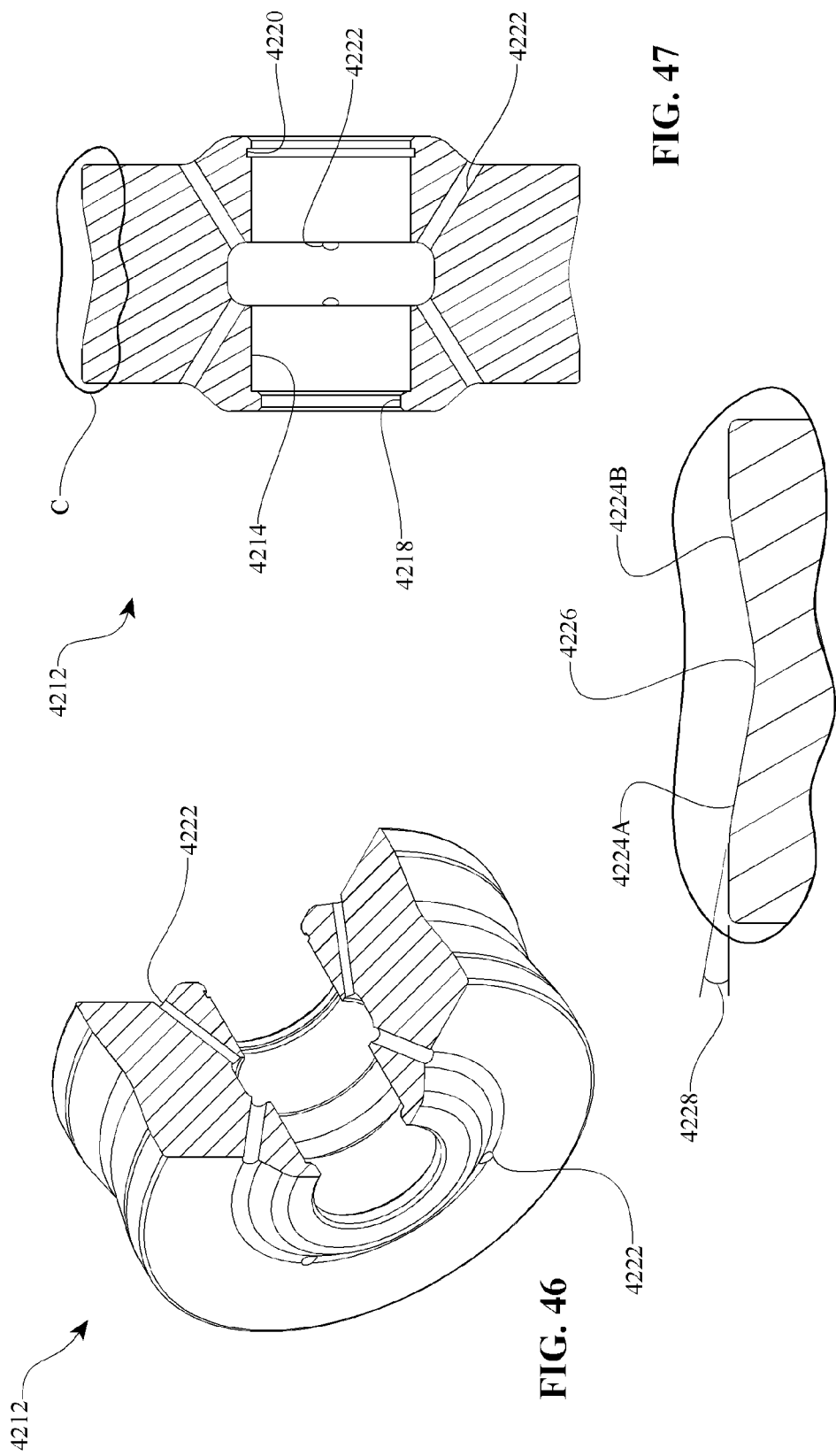

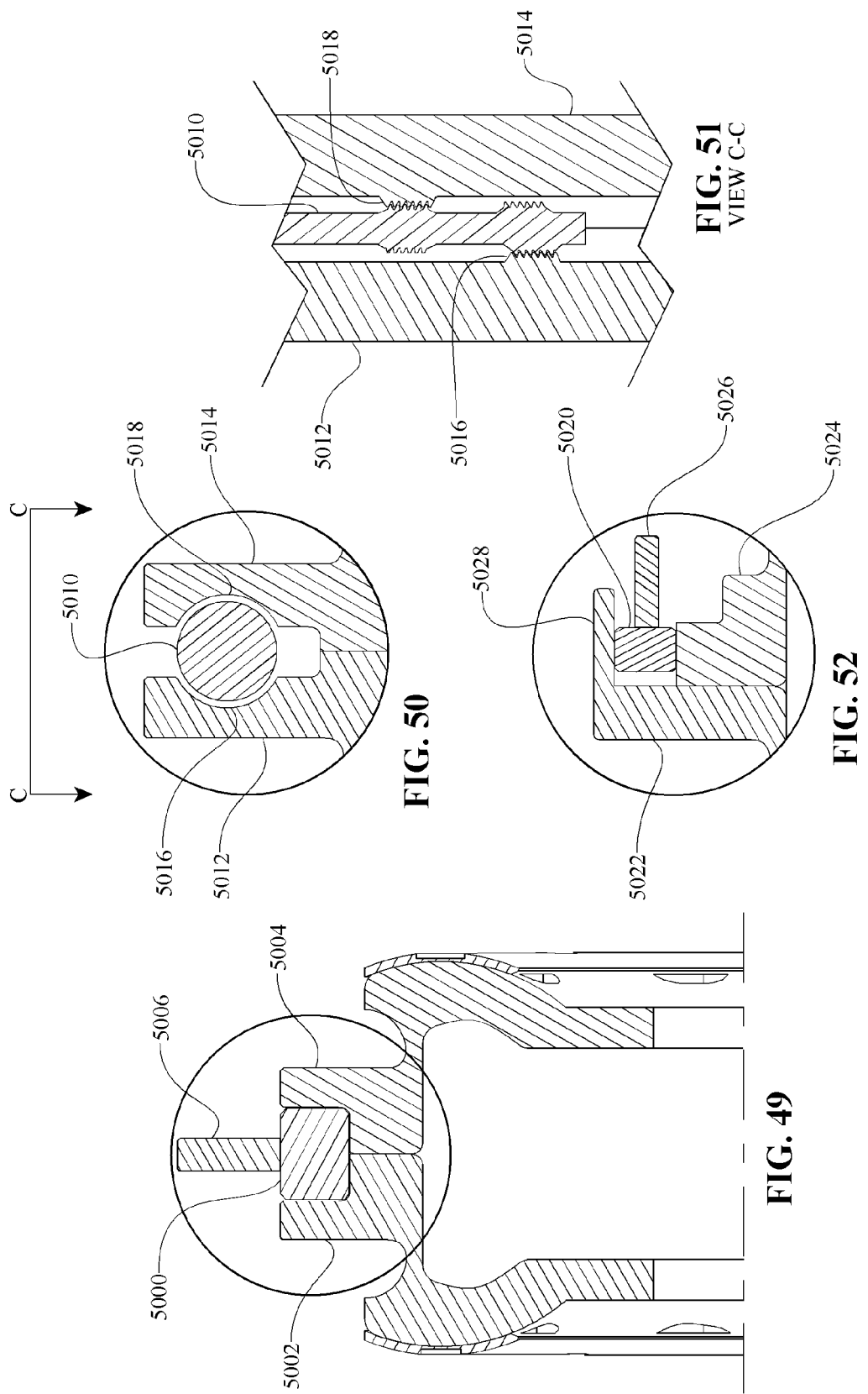

CONTINUOUSLY VARIABLE TRANSMISSION

CROSS REFERENCE TO RELATED APPLICATIONS

This application is a divisional of U.S. patent application Ser. No. 13/426,269, filed Mar. 21, 2012, which is a continuation of U.S. patent application Ser. No. 12/251,325, filed on Oct. 14, 2008, issued as U.S. Pat. No. 8,167,759 on May 1, 2012. The disclosures of all of the above-referenced prior applications, publications, and patents are considered part of the disclosure of this application, and are incorporated by reference herein in their entirety.

BACKGROUND OF THE INVENTION

1. Field of the Invention

The field of the invention relates generally to mechanical and/or electro-mechanical power modulation devices and methods, and more particularly to continuously and/or infinitely variable, planetary power modulating devices and methods for modulating power flow in a power train or drive, such as power flow from a prime mover to one or more auxiliary or driven devices.

2. Description of the Related Art

In certain systems, a single power source drives multiple devices. The power source typically has a narrow operating speed range at which the performance of the power source is optimum. It is preferred to operate the power source within its performance optimizing operating speed range. A driven device typically also has a narrow operating speed range at which the performance of the driven device is optimum. It is also preferred to operate the driven device within its performance optimizing operating speed range. A coupling is usually employed to transfer power from the power source to the driven device. Where a direct, non-modulating coupling couples the power source to the driven device, the driven device operates at a speed proportional to that of the power source. However, it is often the case that the optimum operating speed of the driven device is not directly proportional to the optimum operating speed of the power source. Therefore, it is preferred to incorporate into the system a coupling adapted to modulate between the speed of the power source and the speed of the driven device.

Couplings between the power source and the driven devices can be selected such that the input speed from the power source is reduced or increased at the output of a given coupling. However, in frequently implemented systems, typical known power train configurations and/or coupling arrangements allow at best for a constant ratio between the input speed from the power source and the speed of power transfer to the driven device. One such system is the so-called front end accessory drive (FEAD) system employed in many automotive applications. In a typical FEAD system, the prime mover (usually an internal combustion engine) provides the power to run one or more accessories, such as a cooling fan, water pump, oil pump, power steering pump, alternator, etc. During operation of the automobile, the accessories are forced to operate at speeds that have a fixed relationship to the speed of the prime mover. Hence, for example, as the speed of the engine increases from 800 revolutions per minute (rpm) at idle to 2,500 rpm at cruising speed, the speed of each accessory driven by the engine increases proportionally to the increase in engine speed, such that some accessories may be operating at varying speeds ranging between 1,600 rpm to 8,000 rpm. The result of such system configuration is that often any given accessory does not operate within its maximum efficiency speed range. Consequently, inefficiencies arise from wasted energy during operation and oversizing of the accessories to handle the speed and/or torque ranges.

Thus, there exists a continuing need for devices and methods to modulate power transfer between a prime mover and driven devices. In some systems, it would be beneficial to regulate the speed and/or torque transfer from an electric motor and/or internal combustion engine to one or more driven devices that operate at varying efficiency optimizing speeds. In some current automotive applications, there is a need for a power modulating device to govern the front end accessory drive within existing packaging limits. The inventive embodiments of power modulating devices and/or drivetrains described below address one or more of these needs.

SUMMARY OF THE INVENTION

The systems and methods herein described have several features, no single one of which is solely responsible for its desirable attributes. Without limiting the scope as expressed by the claims that follow, its more prominent features will now be discussed briefly. After considering this discussion, and particularly after reading the section entitled "Detailed Description of Certain Inventive Embodiments" one will understand how the features of the system and methods provide several advantages over traditional systems and methods.

One aspect of the invention relates to a continuously variable accessory drive (CVAD) having an accessory device and a continuously variable transmission (CVT) coupled to the accessory device. The continuously variable transmission has a group of traction planets. Each traction planet can be adapted to rotate about a tiltable axis. The CVAD also includes a skew actuator operably coupled to the CVT. The skew actuator can be adapted to apply a skew condition to the CVT to tilt the axes of the traction planets.

Another aspect of the invention concerns a continuously variable accessory drive (CVAD) having a group of traction planets arranged angularly about a longitudinal axis of the CVAD. The CVAD can include a group of planet axles. Each planet axle is operably coupled to each traction planet. Each planet axle defines a tiltable axis of rotation for each traction planet. Each planet axle can be configured for angular displacement in a plane perpendicular to the longitudinal axis. Each planet axle can be configured for angular displacement in a plane parallel to the longitudinal axis. In one embodiment, the CVAD includes a first carrier member that is operably coupled to a first end of each planet axle. The first carrier member can be mounted about the longitudinal axis. The CVAD includes a second carrier member that is operably coupled to a second end of each planet axle. The second carrier member can be mounted about the longitudinal axis. The first and second carrier members are configured to rotate relative to each other about the longitudinal axis.

Yet another aspect of the invention concerns a continuously variable accessory drive (CVAD) having a rotatable input coaxial with a longitudinal axis of the CVAD. The CVAD has a variator coaxial with the longitudinal axis and coupled to the rotatable input. The variator has a rotatable output. The CVAD has a planetary gear assembly coupled to the rotatable output. The planetary gear assembly is configured to power an accessory device. In one embodiment, the variator includes a group of traction planets arranged angularly about the main shaft. The variator can include a first carrier member that is operably coupled to each of the traction planets. The variator can also include a second carrier member that is operably coupled to each of the traction planets. The second carrier member is configured to rotate relative to the first carrier member to thereby apply a skew condition on each of the planet axles.

One aspect of the invention concerns a continuously variable accessory drive (CVAD) having a group of traction planets arranged angularly about a longitudinal axis of the CVAD. In one embodiment, the CVAD includes a group of planet axles operably coupled to each traction planet. Each planet axle defines a tiltable axis of rotation for each traction planet. Each planet axle can be configured for angular displacement in a plane perpendicular to the longitudinal axis. Each planet axle can be configured for angular displacement in a plane parallel to the longitudinal axis. In one embodiment, the CVAD includes a first carrier member arranged coaxial about the longitudinal axis. The first carrier member can be operably coupled to each traction planet. The first carrier member can have a number of radially offset slots arranged angularly about a center of the first carrier member. Each of the radially offset slots has a linear offset from a centerline of the carrier member. The CVAD can include a second carrier member arranged coaxial about the longitudinal axis. The second carrier member can have a number of radial slots. The radial slots can be arranged angularly about a center of the second carrier member. Each of the radial slots are substantially radially aligned with the center of the second carrier member. The CVAD can also include a skew actuator that is operably coupled to at least one of the first and second carrier members. The actuator can be configured to impart a relative rotation between the first and second carrier members.

Another aspect of the invention relates to a method of facilitating control of the speed ratio of a continuously variable accessory drive (CVAD). In one embodiment, the method includes the step of providing a group of traction planets. The method includes the step of providing each of the traction planets with a planet axle. Each traction planet can be configured to rotate about a respective planet axle. The method can include the step of providing a first carrier member that is configured to engage a first end of each of the planet axles. The first carrier member can be mounted along a longitudinal axis of the CVAD. The method can include the step of providing a second carrier member that is configured to engage a second end of each of the planet axles. The second carrier member can be mounted coaxially with the first carrier member. The method can also include the step of arranging the first carrier member relative to the second carrier member such that during operation of the CVAD the first carrier member can be rotated relative to the second carrier member about the longitudinal axis.

Another aspect of the invention concerns a variator having a group of traction planets arranged angularly about a longitudinal axis. In one embodiment, the variator has a first carrier member that is arranged coaxial about the longitudinal axis. The first carrier member can be operably coupled to each traction planet. The first carrier member can have a number of radially offset slots that are arranged angularly about a center of the first carrier member. In one embodiment, each of the radially offset slots has a linear offset from a centerline of the carrier member. The variator can also have a second carrier member that is arranged coaxial about the longitudinal axis. The second carrier member can have a number of radial slots. In one embodiment, the radial slots are arranged angularly about a center of the second carrier member. Each of the radial slots are substantially radially aligned with the center of the second carrier member. The variator can also have a traction sun assembly radially inward of, and in contact with, each traction planet. The traction sun assembly can contact the first and second carrier members. The traction sun assembly is substantially fixed along the longitudinal axis.

Another aspect of the invention relates to a method of assembling a device for modulating power to an accessory device. The method includes the steps of providing a continuously variable transmission (CVT) having a group of traction planets arranged angularly about a longitudinal axis. In one embodiment, the CVT has a skew-based control system adapted to apply a skew condition to each of the traction planets. The method also includes the step of operably coupling the CVT to the accessory device.

Yet one more aspect of the invention addresses a variator having a group of traction planets that are arranged angularly about a longitudinal axis. In one embodiment, the variator includes a first carrier member that is arranged coaxial about the longitudinal axis. The first carrier member can be operably coupled to each traction planet. The first carrier member has a number of radially offset slots that are arranged angularly about a center of the first carrier member. Each of the radially offset slots has a linear offset from a centerline of the carrier member. The variator can include a second carrier member that is arranged coaxial about the longitudinal axis. In one embodiment, the second carrier member has a number of radial slots. The radial slots can be arranged angularly about a center of the second carrier member. Each of the radial slots are substantially radially aligned with the center of the second carrier member. The variator can also include a traction sun located radially inward of, and in contact with, each traction planet. The traction sun has an outer periphery provided with a first and a second contact surface. The first and second contact surfaces can be configured to contact each of the traction planets.

In another aspect, the invention concerns a variator having a group of traction planets that are arranged angularly about a longitudinal axis. In one embodiment, the variator has a planet axle operably coupled to each traction planet. The planet axle can be configured to provide a tiltable axis of rotation for each traction planet. The variator can include a first carrier member that is arranged coaxially about the longitudinal axis. The first carrier member can be operably coupled to a first end of the planet axle. The variator can include a second carrier member that is arranged coaxially about the longitudinal axis. The second carrier member can be operably coupled to a second end of the planet axle. The variator can also include a carrier retaining ring that is coupled to the first and second carrier members. The carrier retaining ring can be substantially non-rotatable about the longitudinal axis. The carrier retaining ring can be configured to axially couple the first and second carrier members. The first carrier member is configured to rotate with respect to the second carrier member to thereby apply a skew condition on each of the planet axles.

One aspect of the invention relates to a variator having a group of traction planets that are arranged angularly about a longitudinal axis. The variator includes a first carrier member that is coaxial with the longitudinal axis. In one embodiment, the variator includes a second carrier member coaxial with the longitudinal axis. The variator can include a skew driver coupled to the first and second carrier members. The skew driver can be adapted to rotate the first carrier member in a first rotational direction about the longitudinal axis. The skew driver can be adapted to rotate the second carrier member in a second rotational direction about the longitudinal axis. The first rotational direction is substantially opposite to the second rotational direction.

Another aspect of the invention relates to a method of adjusting a speed ratio of a continuously variable accessory drive (CVAD) having a group of traction planets. Each traction planet has a tiltable axis of rotation. In one embodiment, the CVAD has a carrier member operably coupled to each of the traction planets. The method can include the step of determining a set point for an angular displacement of the carrier member. The set point for the angular displacement of the carrier member is based at least in part on a set point for the speed ratio. The method includes the step of rotating the carrier member to the set point for the angular displacement of the carrier member. Rotating the carrier member induces a skew condition on each tiltable axis of rotation. The carrier member is configured to adjust the skew condition as each tiltable axis of rotation tilts. Rotating the carrier member comprises actuating a skew actuator.

Yet one more aspect of the invention addresses a method of adjusting a speed ratio of a continuously variable accessory drive (CVAD) having a group of traction planets. Each traction planet has a tiltable axis of rotation. The CVAD has a skew actuator operably coupled to each of the traction planets. In one embodiment, the method includes the step of determining a skew actuator command signal. The skew actuator command signal is based at least in part on a set point for the tilt angle. The method also includes the step of applying the skew actuator command signal to the skew actuator to thereby adjust the skew condition of the traction planets.

One aspect of the invention concerns a method of adjusting a speed ratio of a continuously variable accessory drive (CVAD) having a group of traction planets. Each traction planet has a tiltable axis of rotation. The CVAD has a skew actuator operably coupled to each of the traction planets. In one embodiment, the method includes the step of determining a skew actuator command signal. The command signal is based at least in part on a set point for the desired speed. The method also includes the step of applying the skew actuator command signal to the skew actuator to thereby adjust the skew condition of the traction planets.

One aspect of the invention relates to a traction planet assembly having a traction planet with a central bore. The traction planet assembly can have a planet axle arranged in the central bore. The planet axle has a first end and a second end. In one embodiment, the traction planet assembly has a first leg coupled to the first end of the planet axle. The first leg can be substantially non-rotatable with respect to the planet axle. The traction planet assembly can have a second leg that is coupled to the second end of the planet axle. The second leg can be substantially rotatable with respect to the planet axle.

Another aspect of the invention concerns a traction planet assembly having a traction planet with a central bore. In one embodiment, the traction planet assembly has a planet axle that is arranged in the central bore. The planet axle can have a first end and a second end. The first and second ends can be provided with inner bores. The traction planet assembly can have a shift reaction ball that is received in each of the inner bores. In one embodiment, the traction planet assembly has a first leg that is coupled to the first end of the planet axle. The traction planet assembly can also have a second leg that is coupled to the second end of the planet axle. The first and second legs are provided with tapered sides.

Yet another aspect of the invention involves a traction sun assembly for a continuously variable transmission (CVT) having a group of traction planet assemblies. The traction sun assembly includes a traction sun that is coaxial with a longitudinal axis of the CVT. The traction sun can be radially inward of, and in contact with, each of the traction planet assemblies. In one embodiment, the traction sun assembly includes a shift cam that is operably coupled to the traction sun. The traction sun assembly can also include a group of anti-rotation inserts attached to the shift cam.

One aspect of the invention concerns a carrier member for a continuously variable transmission (CVT) having a group of traction planets. The carrier member can have a substantially bowl-shaped body with a central bore. In one embodiment, the carrier member can have a number of radially offset slots arranged angularly about the central bore. Each of the radially offset slots can have a linear offset from a centerline of the bowl-shaped body.

In another aspect, the invention concerns a skew actuator for a continuously variable transmission (CVT) having a skew control system. The skew actuator can have a hydraulic piston coupled to the CVT. In one embodiment, the skew actuator has a hydraulic control valve in fluid communication with the hydraulic piston. The skew actuator can also have a spool actuator that is coupled to the hydraulic control valve. The spool actuator can be configured to adjust the hydraulic control valve based at least in part on a desired skew condition of the CVT.

Another aspect of the invention relates to a skew control system for a continuously variable accessory drive (CVAD) having a group of traction planets. The skew control system includes a sensor configure to receive data from a CVAD. The skew control system can include a skew actuator configured to communicate with a control module. The skew actuator can be further configured to apply a skew condition to each of the traction planets in a CVAD. The skew control system can also include a skew controller in communication with the control module. The skew controller can be configured to determine a skew actuator command signal based at least in part on a signal from the sensor. The skew actuator command signal is configured to control an output speed of a CVAD.

BRIEF DESCRIPTION OF THE FIGURES

FIG. 7 is a cross-sectional Detail view A of certain components of the variator subassembly of FIG. 5.

FIG. 8 is a perspective view of a carrier retaining ring that can be used with the variator subassembly of FIG. 5.

FIG. 9 is a perspective view of an inventive embodiment of a clevis member that can be used with the CVT of FIG. 2.

FIG. 11 is a cross-sectional view of a traction planet assembly that can be used with the variator subassembly of FIG. 5.

FIG. 12A is a perspective view of an inventive embodiment of a leg that can be used in the traction planet assembly of FIG. 11.

FIG. 12B is a cross-section view A-A of the leg of FIG. 12A.

FIG. 13 is a cross-sectional perspective view of a traction sun assembly that can be used with the variator subassembly of FIG. 5.

FIG. 14 is an exploded, cross-sectional, perspective view of the traction sun assembly of FIG. 13.

FIG. 20B is a cross-sectional view of the carrier member of FIG. 20A.

FIG. 20C is a perspective view of the carrier member of FIG. 20A.

FIG. 21A is a plan detail view B of a radially offset slot of the carrier member of FIG. 20A.

FIG. 21B is a schematic illustration of the radially offset slot of FIG. 21A.

FIG. 21C is another schematic illustration of the radially offset slot of FIG. 21A.

FIG. 21D is yet another schematic illustration of the radially offset slot of FIG. 21A.

FIG. 21E is a plan view of another embodiment of a radially offset slot of the carrier member of FIG. 20A.

FIG. 21F is a schematic illustration of the radially offset slot of FIG. 21E.

FIG. 21G is another schematic illustration of the radially offset slot of FIG. 21E.

FIG. 21H is yet another schematic illustration of the radially offset slot of FIG. 21E.

FIG. 23 is a perspective view of an embodiment of a housing member that can be used with the CVT of FIG. 2 or FIG. 15.

FIG. 24 is another perspective view of the housing member of FIG. 23.

FIG. 36 is an exploded, perspective view of an embodiment of a traction planet assembly that can be used with the variator subassembly of FIG. 34.

FIG. 37 is a cross-sectional view of the traction planet assembly of FIG. 36.

FIG. 38 is a perspective view of an inventive embodiment of a carrier insert that can be used with the variator subassembly of FIG. 34.

FIG. 41 is a perspective view of an embodiment of a skew driver that can be used with the CVT of FIG. 30.

FIG. 42 is a cross-sectional view B-B of the skew driver of FIG. 41.

FIG. 46 is a partial cross-sectional perspective view of a traction sun assembly that can be used in the variator of FIG. 45.

FIG. 47 is a cross-sectional view of the traction sun assembly of FIG. 46.

FIG. 48 is a cross-sectional detail view C of the traction sun assembly of FIG. 46.

FIG. 49 is a cross-section view of certain components of a variator that can be used with the CVT of FIG. 2, FIG. 15, and/or FIG. 30.

FIG. 50 is a cross-sectional view of another embodiment of carrier members that can be used with the CVT of FIG. 2, FIG. 15, and/or FIG. 30.

FIG. 51 is a cross-section view C-C of the carrier members of FIG. 50.

FIG. 52 is a cross-sectional view of one more embodiment of carrier members that can be used with the CVT of FIG. 2, FIG. 15, and/or FIG. 30.

DETAILED DESCRIPTION OF CERTAIN INVENTIVE EMBODIMENTS

Figure 1:
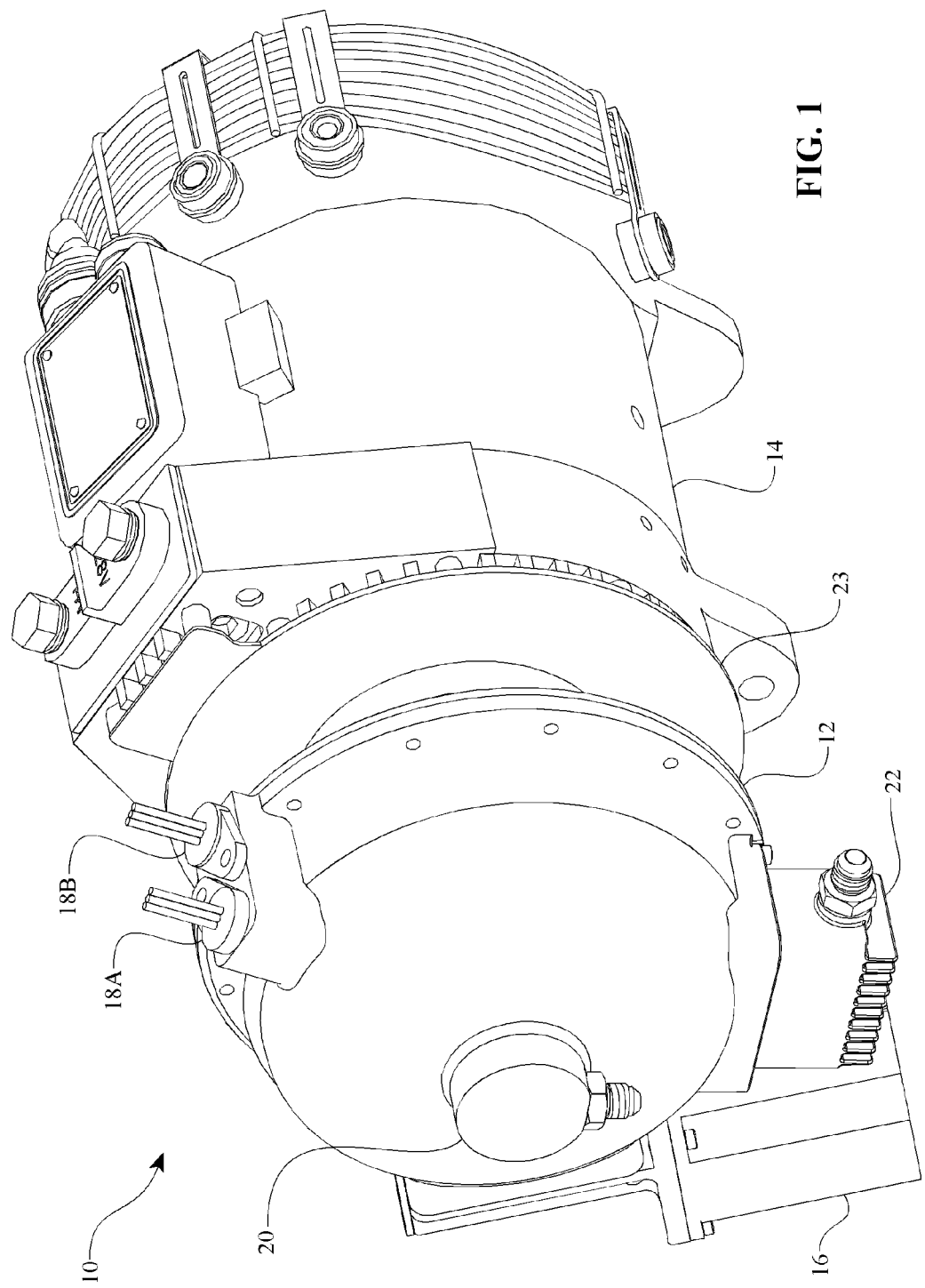
FIG. 1 is a perspective view of an inventive embodiment of a continuously variable accessory drive (CVAD) having a skew control system.

The preferred embodiments will be described now with reference to the accompanying figures, wherein like numerals refer to like elements throughout. The terminology used in the descriptions below is not to be interpreted in any limited or restrictive manner simply because it is used in conjunction with detailed descriptions of certain specific embodiments of the invention. Furthermore, embodiments of the invention can include several novel features, no single one of which is solely responsible for its desirable attributes or which is essential to practicing the inventions described. Certain CVT embodiments described here are generally related to the type disclosed in U.S. Pat. Nos. 6,241,636; 6,419,608; 6,689,012; 7,011,600; 7,166,052; U.S. patent application Ser. Nos. 11/243,484; 11/543,311; 12/198,402 and Patent Cooperation Treaty patent applications PCT/US2007/023315, PCT/IB2006/054911, PCT/US2008/068929, and PCT/US2007/023315, PCT/US2008/074496. The entire disclosure of each of these patents and patent applications is hereby incorporated herein by reference.

As used here, the terms "operationally connected," "operationally coupled", "operationally linked", "operably connected", "operably coupled", "operably linked," and like terms, refer to a relationship (mechanical, linkage, coupling, etc.) between elements whereby operation of one element results in a corresponding, following, or simultaneous operation or actuation of a second element. It is noted that in using said terms to describe inventive embodiments, specific structures or mechanisms that link or couple the elements are typically described. However, unless otherwise specifically stated, when one of said terms is used, the term indicates that the actual linkage or coupling may take a variety of forms, which in certain instances will be readily apparent to a person of ordinary skill in the relevant technology.

For description purposes, the term "axial" as used here refers to a direction or position along an axis that is parallel to a main or longitudinal axis of a transmission or variator. The term "radial" is used here to indicate a direction or position that is perpendicular relative to a longitudinal axis of a transmission or variator. For clarity and conciseness, at times similar components labeled similarly (for example, bearing 152A and bearing 152B) will be referred to collectively by a single label (for example, bearing 152).

It should be noted that reference herein to "traction" does not exclude applications where the dominant or exclusive mode of power transfer is through "friction." Without attempting to establish a categorical difference between traction and friction drives here, generally these may be understood as different regimes of power transfer. Traction drives usually involve the transfer of power between two elements by shear forces in a thin fluid layer trapped between the elements. The fluids used in these applications usually exhibit traction coefficients greater than conventional mineral oils. The traction coefficient (μ) represents the maximum available traction forces which would be available at the interfaces of the contacting components and is a measure of the maximum available drive torque. Typically, friction drives generally relate to transferring power between two elements by frictional forces between the elements. For the purposes of this disclosure, it should be understood that the CVTs described here may operate in both tractive and frictional applications. For example, in the embodiment where a CVT is used for a bicycle application, the CVT can operate at times as a friction drive and at other times as a traction drive, depending on the torque and speed conditions present during operation.

Embodiments of the invention disclosed here are related to the control of a variator and/or a CVT using generally spherical planets each having a tiltable axis of rotation that can be adjusted to achieve a desired ratio of input speed to output speed during operation. In some embodiments, adjustment of said axis of rotation involves angular displacement of the planet axis in a first plane in order to achieve an angular adjustment of the planet axis in a second plane, wherein the second plane is substantially perpendicular to the first plane. The angular displacement in the first plane is referred to here as "skew", "skew angle", and/or "skew condition". For discussion purposes, the first plane is generally parallel to a longitudinal axis of the variator and/or the CVT. The second plane can be generally perpendicular to the longitudinal axis. In one embodiment, a control system coordinates the use of a skew angle to generate forces between certain contacting components in the variator that will tilt the planet axis of rotation substantially in the second plane. The tilting of the planet axis of rotation adjusts the speed ratio of the variator. The aforementioned skew angle, or skew condition, can be applied in a plane substantially perpendicular to the plane of the page of FIG. 4, for example. Embodiments of transmissions employing certain inventive skew control systems for attaining a desired speed ratio of a variator will be discussed.

One aspect of the torque/speed regulating devices disclosed here relates to drive systems wherein a prime mover drives various driven devices. The prime mover can be, for example, an electrical motor and/or an internal combustion engine. For purposes of description here, an accessory includes any machine or device that can be powered by a prime mover. For purposes of illustration and not limitation, said machine or device can be a power takeoff device (PTO), pump, compressor, generator, auxiliary electric motor, etc. Accessory devices configured to be driven by a prime mover may also include alternators, water pumps, power steering pumps, fuel pumps, oil pumps, air conditioning compressors, cooling fans, superchargers, turbochargers and any other device that is typically powered by an automobile engine. As previously stated, usually, the speed of a prime mover varies as the speed or power requirements change; however, in many cases the accessories operate optimally at a given, substantially constant speed. Embodiments of the torque/speed regulating devices disclosed here can be used to control the speed of the power delivered to the accessories powered by a prime mover.

For example, in some embodiments, the speed regulators disclosed here can be used to control the speed of automotive accessories driven by a pulley attached to the crankshaft of an automotive engine. Usually, accessories must perform suitably both when the engine idles at low speed and when the engine runs at high speed. Often accessories operate optimally at one speed and suffer from reduced efficiency at other speeds. Additionally, the accessory design is compromised by the need to perform over a large speed range rather than an optimized narrow speed range. In many cases when the engine runs at a speed other than low speed, accessories consume excess power and, thereby, reduce vehicle fuel economy. The power drain caused by the accessories also reduces the engine's ability to power the vehicle, necessitating a larger engine in some cases.

In other situations, inventive embodiments of the torque/speed regulating devices disclosed here can be used to decrease or increase speed and/or torque delivered to the accessories for achieving optimal system performance. In certain situations, inventive embodiments of the torque/speed regulating devices disclosed here can be used to increase speed to the accessories when the prime mover runs at low speed and to decrease speed to the accessories when the prime mover runs at high speed. Thus, the design and operation of accessories can be optimized by allowing the accessories to operate at one, substantially favorable speed, and the accessories need not be made larger than necessary to provide sufficient performance at low speeds. The accessories can also be made smaller because the torque/speed regulating devices can reduce speed to the accessories when the prime mover runs at high speed, reducing the stress load the accessories must withstand at high rpm. Because the accessories are not subjected to high speeds, their expected service life can increase substantially. In some cases, smoother vehicle operation results because the accessories do not have to run at low or high speed. Further, a vehicle can operate more quietly at high speed because the accessories run at a lower speed.

The torque/speed regulators disclosed here can facilitate reducing the size and weight of the accessories as well as the prime mover, thereby reducing the weight of the vehicle and thus increasing fuel economy. Further, in some cases, the option to use smaller accessories and a smaller prime mover lowers the cost of these components and of the vehicle. Smaller accessories and a smaller prime mover can also provide flexibility in packaging and allow the size of the system to be reduced. Embodiments of the torque/speed regulators described here can also increase fuel economy by allowing the accessories to operate at their most efficient speed across the prime mover operating range. Finally, the torque/speed regulators increase fuel economy by preventing the accessories from consuming excess power at any speed other than low.

Figure 2:
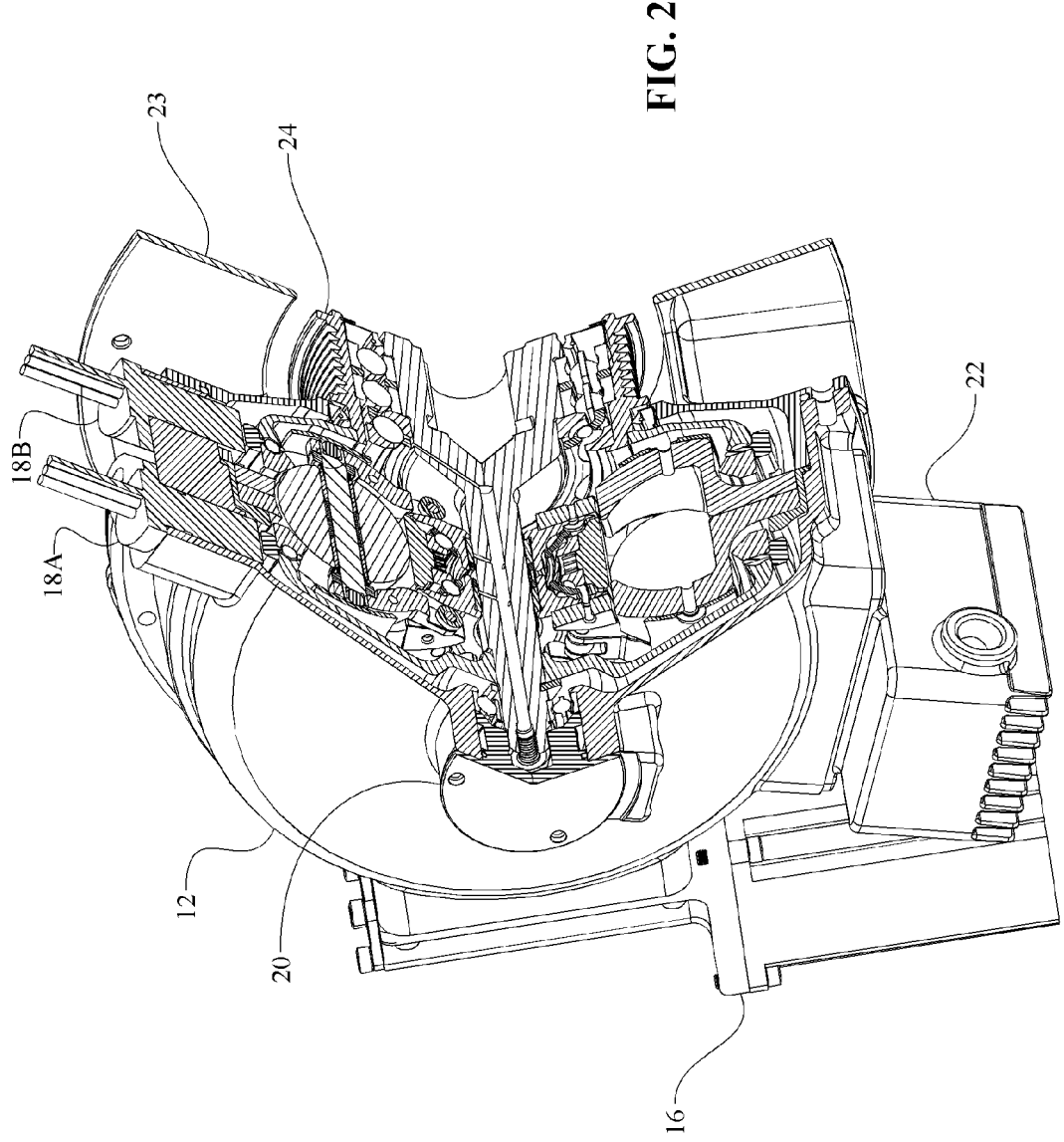
FIG. 2 is a cross-sectional perspective view of a continuously variable transmission (CVT) that can be used with the CVAD of FIG. 1.

Referring now to FIGS. 1 and 2, in one embodiment a continuously variable accessory drive (CVAD) 10 can include a continuously variable transmission (CVT) 12 coupled to an alternator/generator 14. In one embodiment, the alternator/generator 14 can be, as an illustrative example, a C. E. Niehoff 1224-3 alternator. In one embodiment, the CVT 12 can be provided with a skew actuator 16 and a set of speed sensors 18 that are configured to communicate with a skew-based control system (for example, FIGS. 25-29). The CVT 12 can be provided with a lubrication manifold 20 and a lubrication sump 22 that are adapted to couple to a lubrication and cooling system (not shown). In one embodiment, a pulley cover 23 can be arranged between the CVT 12 and the alternator/generator 14. The pulley cover 23 can provide structural attachment of the CVT 12 to the alternator/generator 14, among other things. The pulley cover 23 is adapted to radially surround a drive pulley 24. The drive pulley 24 is configured to receive a power input, for example, from a belt (not shown). In some embodiments, the pulley cover 23 is adapted to provide access to the pulley for a belt.

Figure 3:
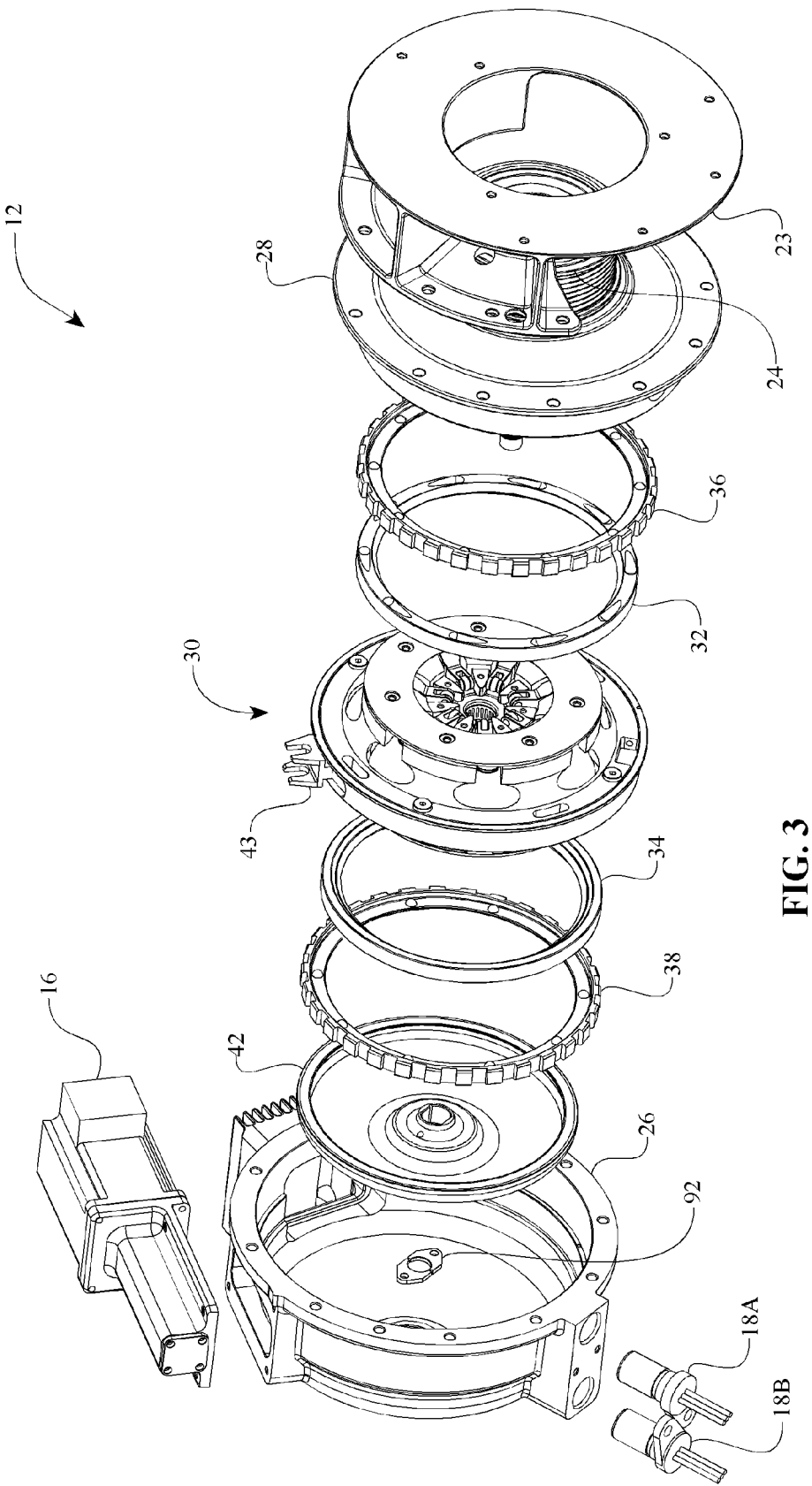
FIG. 3 is an exploded perspective view of the CVT of FIG. 2.
Figure 4:
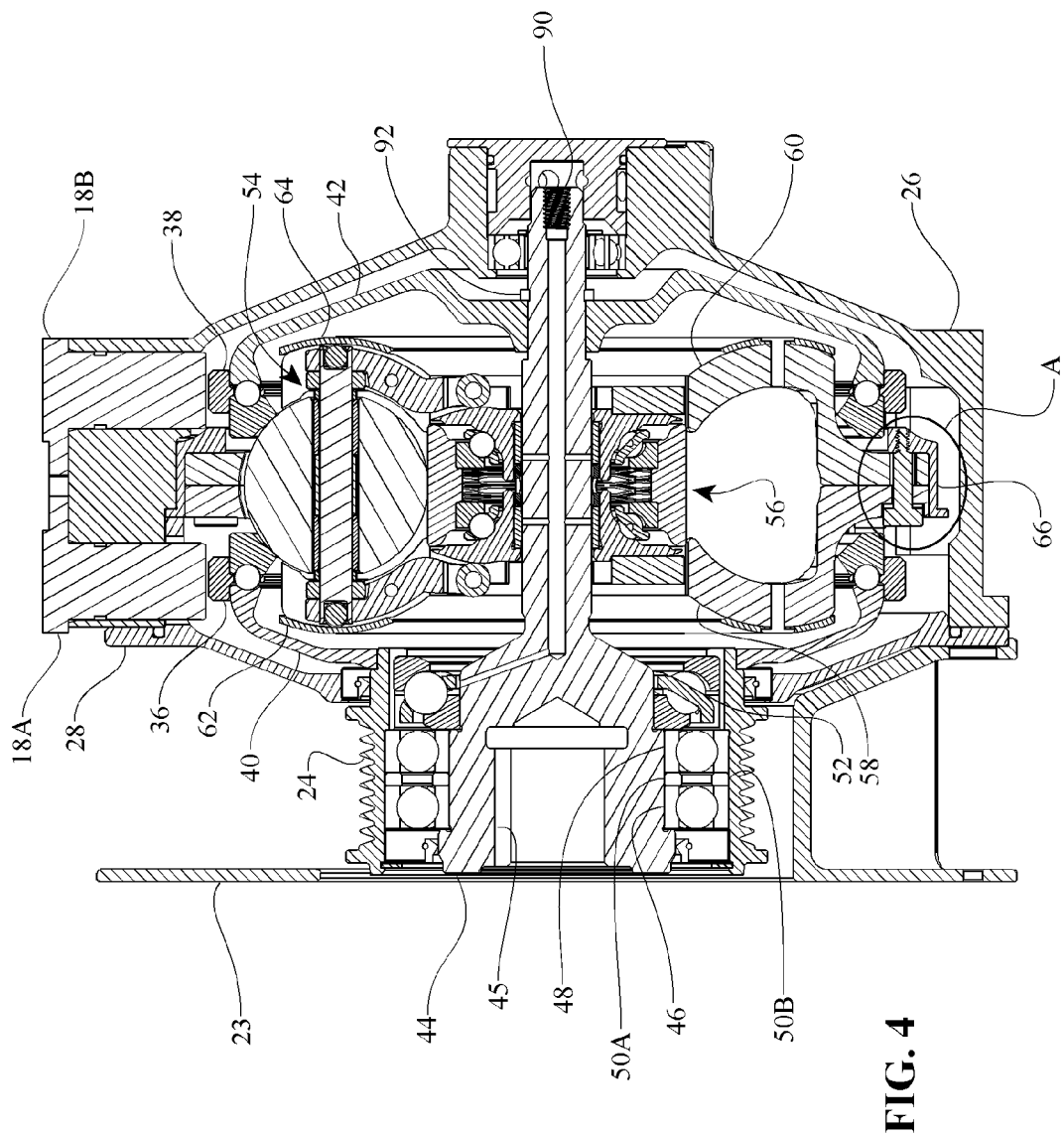
FIG. 4 is a cross-sectional view of the CVT of FIG. 2.

Turning now to FIGS. 3-4, in one embodiment, the CVT 12 includes a housing 26 adapted to couple to a housing cap 28. The housing 26 and the housing cap 28 are configured to operably couple to, and substantially enclose, a variator subassembly 30. The variator subassembly 30 is coupled to a first traction ring 32 and a second traction ring 34. The first traction ring 32 is coupled to a first load cam roller assembly 36. The second traction ring 34 can be coupled to a second load cam roller assembly 38. In one embodiment, the first load cam roller assembly 36 is coupled to an input cam driver 40. The second load cam roller assembly 38 can be coupled to an output driver 42. In one embodiment the input cam driver 40 is coupled to the drive pulley 24. Each of the load cam roller assemblies 36 and 38 can be provided with a toothed and/or notched outer periphery that can be arranged to be in proximity to each of the speed sensors 18. The variator subassembly 30 can be operably coupled to the skew actuator 16 via a clevis 43.

In one embodiment, the CVT 12 can be provided with a main shaft 44 that is substantially aligned with a longitudinal axis of the CVT 12. The main shaft 44 can be provided with a keyed bore 45 that can be adapted to receive, for example, a shaft of the alternator/generator 14. The drive pulley 24 can be radially supported on one end of the main shaft 44 with a first bearing 46 and a second bearing 48. In some embodiments, a shim 50 can be placed between the bearings 46, 48. In one embodiment, the CVT 12 is provided with a thrust bearing 52 coupled to the main shaft 44. The thrust bearing 52 can couple to the pulley 24. The thrust bearing 52 can be adapted to provide axial support for, and react axial forces from, certain components of the CVT 12. The first and second bearings 46, 48 and the shim 50 can be configured to share a portion of the axial loads induced on the thrust bearing 52. The sharing of the axial loads can extend the life of the thrust bearing 52 and can prevent overload of the thrust bearing 52, among other things.

In one embodiment, the variator subassembly 30 is provided with a number of traction planet assemblies 54 arranged angularly about the main shaft 44. The variator subassembly 30 can have a traction sun assembly 56 arranged coaxial about the main shaft 44. The traction sun assembly 56 can be configured to operably couple to each of the traction planet assemblies 54. The traction sun assembly 56 can be arranged radially inward of each of the traction planet assemblies 54. In some embodiments, the traction sun assembly 56 is adapted to move axially along the main shaft 44. In one embodiment, the variator subassembly 30 can include a first carrier member 58 operably coupled to a second carrier member 60. The first and second carrier members 58, 60 are adapted to support each of the traction planet assemblies 54. In one embodiment, the first carrier member 58 can be coupled to a first carrier member cap 62. The second carrier member 60 can be coupled to a second carrier member cap 64. The carrier member caps 62 and 64 can be configured to operably couple to the traction planet assemblies 54. The carrier member caps 62, 64 can be configured to react forces generated during the shifting of the CVT 12.

In some embodiments, the carrier member caps 62, 64 are integral with the carrier members 58, 60, respectively. In other embodiments, the carrier member caps 62, 64 are rigidly and permanently attached to the carrier members 58, 60. In one embodiment, the carrier member caps 62, 64 are separate components from the carrier members 58, 60 to enable the use of different materials for the components. For example, the carrier member 58 can be made of aluminum while the carrier member cap 62 can be made of steel. As a separate component, the carrier member cap 62 may also facilitate assembly of the traction planet assemblies 54 with the carrier member 58. In some embodiments, configuring the carrier member caps 62 as separate components can simplify the manufacture of the first and second carrier members 58, 60.

Figure 5:
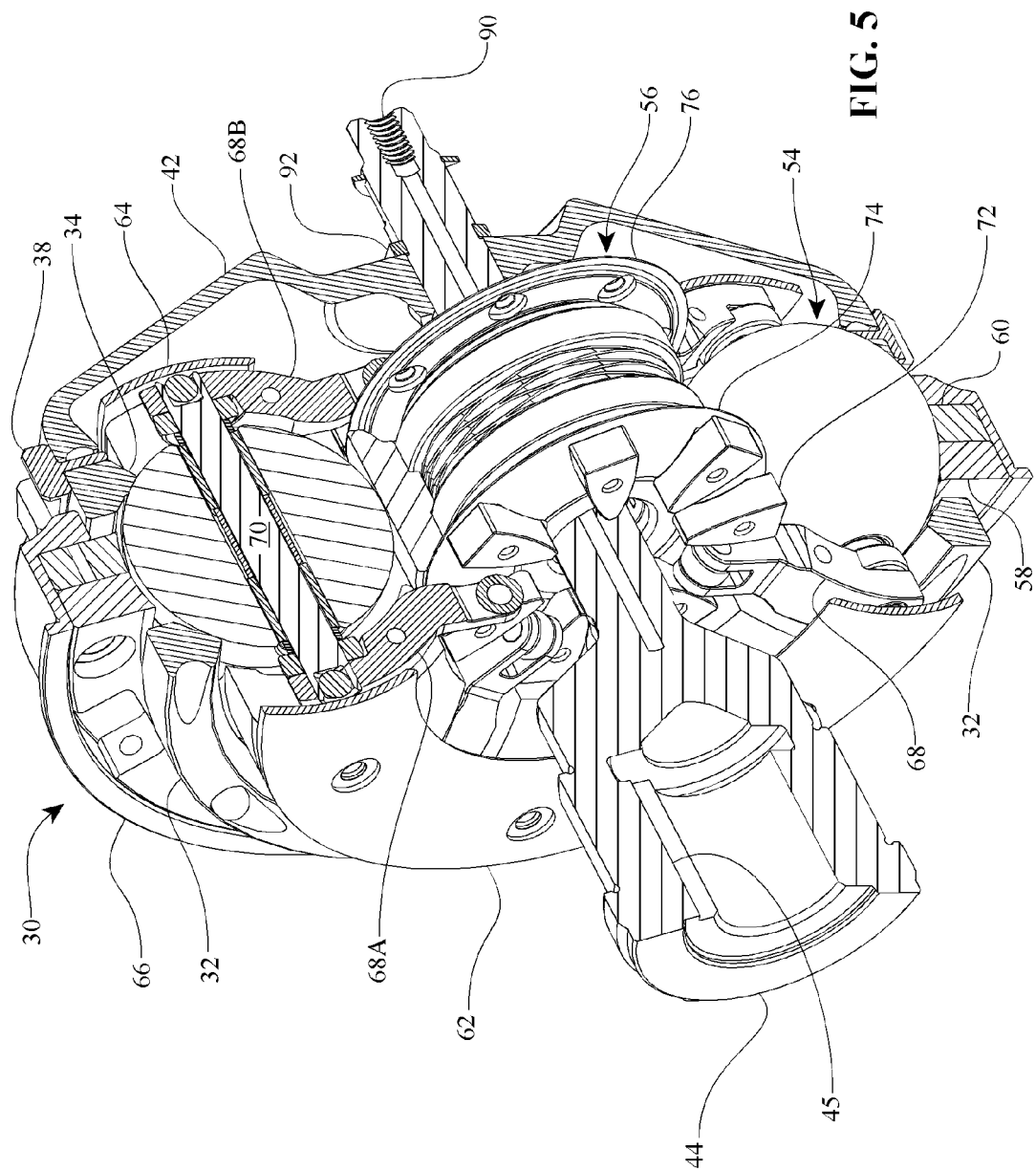
FIG. 5 is a partial cross-sectional perspective view of a variator subassembly that can be used in the CVT of FIG. 2.

Referring to FIG. 5, in one embodiment the variator subassembly 30 includes a carrier retaining ring 66 that is adapted to couple to the first and second carrier members 58, 60. The carrier retaining ring 66 can be coupled to the housing 26 and can be configured to be substantially non-rotatable with respect to the longitudinal axis of the CVT 12. In one embodiment, each of the traction planet assemblies 54 includes at least one leg 68 that is operably coupled to a planet axle 70. Each of the legs 68 is adapted to operably couple to the traction sun assembly 56. In one embodiment, the traction sun assembly 56 includes a number of anti-rotation inserts 72. The anti-rotation inserts 72 can be configured to substantially flank each of the legs 68. The anti-rotation inserts 72 can be coupled to a first shift cam 74. In some embodiments, the anti-rotation inserts 72 can be coupled to a second shift cam 76. In yet other embodiments, the anti-rotation inserts 72 can be coupled to both the first and second shift cams 74 and 76. The anti-rotation inserts 72 can substantially prevent the shift cams 74 and 76 from rotating during operation of the CVT 12.

During operation of the CVT 12, a power input can be coupled to the drive pulley 24 with, for example, a belt or chain (not shown). The drive pulley 24 transfers the power input to the input cam driver 40, which transfers power to the first traction ring 32 via the first load cam roller assembly 36. The first traction ring 32 transfers the power to each of the traction planet assemblies 54. Each of the traction planet assemblies 54 delivers power to the second traction ring 34 which transfers power to the output cam driver 42 via the second load cam roller assembly 38. In one embodiment, the output driver 42 delivers power to the main shaft 44. The main shaft 44 can be coupled to, for example, the alternator/generator 14 via the keyed bore 45. A shift in the ratio of input speed to output speed, and consequently a shift in the ratio of input torque to output torque, is accomplished by tilting the rotational axis of the traction planet assemblies 54 to a tilt angle sometime referred to here as gamma (γ). The tilting of the rotational axis of the traction planet assemblies 54 occurs in substantially in the plane of the page of FIG. 4, for example. The tilting of the rotational axis of the traction planet assemblies 54 can be accomplished by rotating the second carrier member 60 with respect to the first carrier member 58 about the longitudinal axis. This relative angular rotational displacement is sometimes referred to here as β. The rotation of the second carrier member 60 with respect to the first carrier member 58 induces a skew angle, a condition sometimes referred to here as a "skew condition", on each of the traction planet assemblies 54. The skew angle can be applied in a plane that is substantially parallel to the longitudinal axis of the CVT 12 (for example, a plane perpendicular to the plane of the page of FIG. 4). In one embodiment, the skew angle can be in the range of 0 degrees to 15 degrees. Typically the skew angle is in the range of 0 degrees to 8 degrees.

Figure 6:
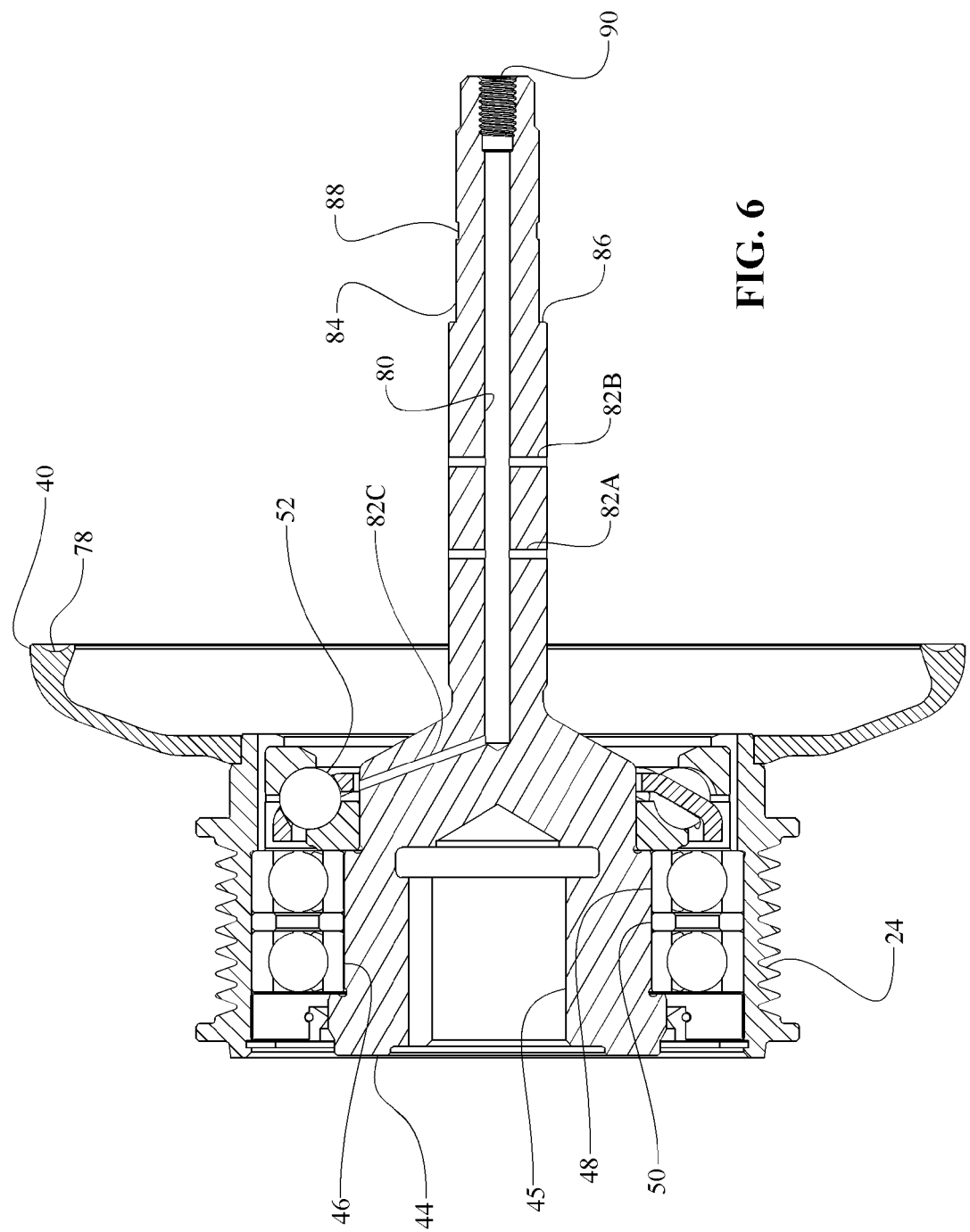
FIG. 6 is a cross-sectional view of certain components of the CVT of FIG. 2.

Turning now to FIG. 6, in one embodiment the input cam driver 40 is coupled to the drive pulley 24. The input cam driver 40 can be provided with a number of roller reaction surfaces 78 that can be adapted to operably couple to the first load cam roller assembly 36. The main shaft 44 can be provided with a central lubricant passage 80 that feeds a number of lubricant distribution passages 82A, 82B, 82C. The lubricant distribution passages 82A, 82B, 82C intersect the central lubricant passage 80 and extend radially outward from the center of the main shaft 44. In one embodiment, the main shaft 44 can be provided with a splined portion 84 that is configured to couple to the output cam driver 42. The main shaft 44 can be provided with a shoulder 86 in proximity to one end of the splined portion 84. The main shaft 44 can be provided with a groove 88 on an opposite end of the spline portion 84. In some embodiments, the main shaft is provided with a threaded bore 90 on one end. During assembly of the CVT 12, the variator subassembly 30 is arranged coaxially with the main axle 44. An assembly tool (not shown) is coupled to the threaded bore 90. The assembly tool threads into the bore 90 and applies force on the output ring 42 to facilitate the clamping of the output ring 42 and the input ring 40 to a predetermined axial force. At least one clip 92 (FIGS. 3 and 4) can be placed in the groove 88 to retain the axial preload setting once the assembly tool is removed. In some embodiments, shims (not shown) can be placed in the groove 88 with the clip 92 to retain the axial preload setting.

Passing now to FIG. 7, in one embodiment the first carrier member 58 is adapted to couple to the second carrier member 60 via a shoulder bolt 94. The shoulder bolt 94 can be configured to couple to the carrier retaining ring 66. In one embodiment, a shim 96 can be placed under the head of the shoulder bolt 94. The thickness of the shim 96 can be selected to adjust the axial force and/or the axial gap between the first carrier member 58 and the second carrier member 60 upon tightening of the shoulder bolt 94. In one embodiment, it is desirable to have minimal axial force between the first carrier member 58 and the second carrier member 60 so that the second carrier member 60 can rotate with respect to the first carrier member 58 about the longitudinal axis while having minimal axial displacement or play between the first carrier member 58 and the second carrier member 60. In some embodiments, the carrier retaining ring 66 is coupled to the housing 26 and is substantially non-rotatable about the longitudinal axis. In other embodiments, a thrust bearing (not shown) can be provided between the first and second carrier members 58 and 60.

Referring now to FIG. 8, in one embodiment the carrier retaining ring 66 is a substantially annular ring having a reaction face 98 formed on an inner circumference. The carrier retaining ring 66 can be provided with a flange 100 located on an outer circumference of the substantially annular ring. The flange 100 can be configured to couple to, for example, the housing 26. In one embodiment, the carrier retaining ring 66 is provided with an opening 102 placed substantially between the reaction face 98 and the flange 100. In some embodiments, the reaction face 98 is formed with a number of fastening holes 104 that are adapted to receive the shoulder bolts 94. The flange 100 can be provided with a fastening hole 106 that can be configured to secure the carrier retaining ring 66 to the housing 24.

Passing now to FIG. 9, in one embodiment the clevis 43 can be provided with at least one fork 110. The fork 110 extends from a base 112. The base 112 can be provided with a set screw land 114. The clevis 43 can be coupled to the carrier member 58 or to the second carrier member 60. In one embodiment, the base 112 is attached to one of the first or second carrier members 58, 60 with, for example, a set screw (not shown). The fork 110 can be arranged to extend through the opening 102. During operation of the CVT 12 and the actuator 16 can be coupled to the fork 110 to facilitate a change in ratio of the CVT 12. In one embodiment, the change in ratio of the CVT 12 is accomplished by rotating the second carrier member 60 with respect to the first carrier member 58. In some embodiments, the change in ratio of the CVT 12 is accomplished by rotating the first carrier member 58 with respect to the second carrier member 60.

Figure 10:
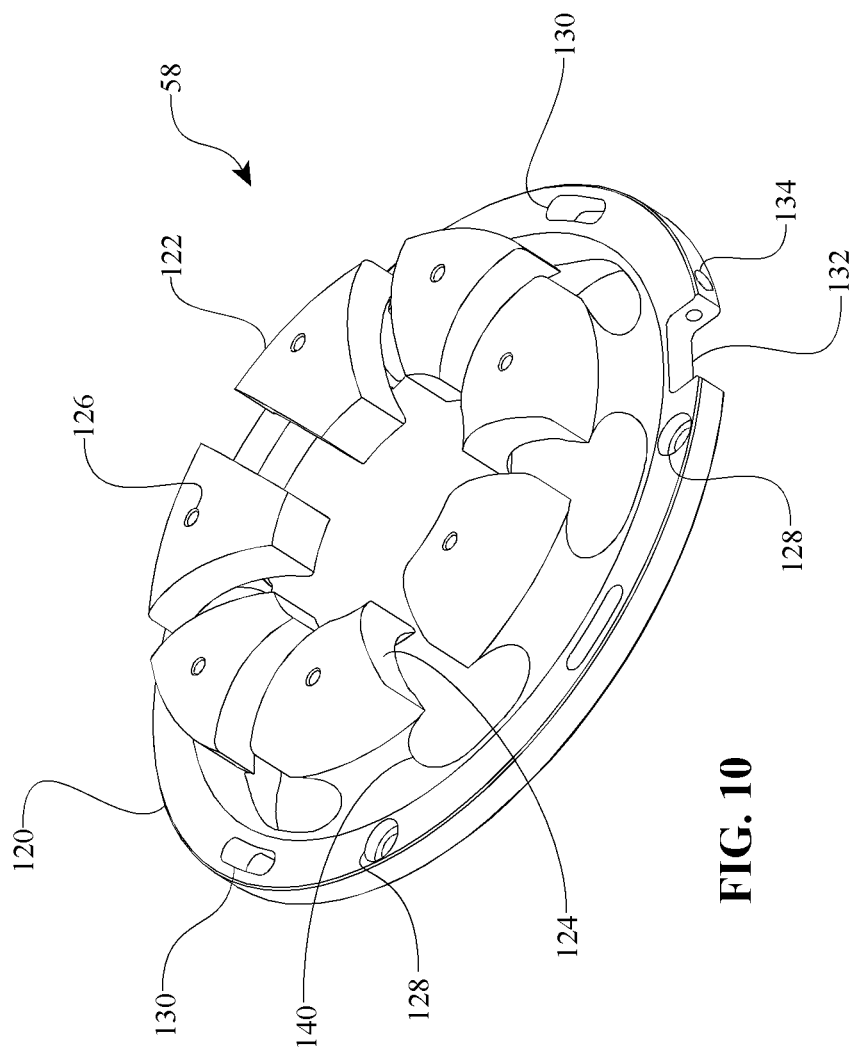
FIG. 10 is a perspective view of an inventive embodiment of a carrier member that can be used with the variator subassembly of FIG. 5.

Turning now to FIG. 10, in one embodiment, the carrier member 58 can be a substantially bowl-shaped body having a flange 120. A number of support fingers 122 can extend radially inward from the flange 120 to thereby form a cavity of the bowl-shaped body. Each finger 122 is flanked on each side by a reaction surface 124. Each finger can also be provided with a fastening hole 126. The fastening hole 126 can facilitate the coupling of the first carrier member cap 62 to the carrier member 58. In one embodiment, the flange 120 included a number of holes 128 and slots 130. In some embodiments, the holes 128 and the slots 130 can be arranged about the flange 120 so that each hole 128 is flanked by the slots 130 and vice versa. In one embodiment, the carrier member 58 and the carrier member 60 are substantially similar. Once assembled the holes 128 on the carrier member 58 can align with the slots 130 of the carrier member 60 and vice versa. The flange 120 can be provided with a notch 132. The notch 132 can be adapted to couple to the clevis 43. The flange 120 can be provided with a set screw hole 134 arranged to intersect the notch 132 and the outer periphery of the flange 120. The set screw hole 134 can facilitate the coupling of the clevis 43 to the carrier member 58 with, for example, a set screw (not shown). The carrier member 58 can have a number of clearance openings 140. In one embodiment, the clearance openings 140 are configured to cooperate with each of the traction planet assemblies 54.

Referring now to FIGS. 11-12B, in one embodiment the traction planet assembly 54 includes a substantially spherical traction planet 150 having a central bore. The traction planet 150 can be operably coupled to the planet axle 70 with bearings 152. In some embodiments, a spacer 154 can be operably coupled to the planet axle 70 and located between the bearings 152. The planet axle 70 can be coupled on each end to the legs 68. A skew reaction roller 156 can be operably coupled to each of the planet axle 70. A shift reaction ball 158 can be pressed into a bore 160 formed on each end of the planet axle 70. A shift cam roller 162 can be operably coupled to each leg 68. The shift cam roller 162 can be coupled to a shift cam roller axle 164. The shift cam roller axle 164 can be coupled to a shift cam roller axle bore 166 formed on the leg 68. The shift cam roller 162 can be positioned in a slot 168 formed on one end of the leg 68. In one embodiment, the slot 168 is substantially perpendicular to the shift cam roller axle bore 166. The leg 68 can be provided with a planet axle bore 170. The planet axle bore 170 can be formed on the leg 68 at an end opposite that of the slot 166. The leg 68 can be provided with a skew reaction roller clearance shoulder 172. The leg 68 can have a side 174 that has an angular taper when viewed in the plane of the page of FIG. 12B. In one embodiment, the side 174 has an angle 176 with respect to vertical in the range of about 5 degrees to 10 degrees.

Turning now to FIGS. 13 and 14, in one embodiment the traction sun assembly 56 includes a traction sun 180 that is operably coupled to the first and second shift cams 74 and 76. The shift cams 74 and 76 can be arranged to substantially flank the traction sun 180. In one embodiment, the shift cams 74 and 76 are substantially similar. The traction sun assembly 56 can include a set of bearings 184. Each bearing 184 can be coupled to a bearing race 186. The bearing race 186 is configured to couple to a shoulder 188 formed on an inner diameter of the traction sun 180. In one embodiment, the bearing races 186 are coupled to a spring 190. The spring 190 can facilitate the axial preload of the bearing races 186 thereby applying an axial preload force to the bearings 184 and the shift cams 74 and 76. The traction sun assembly 56 can be provided with bearings 192. The bearings 192 can be adapted to facilitate the coupling of the traction sun assembly 56 to the main shaft 44. In one embodiment, the traction sun assembly includes a number of anti-rotation spacers 194. Each anti-rotation spacer 194 can be coupled to the shift cams 182. In one embodiment, the shift cams 74 and 76 are provided with a number of seats 196 configured to couple to the anti-rotation spacers 194. Each anti-rotation spacer 194 is provided with a hole 198. Each seat 196 is provided with a hole 200. The holes 198 and 200 are adapted to facilitate the coupling of the anti-rotation inserts 194 to the shift cam 74. In one embodiment, the shift cam 74 can be a generally disc-shaped body having a shoulder 202 extending from one end. A bearing race 204 can be formed on the shoulder 202. The bearing race 204 can be adapted to couple to the bearing 184. In some embodiments, the shift cam 74 can be provided with a cam surface 206. The cam surface 206 can have a substantially curved profile when viewed in cross-section in the plane of FIG. 14.

Figure 15:
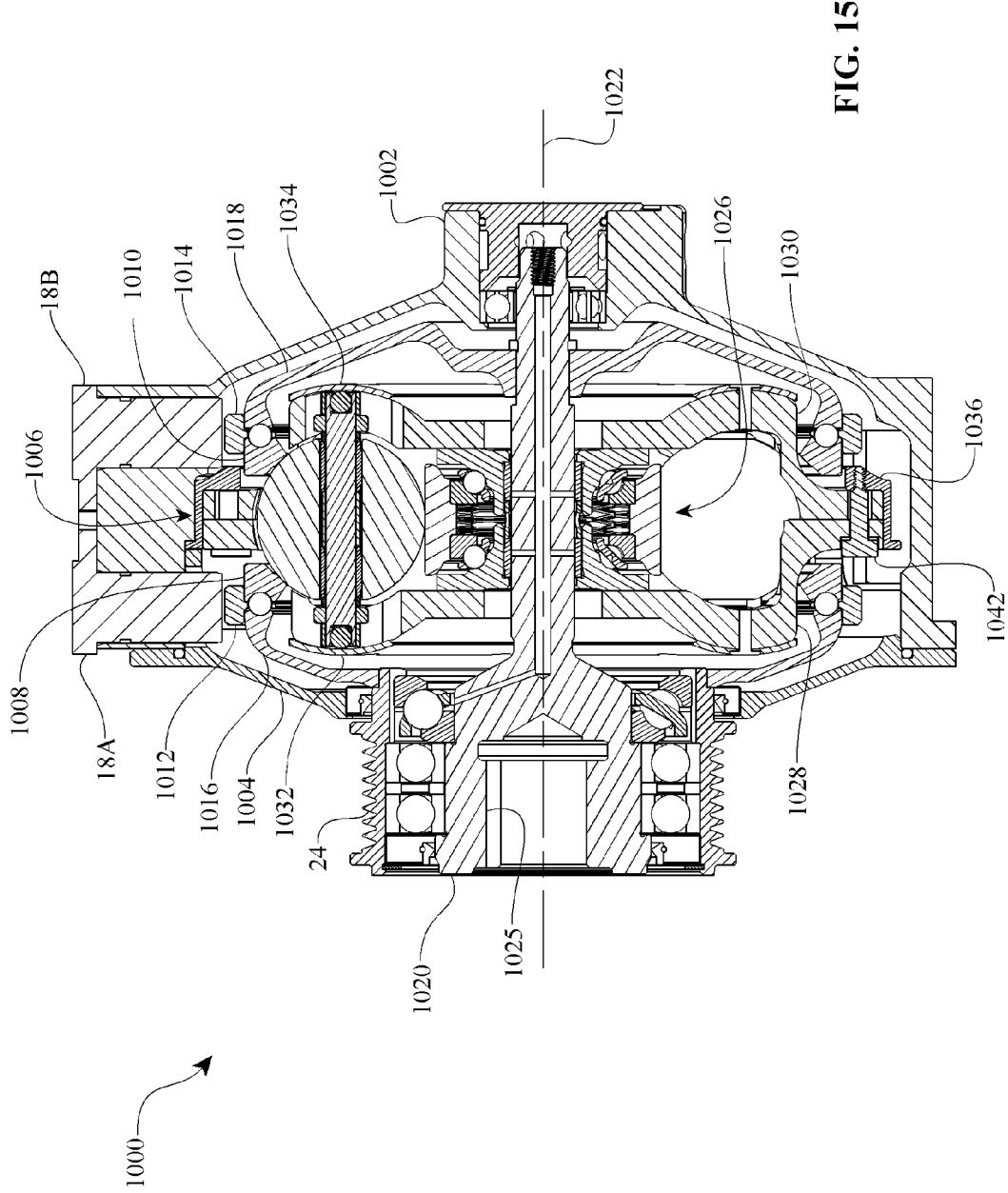
FIG. 15 is a cross-sectional view of an inventive embodiment of a continuously variable transmission (CVT) having a skew-based control system.
Figure 17:
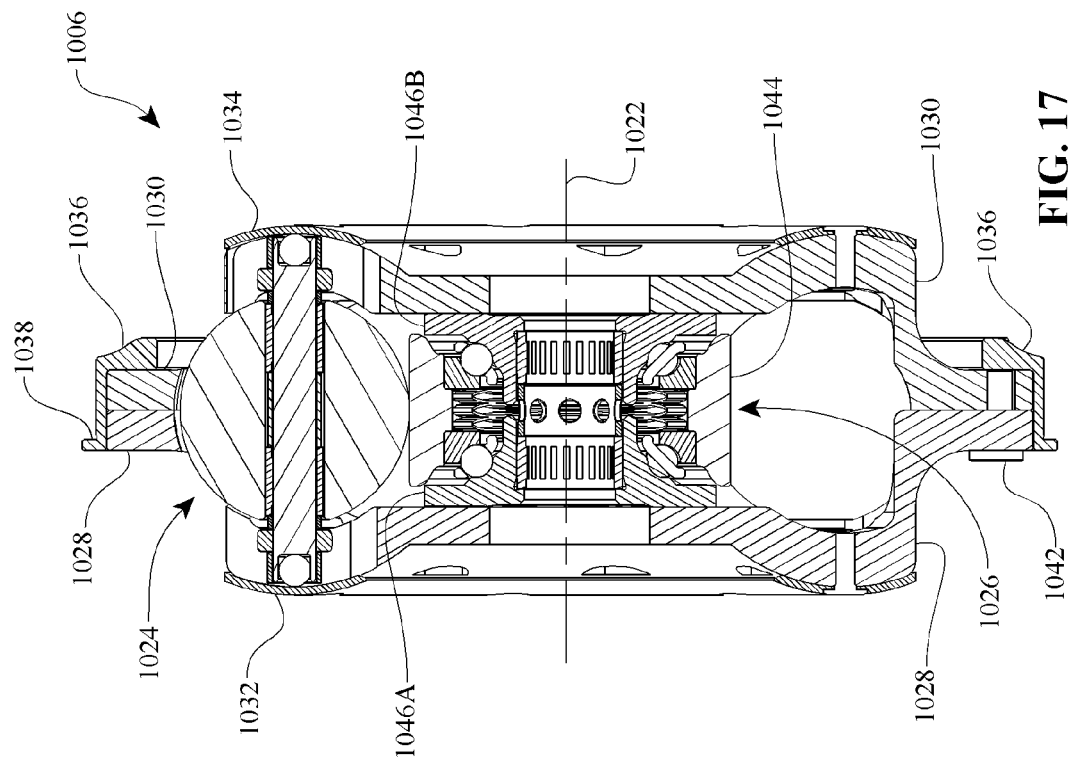
FIG. 17 is a cross-sectional view of the variator subassembly of FIG. 16.
Figure 16:
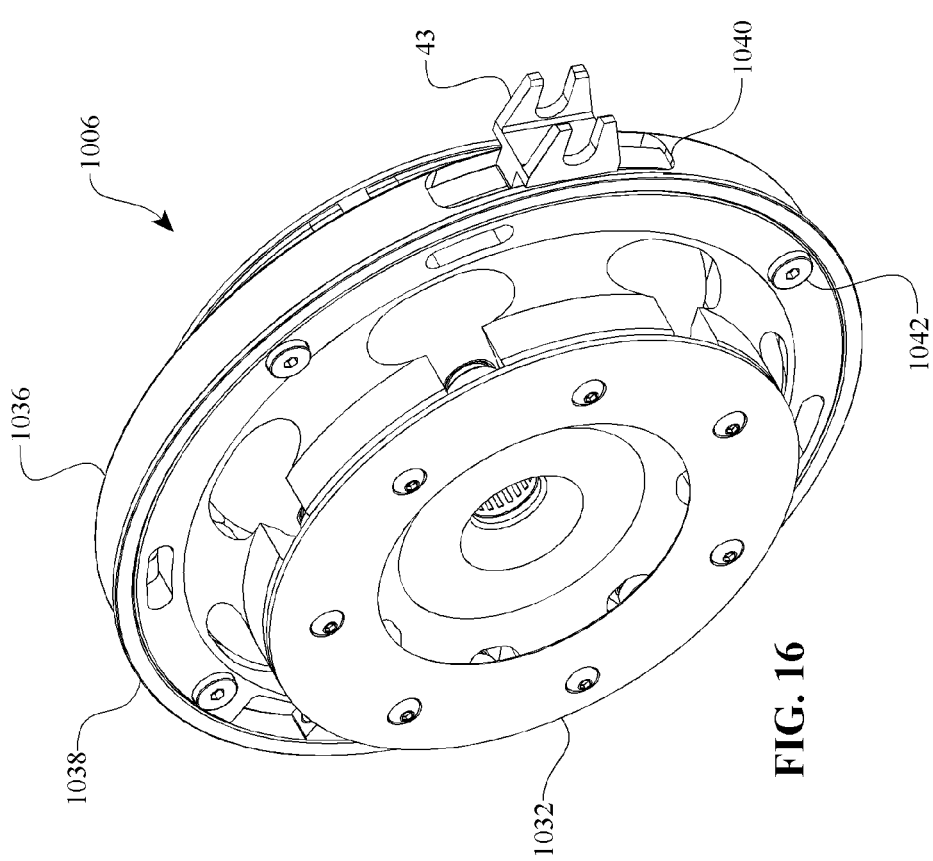
FIG. 16 is a perspective view of a variator subassembly of the CVT of FIG. 15.
Figure 18:
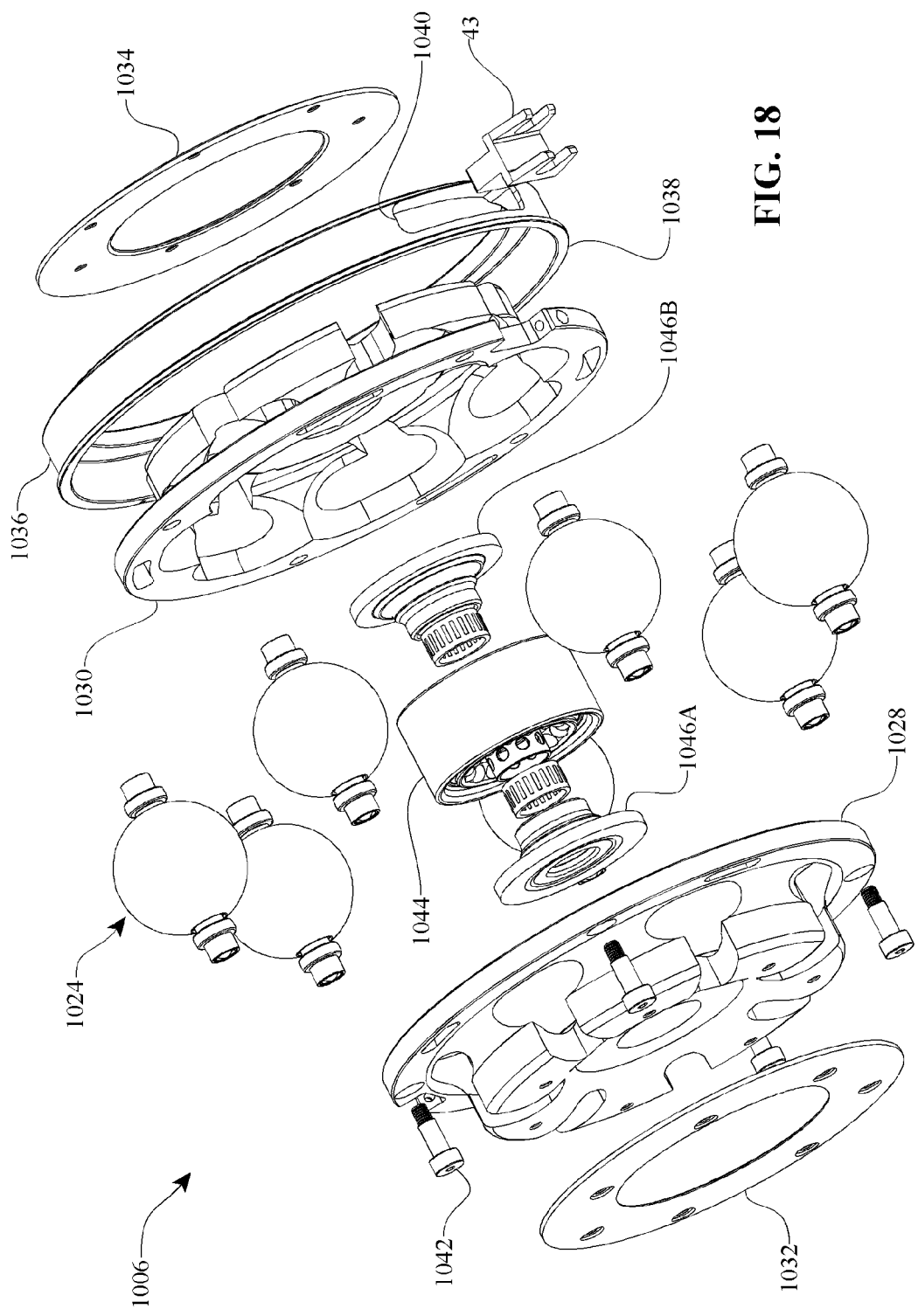
FIG. 18 is an exploded-perspective view of the variator subassembly of FIG. 16.

Passing now to FIG. 15, in one embodiment a CVT 1000 can include a housing 1002 coupled to a housing cap 1004. The housing 1002 and the housing cap 1004 can be configured to operably couple to, and substantially enclose, a variator subassembly 1006. The variator subassembly 1006 can be coupled to a first traction ring 1008 and a second traction ring 1010. The first traction ring 1008 can be coupled to a first load cam roller assembly 1012. The second traction ring 1010 can be coupled to a second load cam roller assembly 1014. In one embodiment, the first load cam roller assembly 1012 is coupled to an input cam driver 1016. The second load cam roller assembly 1014 can be coupled to an output driver 1018. In one embodiment, the input cam driver 1016 can be coupled to the drive pulley 24. Each of the load cam roller assemblies 1012 and 1014 can be provided with a toothed and/or notched outer periphery that can be configured to be in proximity to each of the speed sensors 18. The variator subassembly 1006 can be operably coupled to the skew actuator 16 with the clevis 43 (FIG. 3). In one embodiment, the CVT 1000 can be provided with a main shaft 1020 that is substantially aligned with a longitudinal axis 1022 of the CVT 1000. The main shaft 1020 can be provided with a keyed bore 1025 that can be adapted to receive, for example, a shaft of the alternator/generator 14, or any other accessory device. The drive pulley 24 can be operably coupled to the main shaft 1020. In one embodiment, the coupling of the drive pulley 24 to the main shaft 1020 is substantially similar to the coupling of the drive pulley 24 to the main shaft 44.

Referring to FIGS. 15-18, in one embodiment, the variator subassembly 1006 can include a number of traction planet assemblies 1024 arranged angularly about the longitudinal axis 1022. The variator subassembly 1006 can include a traction sun assembly 1026 arranged coaxial about the main shaft 1020. The traction sun assembly 1026 can be located radially inward of each of the traction planet assemblies 1024. In one embodiment, the traction sun assembly 1026 can be adapted to be substantially axially fixed along the main shaft 1020. In one embodiment, the variator subassembly 1006 can include a first carrier member 1028 operably coupled to a second carrier member 1030. The first and second carrier members 1028, 1030 are configured to support each of the traction planet assemblies 1024.

In one embodiment, the first carrier, member 1028 is coupled to a first carrier member cap 1032. The second carrier member 1030 can be coupled to a second carrier member cap 1034. The carrier member caps 1032, 1034 are adapted to operably couple to the traction planet assemblies 1024. In one embodiment, the variator subassembly 1006 can include a carrier retaining ring 1036. The carrier retaining ring 1036 can be configured to couple to the first and second carrier members 1028, 1030. The carrier retaining ring 1036 can be provided with a flange 1038. The flange 1038 can be coupled to the housing 1002 and can be configured to be substantially non-rotatable with respect to the longitudinal axis 1022. The carrier retaining ring 1036 can be provided with an opening 1040 through which the clevis 43 can be placed to couple to, for example, the second carrier member 1030. A number of shoulder bolts 1042 can be provided to operably couple the first and second carrier members 1028, 1030 to the carrier retaining ring 1036. The coupling of the first and second carrier members 1028, 1030 to the carrier retaining ring 1036 can be configured in a substantially similar manner as the coupling of the first and second carrier members 58, 60 to the carrier retaining ring 66 (FIG. 7).

During operation of the CVT 1000, a power input can be coupled to the drive pulley 24 with, for example, a belt or chain (not shown). The drive pulley 24 can transfer the power input to the input cam driver 1016. The input cam driver 1016 can transfer power to the first traction ring 1008 via the first load cam roller assembly 1012. The first traction ring 1008 transfers the power to each of the traction planet assemblies 1024. Each of the traction planet assemblies 1024 delivers power to the second traction ring 1010. The second traction ring 1010 delivers power to the output driver 1018. The output driver 1018 is configured to deliver power to the main shaft 1020 so that power can be transferred out of the CVT 1000. A shift in the ratio of the input speed to the output speed, and consequently a shift in the ratio of the input torque to the output torque can be accomplished by tilting the rotational axis of the traction planet assemblies 1024 to a tilt angle ($\gamma$). The tilting of the rotational axis of the traction planet assemblies 1024 can be facilitated by rotating the first carrier member 1028 with respect to the second carrier member 1030. The rotation of the first carrier member 1028 with respect to the second carrier member 1030 generates a skew condition of the type generally described in U.S. patent application Ser. No. 12/198,402 filed on Aug. 26, 2008, the entire disclosure of which is hereby incorporated herein by reference. A skew condition can be applied to the traction planet assemblies 1024 by two events, occurring separately or in combination. One event is a change in the angular rotation ($\beta$) of the carrier member 1028, and the other event is a change in the tilt angle ($\gamma$) of the traction planet assemblies 1024. For a constant angular rotation ($\beta$) of the carrier member 1028, the skew condition can approach a zero skew-angle condition as the rotational axis of the traction planet assemblies 1024 tilts. The rotational axis of the traction planet assemblies 1024 can stop tilting when a zero skew-condition is reached. The zero-skew condition is an equilibrium condition for the tilt angle ($\gamma$).

Referring still to FIGS. 15-18, in one embodiment the traction sun assembly 1026 can include a traction sun 1044 operably coupled to first and second traction sun supports 1046 with bearings, for example. The traction sun supports 1046 can be adapted to contact the first and second carrier members 1028, 1030. The first and second carrier members 1028, 1030 can constrain and/or limit axial motion of the traction sun assembly 1044. In one embodiment, the traction sun supports 1046 can be coupled to wave springs (not shown) positioned between the traction sun supports 1046 and the first and second carrier members 1028, 1030. The wave springs can energize during operation of the CVT 1000 to provide a minimum axial travel to the traction sun assembly 1026. In some embodiments, the traction sun supports 1046 are coupled to the first and second carrier members 1028 and 1030 via a screw lead (not shown) so that a rotation of either the first or second carrier members 1029, 1030 tends to axially displace the traction sun assembly 1026. In other embodiments, an actuator (not shown) can be coupled to the traction sun assembly 1026 to facilitate a change in the axial position of the traction sun assembly 1026 based at least in part on the tilt angle ($\gamma$) of the traction planet assemblies 1024 of the CVT 1000. In yet other embodiments, an actuator (not shown) can be coupled to the traction sun assembly 1026 to facilitate a change in the axial position of the traction sun assembly 1026 that is substantially random with respect to the tilt angle ($\gamma$) of the traction planet assemblies 1024. The aforementioned methods of axially positioning the traction sun assembly 1026 can increase the expected life of the traction sun 1044, for example, by distributing operational loads over a larger area of the surface of the traction sun 1044 than would otherwise be achievable.

Figure 22:
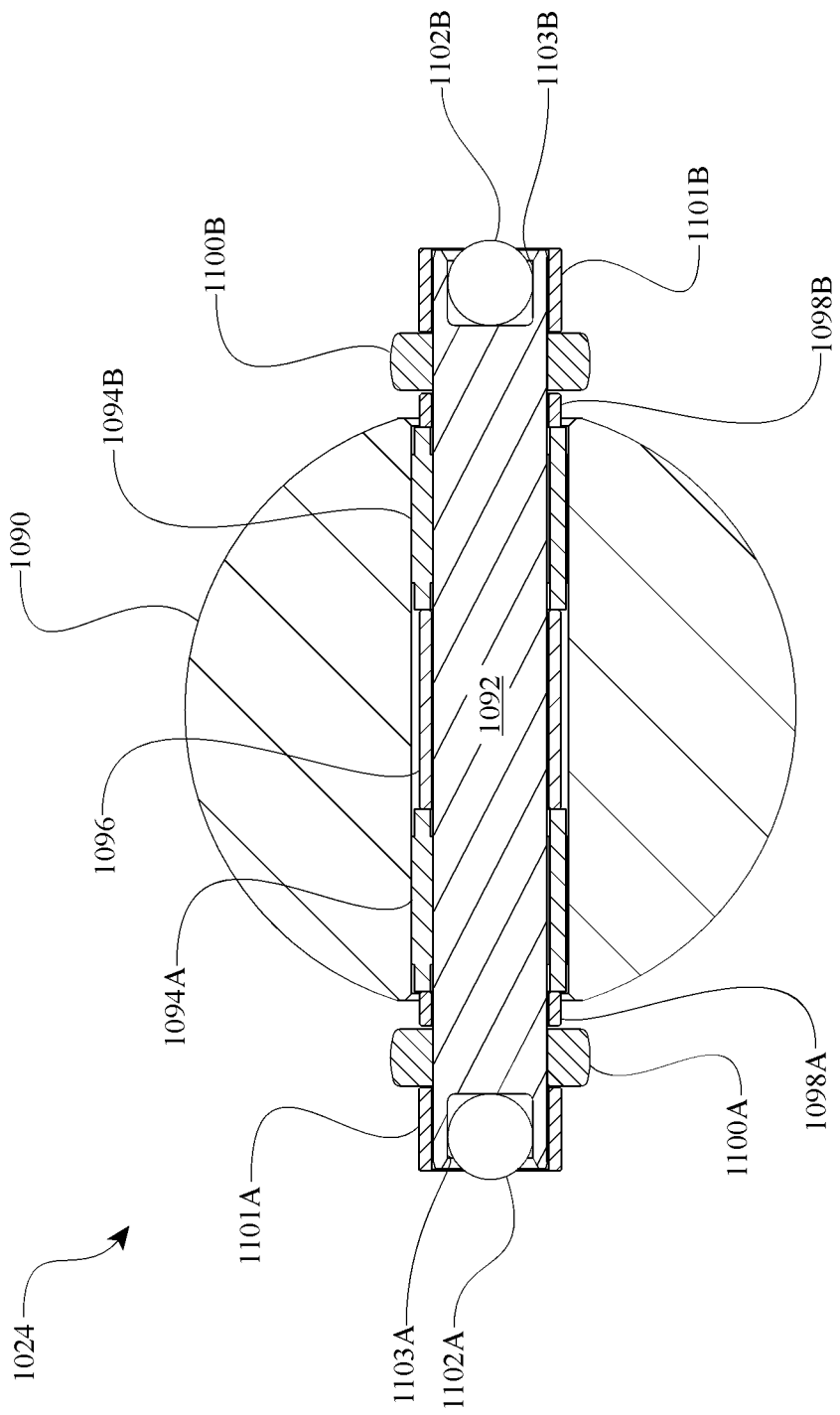
FIG. 22 is a cross-sectional view of an embodiment of a traction planet assembly that can be used with the variator subassembly of FIG. 16.

Turning now to FIG. 19-21C, in one embodiment the first carrier member 1028 can be provided with a number of radially offset slots 1050. The second carrier member 1030 can be provided with a number of radial slots 1052. The radial slots 1052 are shown in dashed lines in FIG. 19. The radially offset slots 1050 and the radial slots 1052 are sized to accommodate certain components of the traction planet assemblies 1024, for example a skew reaction roller 1100 (FIG. 22). For discussion purposes, the arrangement of the radially offset slots 1050 with respect to the radial slots 1052 can be shown as projections in a plane perpendicular to the longitudinal axis 1022. The longitudinal axis 1022 is perpendicular to the plane of the page of FIG. 19. A radial construction line 1054 can be shown perpendicular to the longitudinal axis 1022. The construction line 1054 radially passes through a center 1056 of the first and second carrier members 1028, 1030. Likewise, a second construction line 1058 can pass through the center 1056. The construction line 1058 substantially bisects the radial slots 1052. A radially offset construction line 1060 is parallel to the construction line 1054. The radially offset construction line 1060 is perpendicular to the longitudinal axis 1022. An offset distance 1062 separates the radially offset construction line 1060 from the construction line 1054. In one embodiment, the offset distance 1062 is in the range of about 5 mm to 20 mm. In some embodiments, the offset distance 1062 is between 16-18 mm. In some embodiments, the offset distance 1062 is proportional to the width of the radially offset slot 1050. For example, the offset distance 1062 can be about equal to the width of the radially offset slot 1050. The radially offset construction line 1060 substantially bisects the radially offset slot 1050. The radially offset construction line 1060 intersects the second construction line 1058 to thereby form an angle 1064 (sometimes referred to here as $\psi$). In one embodiment, the angle ($\psi$) 1064 can be in the range of 5 degrees to 45 degrees for conditions where the traction planet subassemblies 1024 are at a tilt angle ($\gamma$) substantially equal to zero. Preferably, the angle ($\psi$) 1064 is in the range of 10 degrees to 20 degrees when the traction planet subassemblies 1024 are at a tilt angle ($\gamma$) substantially equal to zero.

Figure 19:
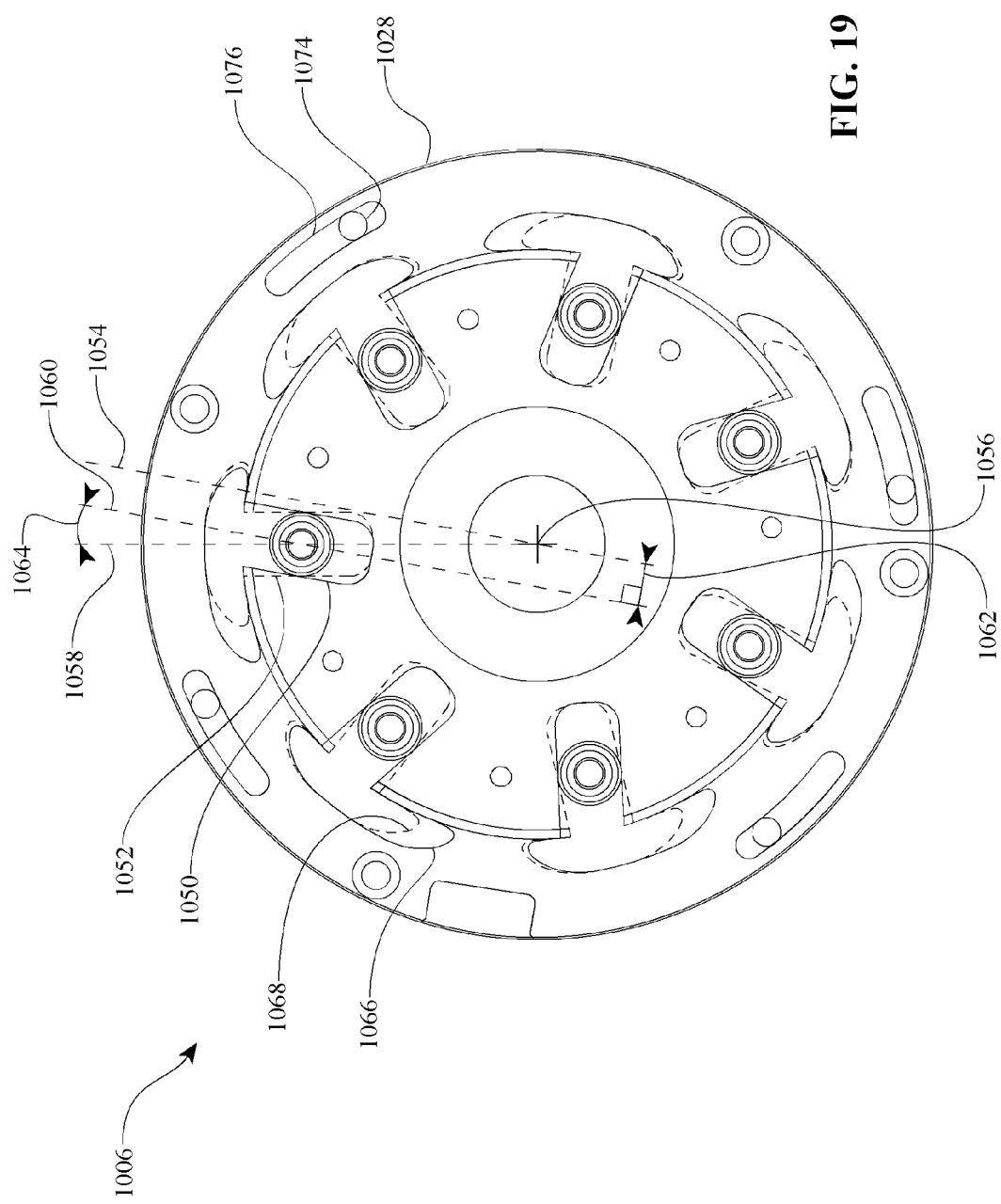
FIG. 19 is a plan view of the variator subassembly of FIG. 16.

Referring still to FIG. 19, in one embodiment the first carrier member 1028 can be provided with a number of clearance openings 1066. The second carrier member 1030 can be provided with a number of clearance openings 1068. The clearance openings 1066, 1068 can be adapted to provide clearance to each of the traction planet assemblies 1024. In one embodiment, the clearance opening 1066 is larger than the clearance opening 1068 to provide additional clearance to the traction planet assembly 1024 during operation of the CVT 1000.

Figure 20A:
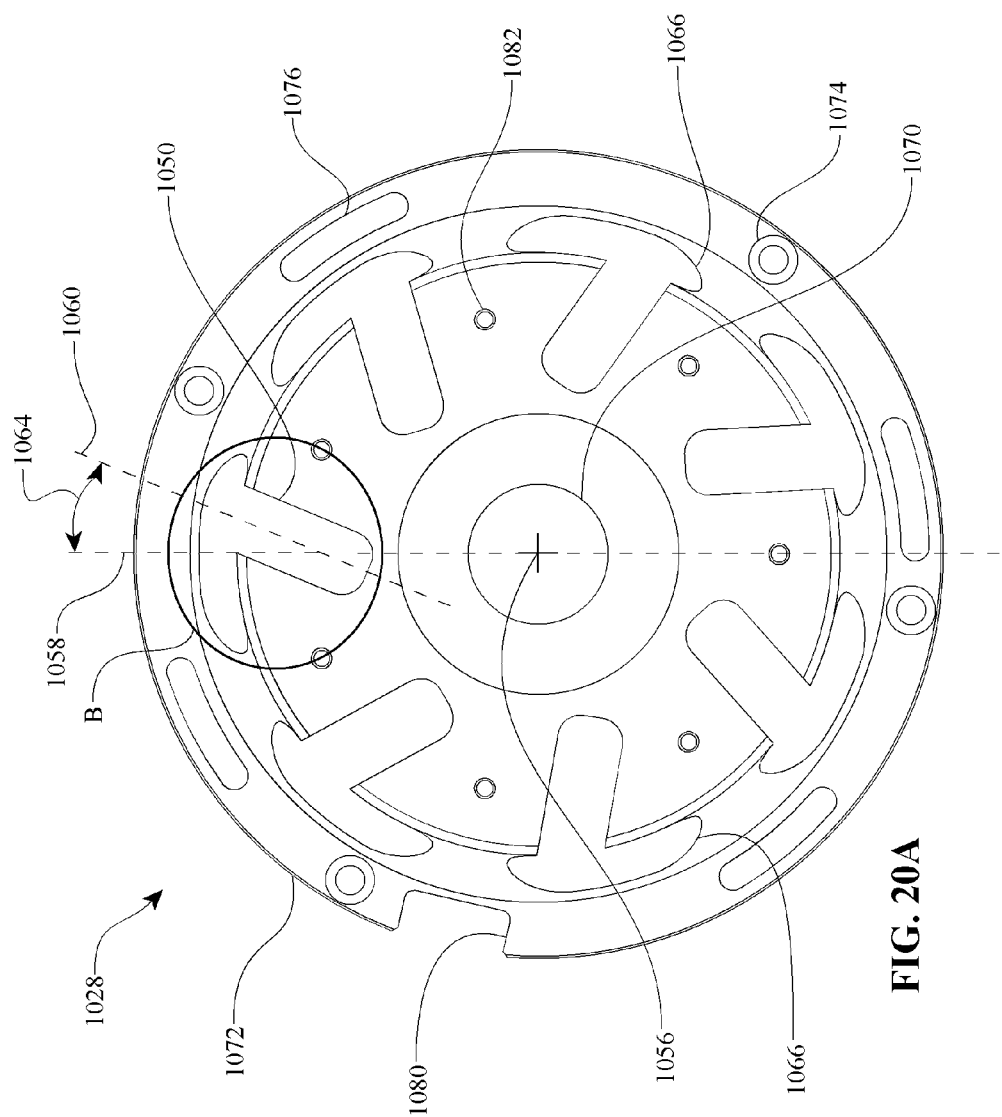
FIG. 20A is a plan view of an inventive embodiment of a carrier member that can be used with the variator subassembly of FIG. 16.

Referring now to FIGS. 20A-20C, in one embodiment the first carrier member 1028 can be a substantially bowl-shaped body having a central bore 1070 and a flange 1072 about the outer periphery of the bowl-shaped body. The flange 1072 can be provided with a number of holes 1074 and a number of slots 1076. The holes 1074 and the slots 1076 can be adapted to facilitate the coupling of the first carrier member 1028 to the second carrier member 1030 with, for example, the shoulder bolts 1042, in such a manner as to allow relative rotational displacement between the carrier members 1028, 1030 while providing axial constraint. The first carrier member 1028 can be provided with a reaction shoulder 1078 arranged about the central bore 1070. In one embodiment, the reaction shoulder 1078 can be configured to contact the traction sun support 1046. The flange 1072 can be provided with a notch 1080. The notch 1080 can be adapted to facilitate the coupling of the first carrier member 1028 to the clevis 43. The first carrier member 1028 can be provided with a number of holes 1082 located on a bottom face of the bowl-shaped body. The holes 1082 can be arranged to facilitate the coupling of the first carrier member cap 1032 to the first carrier member 1028. In one embodiment, each radial slot 1050 is provided with a reaction surface 1084. The reaction surfaces 1084 are configured to facilitate the coupling of the first carrier member 1028 to the traction planet assemblies 1024.

Referring to FIGS. 21A-21D, the construction line 1058 can form the angle ($\psi$) 1064 with the offset construction line 1060. During operation of the CVT 1000, the carrier members 1028, 1030 can be rotated about the longitudinal axis 1022. The offset construction line 1060 follows the first carrier member 1028 and the construction line 1058 follows the second carrier member 1030. For clarity, the construction lines 1058 and 1060 are depicted in FIGS. 21B-21D for three angular rotational positions about the longitudinal axis of, for example, the second carrier member 1030 with respect to the first carrier member 1028 (this relative angular rotational position is sometimes referred to here as β). As the carrier members 1028, 1030 are rotated relative to each other, the angle (ψ) 1064 can change and an intersection location 1063 can move radially relative to the construction line 1058. For example, an angle 10640 depicted in FIG. 21B is smaller than an angle 10641 depicted in FIG. 21D. The angle 10640 is formed between the construction line 1058 and the construction line 1060 when then tilt angle (γ) is less than zero. The angle 10641 is formed between the construction line 1058 and the construction line 1060 when the tilt angle (γ) is greater than zero. In some embodiments, location of the carrier members 1028, 1030 may be reversed in the CVT 1000. Such a reversal may alter the relationship embodied in FIG. 21. The intersection location 1063 can be shown at the intersection between the offset construction line 1060 and the construction line 1058. The intersection location 1063 generally corresponds to a skew angle equal to zero, or a "zero-skew condition", for the traction planet subassemblies 1024 at a constant tilt angle (γ). The amount of change of the angle (ψ) 1064 is sometimes an indication of the stability of the tilt angle (γ) of the traction planet assemblies 1024 during operation. A high value for the angle (ψ) 1064 tends to be more stable and exhibit slower shifting than a low angle that tends to be less stable and exhibits faster shifting.

Referring specifically now to FIG. 21E-21H, in one embodiment a radially offset slot 1051 can have a curved profile that generally follows a construction line 1059. In some embodiments, the carrier member 1028 can be provided with the radially offset slots 1051. The curvature of the construction line 1059, and consequently the curvature of the radially offset slot 1051, can be configured to provide the desired control stability and response of the CVT 1000. For illustrative purposes, a construction line 1061 can be shown tangent to the construction line 1059 at an intersection location 1065. The intersection location 1065 is generally at the intersection between the construction line 1058 and the construction line 1059. The angle (ψ) 1064 is shown in FIG. 21E between the construction line 1058 and the construction line 1061. In some embodiments, the curvature of the construction line 1059 can be arranged to provide a constant angle (ψ) 1064 between the construction lines 1058 and 1061 as the carrier member 1028 is rotated relative to carrier member 1030 by the angle β about the longitudinal axis. For clarity, the construction lines 1058, 1059, and 1061 are depicted in FIGS. 21F-21H for three angular rotational positions (β). As the carrier members 1028, 1030 are rotated relative to each other, the angle (ψ) 1064 remains constant and the intersection location 1065 can move radially relative to the construction line 1058. In some embodiments, the angle (ψ) 1064 may vary arbitrarily between the tilt angle (γ) conditions depicted from FIG. 21F through FIG. 21H. The variation on the construction angle 1064 may be chosen to optimize control conditions of the CVT 1000. The resulting path of the construction line 1059 can be formulated using techniques available to those skilled in the relevant technology.

Turning now to FIG. 22, in one embodiment the traction planet assembly 1024 includes a substantially spherical planet 1090 having a central bore. The planet 1090 can be operably coupled to a planet axle 1092 with, for example, bearings 1094. In one embodiment, a spacer 1096 can be placed between the bearings 1094. In some embodiments, the spacer 1096 is integral with the bearings 1094. The bearings 1094 can be retained on the planet axle 1092 with rings 1098. In some embodiments, the rings 1098 can be integral with the bearing 1094. In one embodiment, the traction planet assembly 1024 can include a skew reaction roller 1100 coupled to each end of the planet axle 1092. The skew reaction roller 1100 can be retained on the planet axle 1092 with a collar 1101. In one embodiment, the collar 1101 can be attached to the planet axle 1092 with a press fit or other suitable means of attachment. In other embodiments, the collar 1101 can be restrained by the carrier caps 1032 and 1034 (FIG. 15). Each end of the planet axle 1092 can be adapted to receive a shift reaction ball 1102. In one embodiment, the shift reaction ball 1102 is pressed into a hole 1103 formed on each end of the planet axle 1092. In some embodiments, the shift reaction ball 1102 can contact the first carrier member cap 1032 or the second carrier member cap 1034 during operation of the CVT 1000.

Passing now to FIGS. 23 and 24, in one embodiment the housing 1002 can be a substantially bowl-shaped body 1109 having a flange 1110 formed on a first end and a lubricant supply hub 1112 formed on a second end. The flange 1110 can be configured to couple to a support structure, for example, the pulley cover 23. The lubricant supply hub 1112 can be provided with a lubricant passage 1113. The lubricant passage 1113 can be adapted to couple to an external pump (not shown). The housing 1002 can be provided with a sensor mounting hub 1114 located on the outer periphery of the bowl-shaped body 1009. The sensor mounting hub 1114 can facilitate the mounting of, for example, the speed sensors 18. The speed sensor 18 can be inserted into an access bore 1115 to facilitate the placement of the speed sensor 18 in proximity to the load cam roller assembly 1012. In one embodiment, the housing 1002 can include a lubricant reservoir 1116 attached to the outer periphery of the bowl-shaped body 1009 at a mounting interface 1117. The lubricant reservoir 1116 can be provided with a number of fins 1118. The fins 1118 can facilitate the transfer of heat from a lubricant to the ambient air during operation of, for example, the CVT 12. The lubricant reservoir 1116 can also be provided with a lubricant passage 1119. In some embodiments, the lubricant passage 1119 is adapted to couple to an external pump (not shown). In one embodiment, the housing 1002 can be provided with an actuator mounting hub 1120 located on the outer periphery of the bowl-shaped body 1009. The actuator mounting hub 1120 can be configured to attach to, for example, the actuator 16. The actuator mounting hub can be adapted to facilitate the coupling of the actuator 16 to, for example, the clevis 43.

Figure 25:
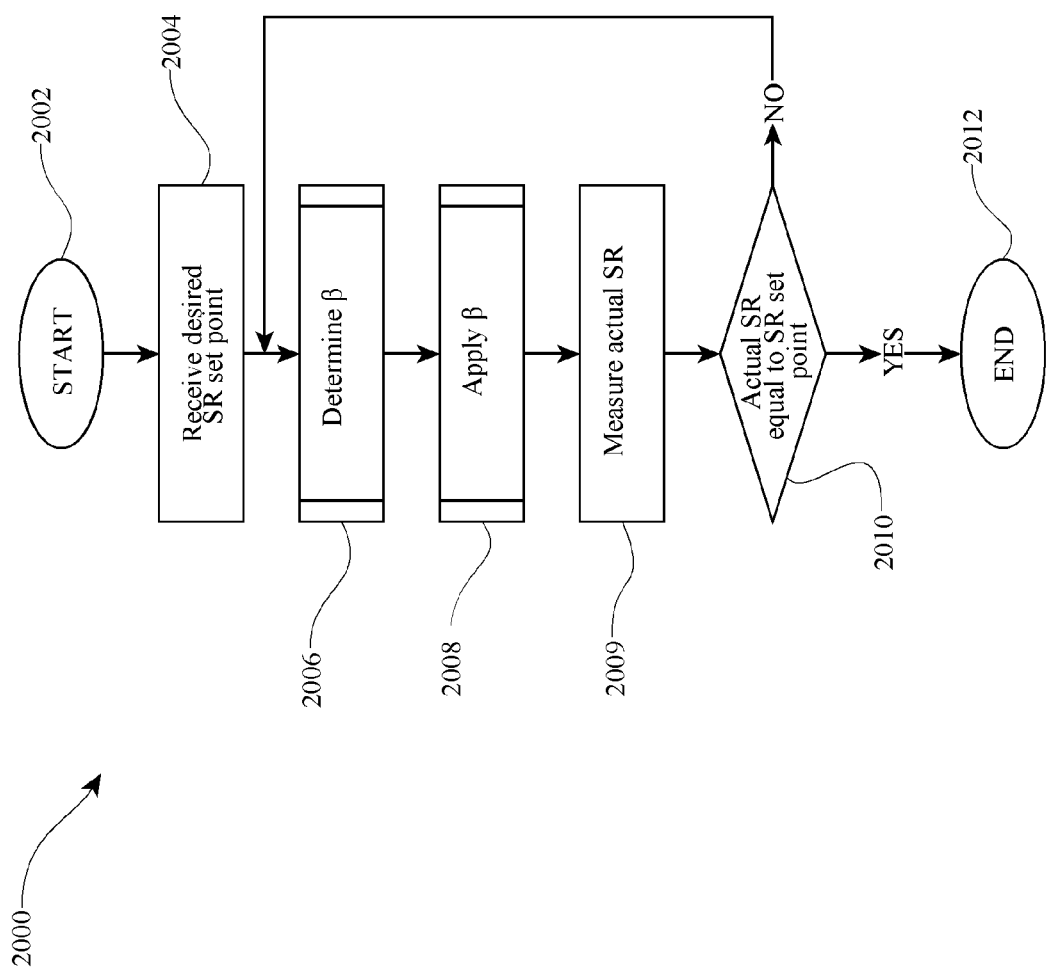
FIG. 25 is a flow chart of a skew-based control process that can be used with the CVT of FIG. 2 or FIG. 15.

Referring now to FIG. 25, in one embodiment a skew-based control process 2000 can be implemented on, for example, a microprocessor in communication with power electronics hardware of the CVT 1000. In some embodiments, the skew-based control process 2000 can be implemented on a microprocessor in communication with the CVT 12 or other CVT embodiments described herein. The skew-based control process 2000 begins at a block 2002. The skew-based control process 2000 then proceeds to a block 2004 where a desired speed ratio (SR) set point of the CVT 1000 is received. In one embodiment the desired SR set point is received from a user. In some embodiments, the desired SR setpoint is received from predetermined map residing in memory of a controller (for example, see FIG. 28A). The skew-based control process 2000 continues to a block 2006 where an angular rotation about the longitudinal axis of, for example, the second carrier member 1030 with respect to the first carrier member 1028 (β) is determined. Next, the skew-based control process 2000 moves to an actuator subprocess 2008 where the angular rotation (β) is applied to the carrier member 1028, for example. Upon completion of the actuator subprocess 2008, the skew-based control process 2000 proceeds to a block 2009 where the actual SR of the CVT 1000 is measured. In one embodiment, the actual SR of the CVT 1000 can be determined by measuring the speed of, for example, the load cam roller assemblies 1012 and 1014, or any other component indicative of input speed and output speed to the CVT 1000. In some embodiments, the actual SR can be calculated based at least in part on a target output speed condition or based at least in part on a target input speed condition. In other embodiments, the actual SR of the CVT 1000 can be determined by measuring the tilt angle (γ) of the planet axle 1092. In yet other embodiments, the actual SR of the CVT 1000 can be determined by measuring an actual torque ratio of the CVT 1000. The actual torque ratio of the CVT 1000 can be determined by measuring the torque of, for example the traction rings 1008 and 1010, or any other component indicative of input torque and output torque to the CVT 1000. In some embodiments, the torque indicative of input torque and output torque can be determined by measuring the torque reacted on the first carrier member 1028 and the second carrier member 1030, respectively. Next, the skew-based control process 2000 proceeds to a decision block 2010 where the measured speed ratio is compared to the desired speed ratio set point to thereby form a comparison value. If the measured speed ratio is not equal to the desired speed ratio set point, the skew-based control process 2000 returns to the block 2006. If the measured speed ratio is equal to the desired speed ratio set point, the skew-based control process 2000 proceeds to an end block 2012. The skew-based control process 2000 remains at the end block 2012 until a new speed ratio set point is received. In some embodiments, the skew-based control process 2000 is configured to operate in an open loop manner; in such a case, the blocks 2009 and 2010 are not included in the skew-based control process 2000.

Figure 26:
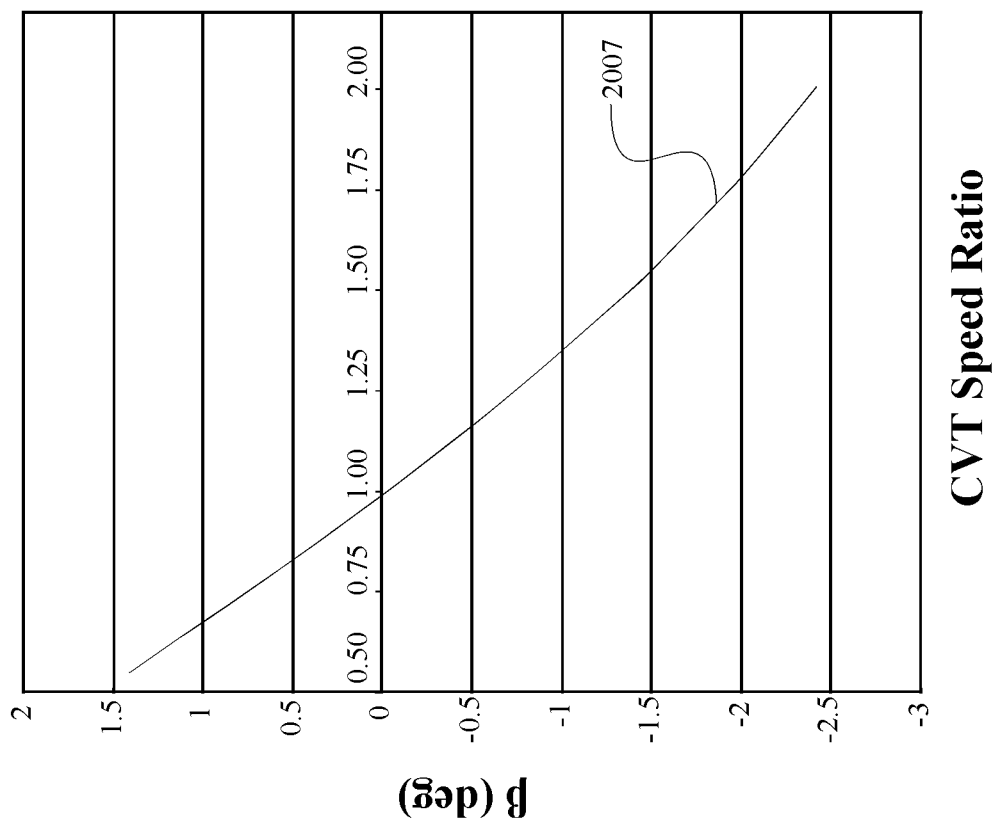
FIG. 26 is a chart representing a look-up table that can be used in a subprocess of the skew-based control process of FIG. 25.

Referring to FIG. 26, in one embodiment the block 2006 can use a look-up table that can be represented by a curve 2007. The curve 2007 depicts an exemplary relationship between the angular rotation (β) and the desired speed ratio of, for example, the CVT 1000. The block 2006 can use the curve 2007 during open loop operation of the skew-based control process 2000. The curve 2007 can be expressed by the equation y=Ax²−Bx+C, where y is the angular rotation (β) and x is the speed ratio. In one embodiment, the values of A, B, and C are 0.5962, 4.1645, and 3.536, respectively. In some embodiments, the values of A, B, and C are 0.5304, 4.0838, and 3.507, respectively. In other embodiments, the values of A, B, and C are related to the dimensions and geometry of the CVT 1000, for example, the position of slot 1050 and 1052 on the carrier members 1028 and 1030, the length of the planet axle 1092, and dimensions of the traction rings 1008 and 1010, among other things. In one embodiment, the block 2006 can be configured to include a well-known PID control process appropriate for closed-loop operation of the skew-based control system 2000. In the closed-loop configuration, the block 2006 determines the angular rotation (β) based at least in part on the comparison (sometimes referred to here as error) between the actual SR and the SR setpoint.

Figure 27:
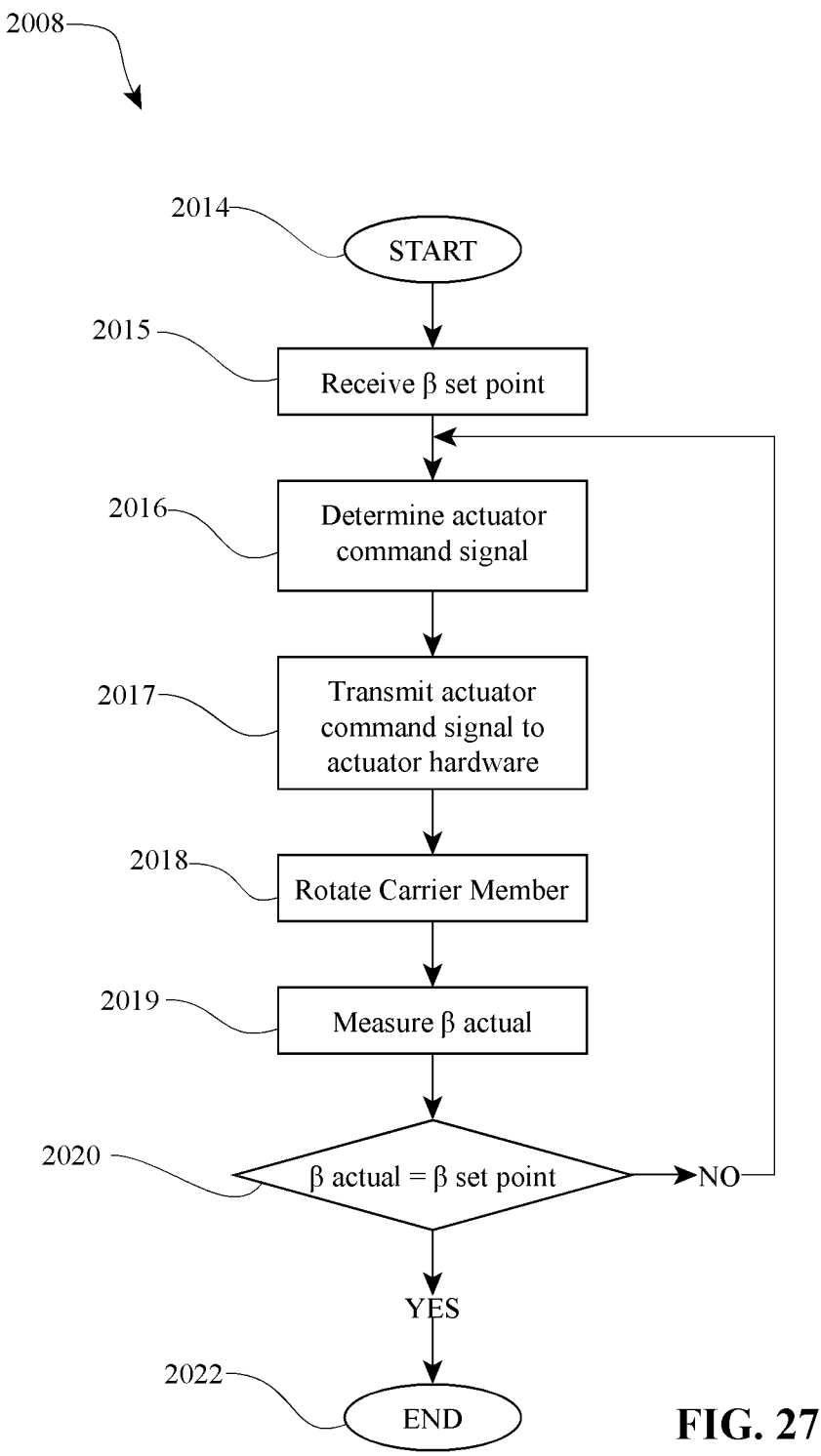
FIG. 27 is a flow chart of an actuator subprocess that can be used with the skew-based control process of FIG. 25.

Referring to FIG. 27, in one embodiment the actuator subprocess 2008 can begin at a block 2014 and proceed to a block 2015 where a set point for the angular rotation (β) is received. The actuator subprocess 2008 proceeds to a block 2016 where an actuator command signal is determined based at least in part on the angular rotation (β). In one embodiment, a look-up table can be used to convert the angular rotation (β) set point to an actuator command signal. In some embodiments, the actuator command signal can be a voltage or a current. In other embodiments, the actuator command signal can be a change in the position of a cable or a linkage. In some embodiments, an algorithm can be used to derive the actuator command signal from the angular rotation (β) set point. Next, the actuator subprocess 2008 proceeds to a block 2017 where the actuator command signal is sent to an actuator and associated hardware. In one embodiment, a standard serial communication protocol can be used to send the command signal to the actuator hardware. In some embodiments, a cable or a linkage can be used to transmit the command signal to the actuator hardware. The actuator subprocess 2008 then passes to a block 2018 where the carrier member, for example the carrier member 1028, is rotated. Next, the actuator subprocess 2008 passes to a block 2019 where the angular rotation (β) is measured. The actuator subprocess 2008 then proceeds to a decision block 2020 where the measured angular rotation (β) is compared to the set point for the angular rotation (β). If the measured angular rotation (β) is not equal to the angular rotation (β) set point, the actuator subprocess 2008 returns to the block 2016. If the measured angular rotation (β) is equal to the angular rotation (β) set point, the actuator subprocess 2008 then ends at a block 2022, wherein the skew-based control process 2000 can continue at block 2009 as described above with reference to FIG. 25. In some embodiments, the actuator subprocess 2008 is configured to operate in an open loop manner; in such a case, the blocks 2019 and 2020 are not included in the subprocess 2008.

Figure 28A:
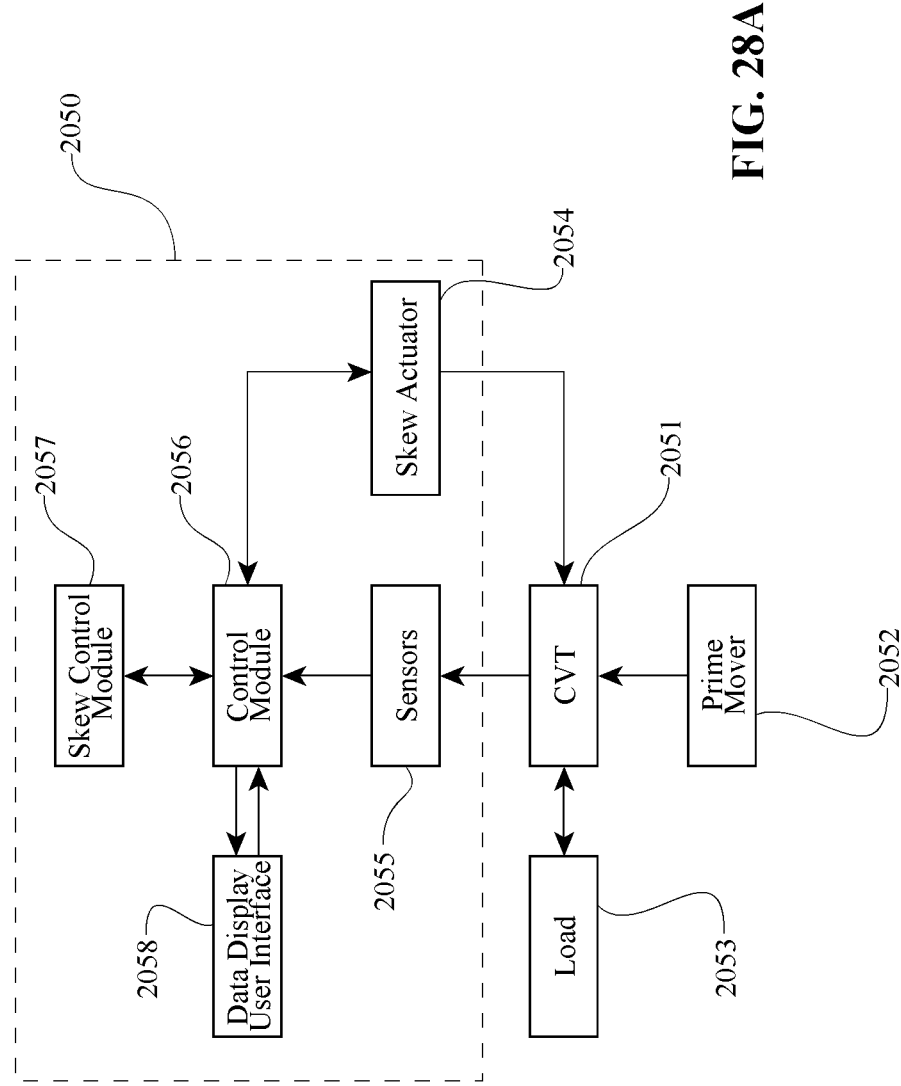
FIG. 28A is a schematic illustration of an inventive embodiment of a skew-based control system.

Passing now to FIG. 28A, in one embodiment a control system 2050 can be configured to control a CVT 2051 coupled to a prime mover 2052 and a load 2053. The CVT 2051 can be configured to accommodate a skew-based control system. In some embodiments, the CVT 2051 is substantially similar to the CVT 12 and/or the CVT 1000. The CVT 2051 can be coupled to a skew actuator 2054. In one embodiment, the skew actuator 2054 can be substantially similar to, for example, the skew actuator 16. In some embodiments, the skew actuator 2054 is a servo actuator. In other embodiments, the skew actuator 2054 can be a mechanical lever (not shown). In yet other embodiments, the skew actuator 2054 can be a hydraulic actuator or an electro-hydraulic actuator (not shown). The control system 2050 can include a number of sensors 2055 in electrical and/or mechanical communication with the CVT 2051, a control module 2056, and a skew control module 2057. In some embodiments, the sensors 2055 can be in communication with the prime mover 2052, the load 2053, and/or the actuator 2054. The sensors 2055 are in communication with the control module 2056. In one embodiment, the control module 2056 is in communication with the skew actuator 2054. The control module 2056 can be configured to communicate with the skew control module 2057. In one embodiment, the skew control module 2057 is configured to perform the skew-based control process 2000. In some embodiments, the control module 2056 is in communication with a data display module 2058 configured to provide a user control interface using one or more displays and/or input devices (not shown).

Those of skill will recognize that the various illustrative logical blocks, modules, circuits, and algorithm steps described in connection with the embodiments disclosed herein, including with reference to the control system 2050 may be implemented as electronic hardware, software stored on a computer readable medium and executable by a processor, or combinations of both. To clearly illustrate this interchangeability of hardware and software, various illustrative components, blocks, modules, circuits, and steps have been described above generally in terms of their functionality.

Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Software associated with such modules may reside in RAM memory, flash memory, ROM memory, EPROM memory, EEPROM memory, registers, a hard disk, a removable disk, a CD-ROM, or any other suitable form of storage medium known in the art. An exemplary storage medium is coupled to the processor such the processor can read information from, and write information to, the storage medium. In the alternative, the storage medium may be integral to the processor. The processor and the storage medium may reside in an ASIC. For example, in one embodiment, the control module 2056 comprises a processor (not shown). The processor of the control module 2056 may also be configured to perform the functions described herein with reference to one or both of the skew control module 2057 and the data display module 2058.

Figure 28B:
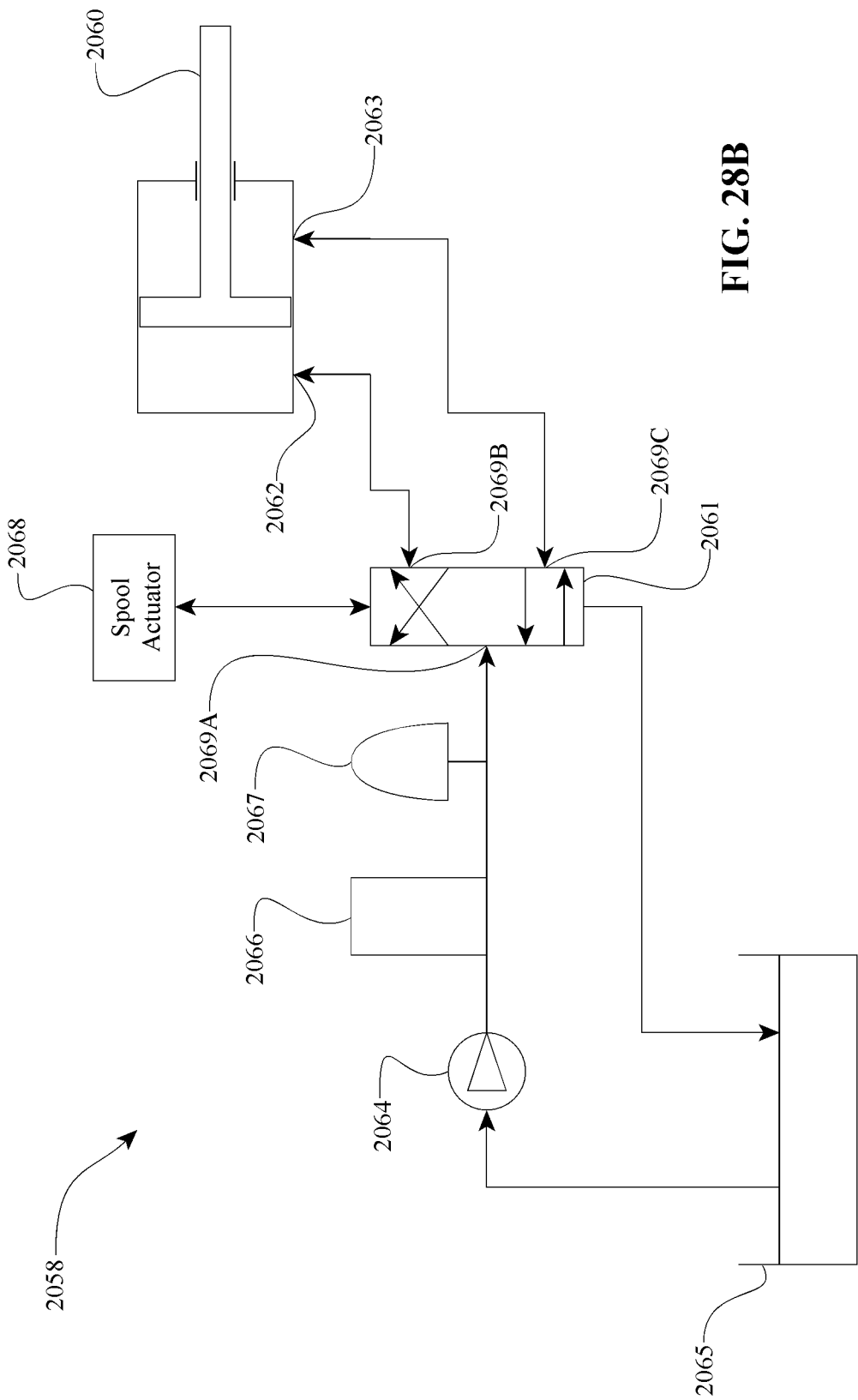
FIG. 28B is a schematic illustration of an inventive embodiment of a skew actuator that can be used with the skew-based control system of FIG. 28A.

Turning to FIG. 28B, in one embodiment the skew actuator 2054 can include a hydraulic piston 2060 in communication with a hydraulic control valve 2061. The hydraulic piston 2060 can be coupled to, for example, the clevis 43. The hydraulic control valve 2061 can provide pressure to ports 2062 and 2063 that can facilitate the movement of the hydraulic piston 2060 to thereby move the clevis 43. The skew actuator 2054 can include a pump 2064 in fluid communication with a reservoir 2065. The pump 2064 can supply pressurized control fluid to a pressure relief valve 2066 and an accumulator 2067 that are adapted to supply pressure control fluid to the hydraulic control valve 2061. In some embodiments, the hydraulic control valve 2061 is a four-way directional control valve that can be in communication with a spool actuator 2068. The spool actuator 2068 can be configured to adjust the hydraulic control valve 2061 based at least in part on a desired skew condition of the CVT 1000, for example. In one embodiment, the spool actuator 2068 can be an electronic servo actuator (not shown). In some embodiments, the spool actuator 2068 can be a manual lever (not shown). In other embodiments, the hydraulic control valve 2061 can be provided with a translatable housing to facilitate an adjustment of the ports 2069 with respect to the internal spool (not shown). The translatable housing can be configured to compensate for steady state errors that may occur during operation of the skew actuator 2054 or during operation of the CVT 1000.

Figure 29A:
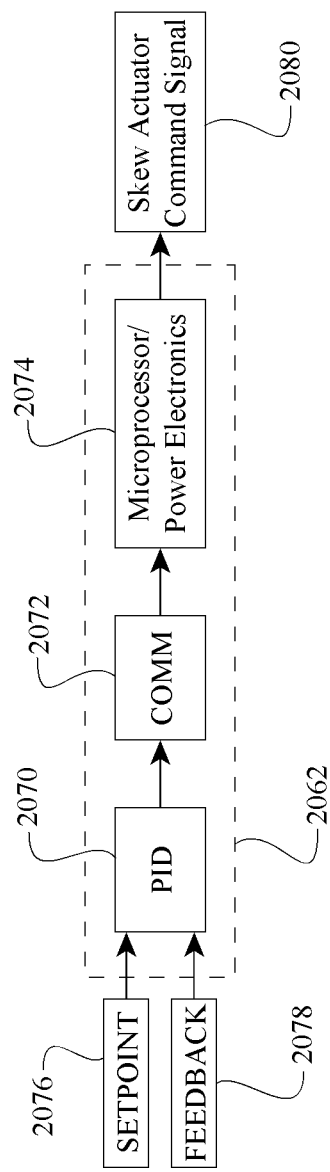
FIG. 29A is a schematic illustration of certain electronic hardware that can be used with the skew-based control system of FIG. 28.

Referring now to FIG. 29A, in one embodiment the control module 2056 includes a control device 2070, a communication device 2072, and a microprocessor 2074. In some embodiments, the control device 2070 can be configured to perform a control process such as a well-known proportional/integral gain control process based on a setpoint signal 2076 and a feedback signal 2078. In one embodiment, the setpoint signal 2076 can be configured to represent a desired input speed. In some embodiments, the setpoint signal 2076 can be configured to represent a desired speed ratio of, for example, the CVT 2051. In other embodiments, the setpoint signal 2076 can be configured to represent a desired output speed, a desired input torque, and/or a desired output torque, or any other desired operating characteristic of the CVT 2051. The feedback signal 2078 can be configured to provide an indication of the current operating condition of the CVT 2051. In one embodiment, the feedback signal 2078 is configured to represent the actual speed of the CVT 2051. In some embodiments, the feedback signal 2078 is configured to represent the actual speed ratio of the CVT 2051. In other embodiments, the feedback signal 2078 is configured to provide an indication of the actual output speed, the actual output torque, and/or the actual input torque of the CVT 2051. The control device 2070 can be configured to cooperate with a communication device 2072. The communication device 2072 can include communication hardware such as serial devices, for example, RS232 devices, USB devices, or other well-known communication hardware. The communication device 2072 can be adapted to cooperate with a microprocessor 2074. The microprocessor 2074 can generate an actuator command signal 2080 based at least in part on the setpoint signal 2076 and/or the feedback signal 2078. In one embodiment, the microprocessor 2074 includes hardware configured to operate power electronics in communication with any one or more of the skew actuator 2054, the CVT 2051, the prime mover 2052, and/or the load 2053.

Figure 29B:
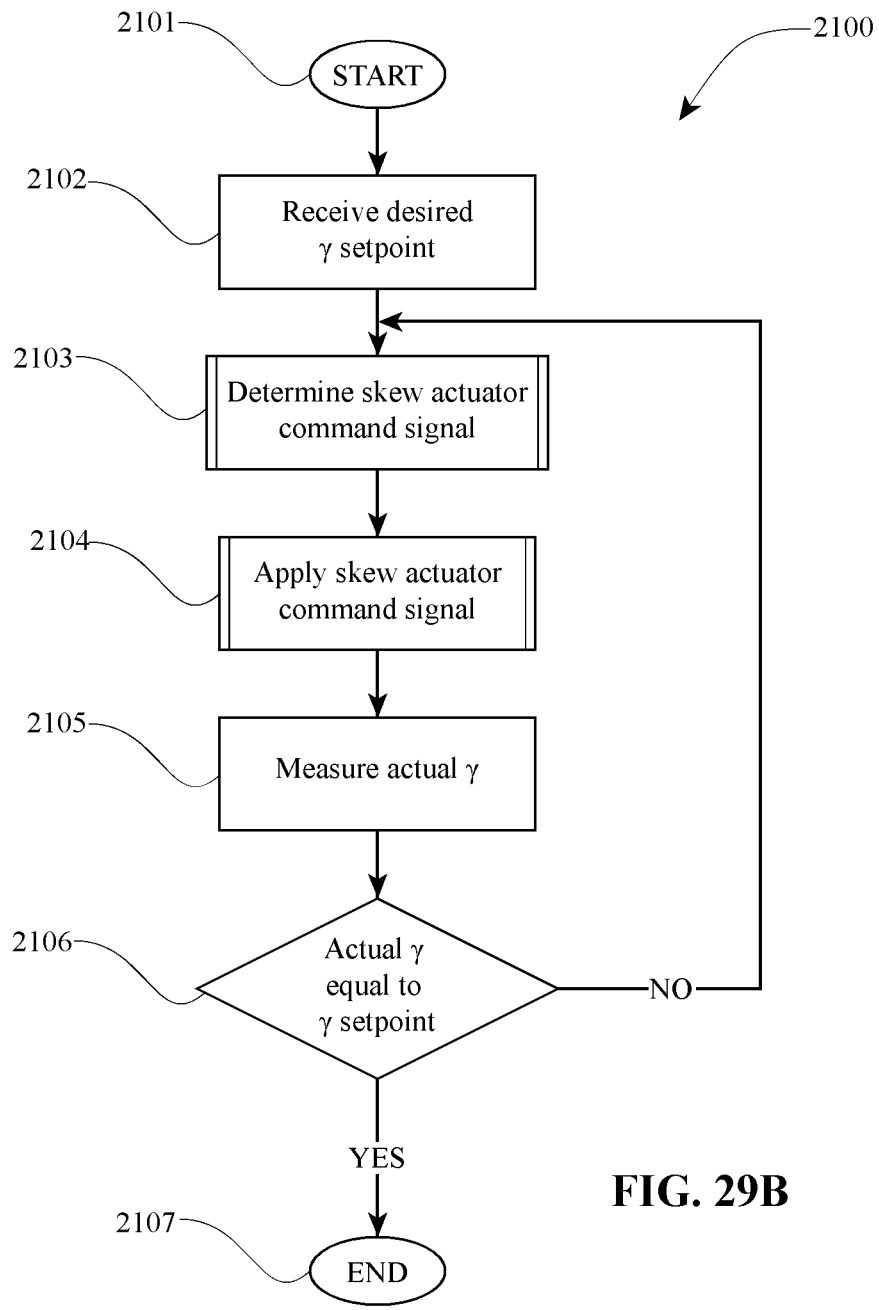
FIG. 29B is a flow chart of a skew-based control process that can be used with the CVT of FIG. 2 or FIG. 15.

Referring now to FIG. 29B, in one embodiment a skew control process 2100 can be implemented on, for example, a microprocessor in communication with power electronics hardware of the CVT 1000. In some embodiments, the skew-based control process 2000 can be implemented on a microprocessor in communication with the CVT 12 or other CVT embodiments described herein. The skew-based control process 2100 begins at a block 2101. The skew-based control process 2100 then proceeds to a block 2102 where a desired tilt angle ($\gamma$) set point for the traction planet assemblies 1024 of the CVT 1000, for example, is received. The skew-based control process 2100 continues to a block 2103 where a command signal for a skew actuator is determined. In one embodiment, the command signal is determined by a well-known gain (sometimes referred to as a "PI" or "PID") control process. Next, the skew-based control process 2100 moves to an actuator subprocess 2104 where the command signal is applied to the skew actuator 2054, for example. Upon completion of the actuator subprocess 2104, the skew-based control process 2100 proceeds to a block 2105 where the tilt angle ($\gamma$) of the traction planet assembly 1024 is measured. In one embodiment, the actual tilt angle ($\gamma$) of the traction planet assembly 1024 can be determined by using a proximity sensor or other device adapted to provide an indication of the actual tilt angle tilt angle ($\gamma$) of the traction planet assemblies 1024. Next, the skew-based control process 2100 proceeds to a decision block 2106 where the measured tilt angle tilt angle ($\gamma$) is compared to the desired tilt angle tilt angle ($\gamma$) set point to thereby form a comparison value. If the measured tilt angle ($\gamma$) is not equal to the desired tilt angle ($\gamma$) set point, the skew-based control process 2100 returns to the block 2103. If the measured tilt angle ($\gamma$) is equal to the desired tilt angle ($\gamma$) set point, the skew-based control process 2100 proceeds to an end block 2107. The skew-based control process 2100 remains at the end block 2107 until a new tilt angle ($\gamma$) set point is received. In some embodiments, the skew-based control process 2100 is configured to operate in an open loop manner; in such a case, the blocks 2105 and 2106 are not included in the skew-based control process 2100.

Figure 29C:
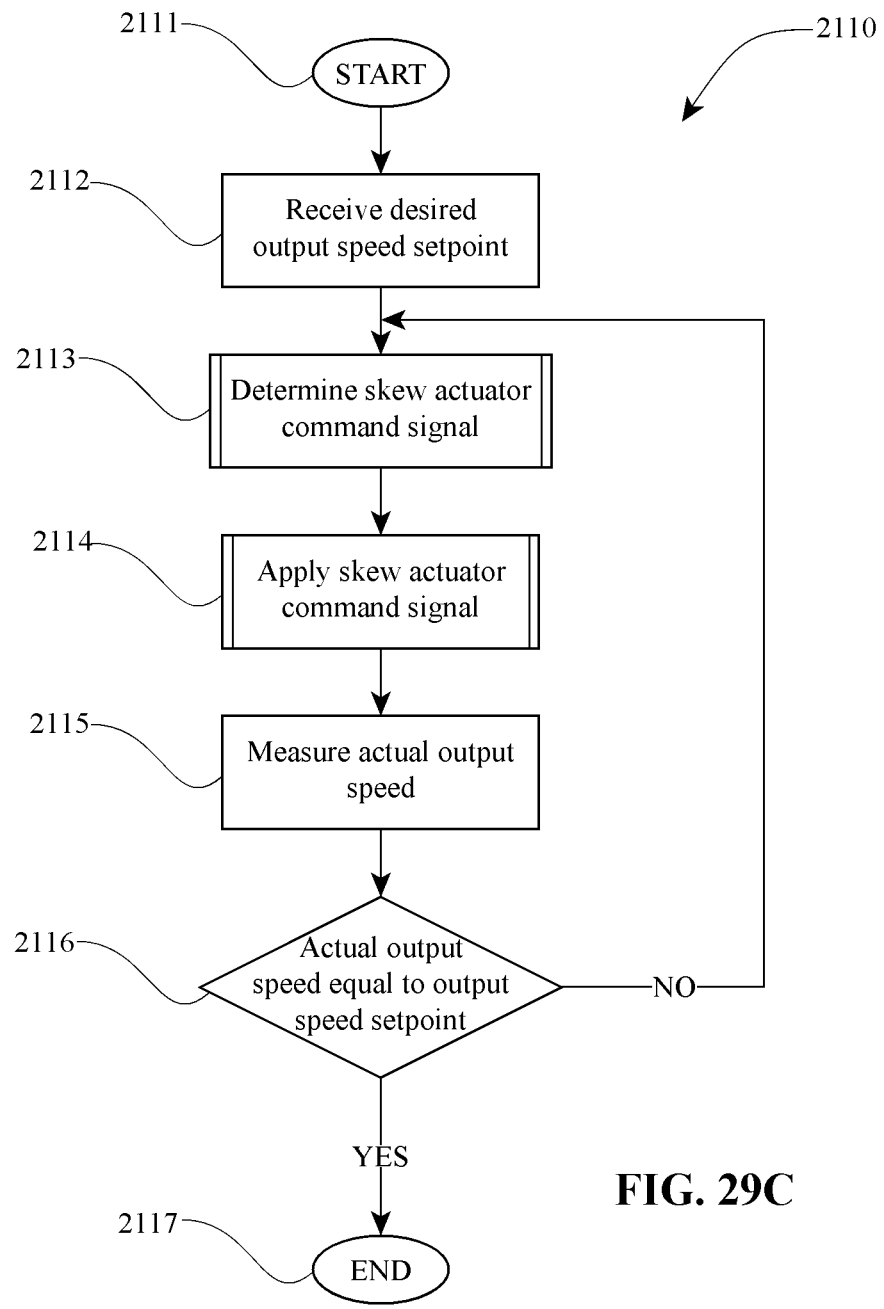
FIG. 29C is another flow chart of a skew-based control process that can be used with the CVT of FIG. 2 or FIG. 15.

Referring now to FIG. 29C, in one embodiment a skew control process 2110 can be implemented on, for example, a microprocessor in communication with power electronics hardware of the CVT 1000. In some embodiments, the skew-based control process 2110 can be implemented on a microprocessor in communication with the CVT 12 or other CVT embodiments described herein. The skew-based control process 2110 begins at a block 2111. The skew-based control process 2110 then proceeds to a block 2112 where a desired output speed set point of the CVT 1000 is received. The skew-based control process 2110 continues to a block 2113 where a command signal for a skew actuator is determined. In one embodiment, the command signal is determined by a well-known PI control process. Next, the skew-based control process 2110 moves to an actuator subprocess 2114 where the command signal is applied to the skew actuator 2054, for example. Upon completion of the actuator subprocess 2114, the skew-based control process 2110 proceeds to a block 2115 where the output speed of the CVT 1000 is measured. In one embodiment, the output speed of the CVT 1000 can be determined by using a speed sensor configured to measure a speed indicative of the output speed of the CVT 1000. Next, the skew-based control process 2110 proceeds to a decision block 2116 where the measured output speed is compared to the desired output speed set point to thereby form a comparison value. If the measured output speed is not equal to the desired output speed set point, the skew-based control process 2110 returns to the block 2113. If the measured output speed is equal to the desired output speed set point, the skew-based control process 2110 proceeds to an end block 2117. The skew-based control process 2110 remains at the end block 2117 until a new output speed set point is received. In some embodiments, the skew-based control process 2110 is configured to operate in an open loop manner; in such a case, the blocks 2115 and 2116 are not included in the skew-based control process 2110.

Figure 29D:
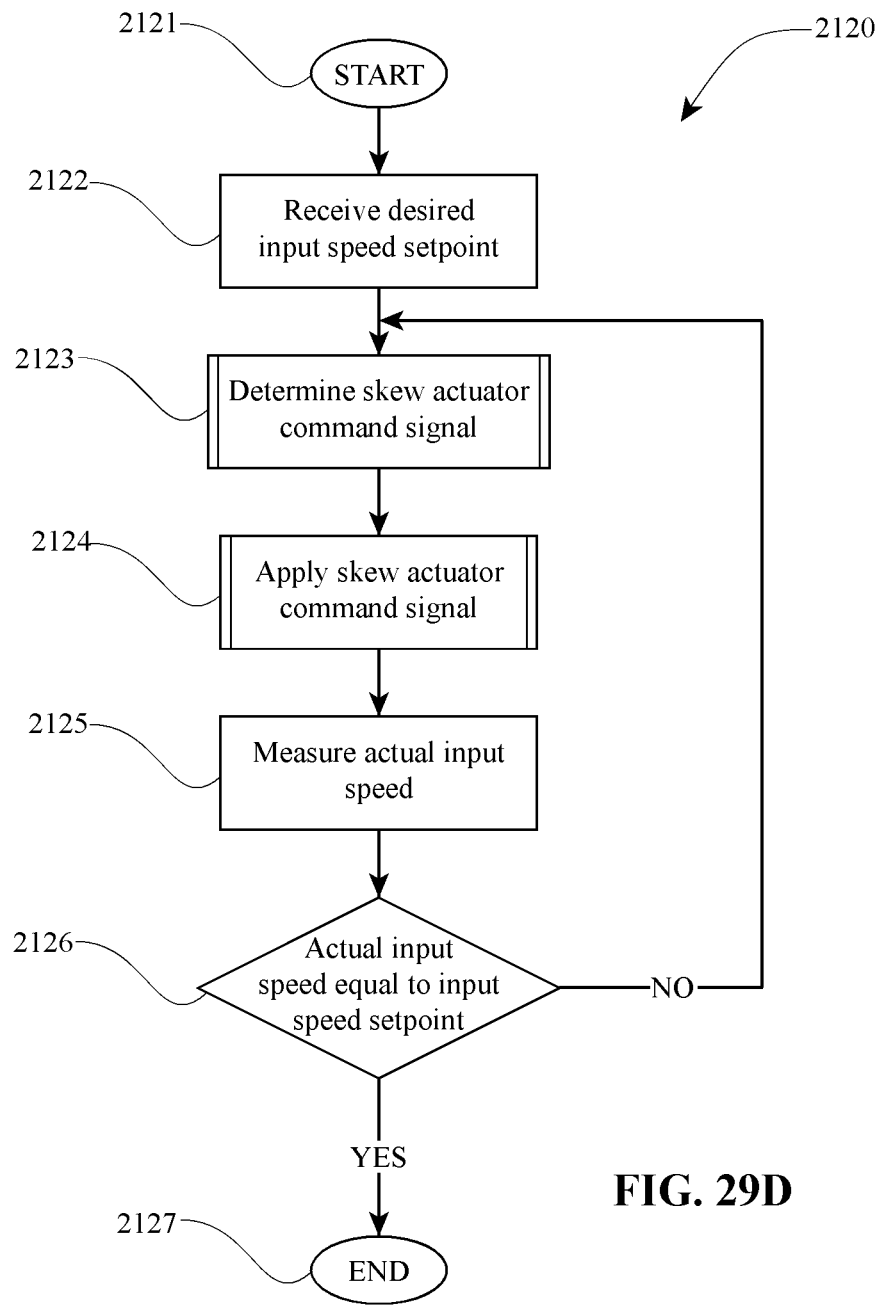
FIG. 29D is yet another flow chart of a skew-based control process that can be used with the CVT of FIG. 2 or FIG. 15.

Referring now to FIG. 29D, in one embodiment a skew control process 2120 can be implemented on, for example, a microprocessor in communication with power electronics hardware of the CVT 1000. In some embodiments, the skew-based control process 2120 can be implemented on a microprocessor in communication with the CVT 12 or other CVT embodiments described herein. The skew-based control process 2120 begins at a block 2121. The skew-based control process 2120 then proceeds to a block 2122 where a desired input speed set point of the CVT 1000 is received. The skew-based control process 2120 continues to a block 2123 where a command signal for a skew actuator is determined. In one embodiment, the command signal is determined by a well-known PI control process. Next, the skew-based control process 2120 moves to an actuator subprocess 2124 where the command signal is applied to the skew actuator 2054, for example. Upon completion of the actuator subprocess 2124, the skew-based control process 2120 proceeds to a block 2125 where the input speed of the CVT 1000 is measured. In one embodiment, the input speed of the CVT 1000 can be determined by using a speed sensor configured to measure a speed indicative of the input speed of the CVT 1000. Next, the skew-based control process 2120 proceeds to a decision block 2126 where the measured input speed is compared to the desired input speed set point to thereby form a comparison value. If the measured input speed is not equal to the desired input speed set point, the skew-based control process 2120 returns to the block 2123. If the measured input speed is equal to the desired input speed set point, the skew-based control process 2120 proceeds to an end block 2127. The skew-based control process 2120 remains at the end block 2127 until a new output speed set point is received. In some embodiments, the skew-based control process 2120 is configured to operate in an open loop manner; in such a case, the blocks 2125 and 2126 are not included in the skew-based control process 2120.

Passing now to FIGS. 30-33, in one embodiment a CVT 3000 can include a first housing member 3002 coupled to a second housing member 3004. The first housing member 3002 can be provided on a first end with a flange 3006. The flange 3006 can facilitate the coupling of the CVT 3000 to, for example, an electric drive motor (not shown). In some embodiments, the CVT 3000 can couple to a crank shaft of an internal combustion engine (not shown). The CVT 3000 can include a skew actuator 3005 coupled to a skew driver 3007. The skew actuator 3005 and the skew driver 3007 can be adapted to facilitate an adjustment in the skew condition and consequently the operating condition of the CVT 3000. In some embodiments, the skew actuator 3005 can be in communication with a skew control system (not shown).

In one embodiment, the CVT 3000 is provided with a main shaft 3008 that can be configured to be substantially aligned with a longitudinal axis 3010 of the CVT 3000. The main shaft 3008 can couple to an input driver 3012 and to a planetary driver 3014. In one embodiment, the main shaft 3008 can be adapted to couple to certain components of a pump 3015. In one embodiment, the pump 3015 is a well known gearotor-type pump. In one instance, the pump 3015 includes an inner gear configured to be driven by the main shaft 3008. The pump 3015 can also include a housing configured to be substantially non-rotatable about the longitudinal axis 3010. The pump 3015 can be configured to provide lubrication to the CVT. In some embodiments, the pump 3015 can be configured to supply a pressurized hydraulic fluid to, for example, a control system on an aircraft. The planetary driver 3014 can be configured to couple to a planetary gear assembly 3016. In one embodiment, the planetary gear assembly 3016 can be a dual pinion planetary gear set having a sun gear, a set of planet gears, a carrier, and a ring gear. In some embodiments, the planetary driver 3014 can be coupled to the carrier of the planetary gear assembly 3016.

Still referring to FIGS. 30-33, in one embodiment the CVT 3000 is provided with a first traction ring 3018 coupled to the input driver 3012. The first traction ring 3018 is in contact with a variator assembly 3020. The CVT 3000 can be provided with a second traction ring 3022 in contact with a variator assembly 3020. The second traction ring 3022 can be coupled to an axial force generator assembly 3024. In one embodiment, the axial force generator assembly 3024 includes a number of rollers configured to cooperate with a number of ramps to produce axial force during operation of the CVT 3000. The axial force generator assembly 3024 can be coupled to a planetary sun driver 3026. The planetary sun driver 3026 can be coupled to the sun gear of the planetary gear assembly 3016. In one embodiment, the planetary gear assembly 3016 can be coupled to an output shaft 3028. In some embodiments, the output shaft 3028 is coupled to the ring gear of the planetary gear assembly 3016.

During operation of the CVT 3000, an input power can be supplied to the CVT 3000 via a coupling to the main shaft 3008. The main shaft 3008 can transfer power to the input driver 3012 and to the planetary driver 3014. The input driver 3012 can be configured to transfer power to the first traction ring 3018 to thereby deliver power to the variator assembly 3020. The variator assembly 3020 transfers power to the second traction ring 3022. The second traction ring 3022 transfers power to the planetary sun driver 3026. In one embodiment, the power delivered to the planetary gear assembly 3016 through the planetary driver 3014 and the planetary sun driver 3026 is transferred out of the CVT 3000 through the output shaft 3028.

Figure 34:
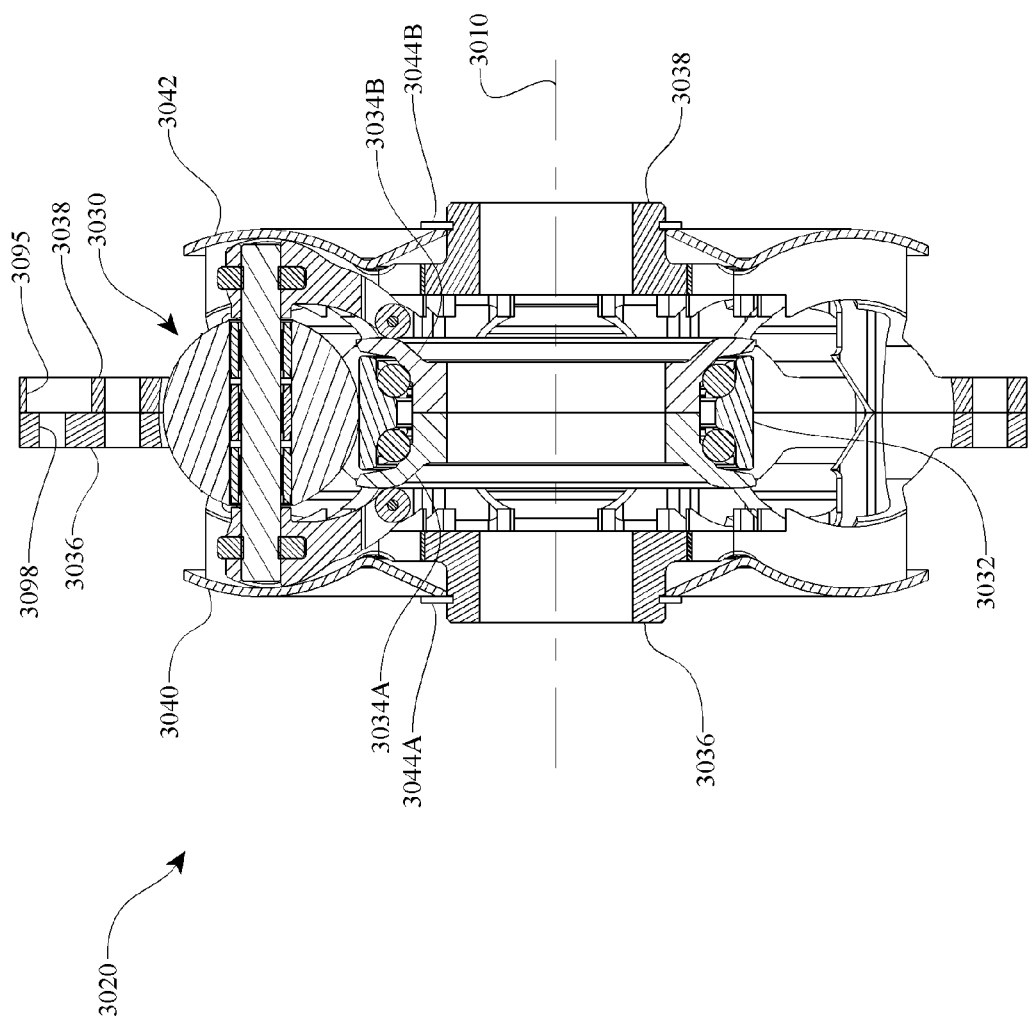
FIG. 34 is a cross-section view of a variator subassembly that can be used with the CVT of FIG. 30.
Figure 35:
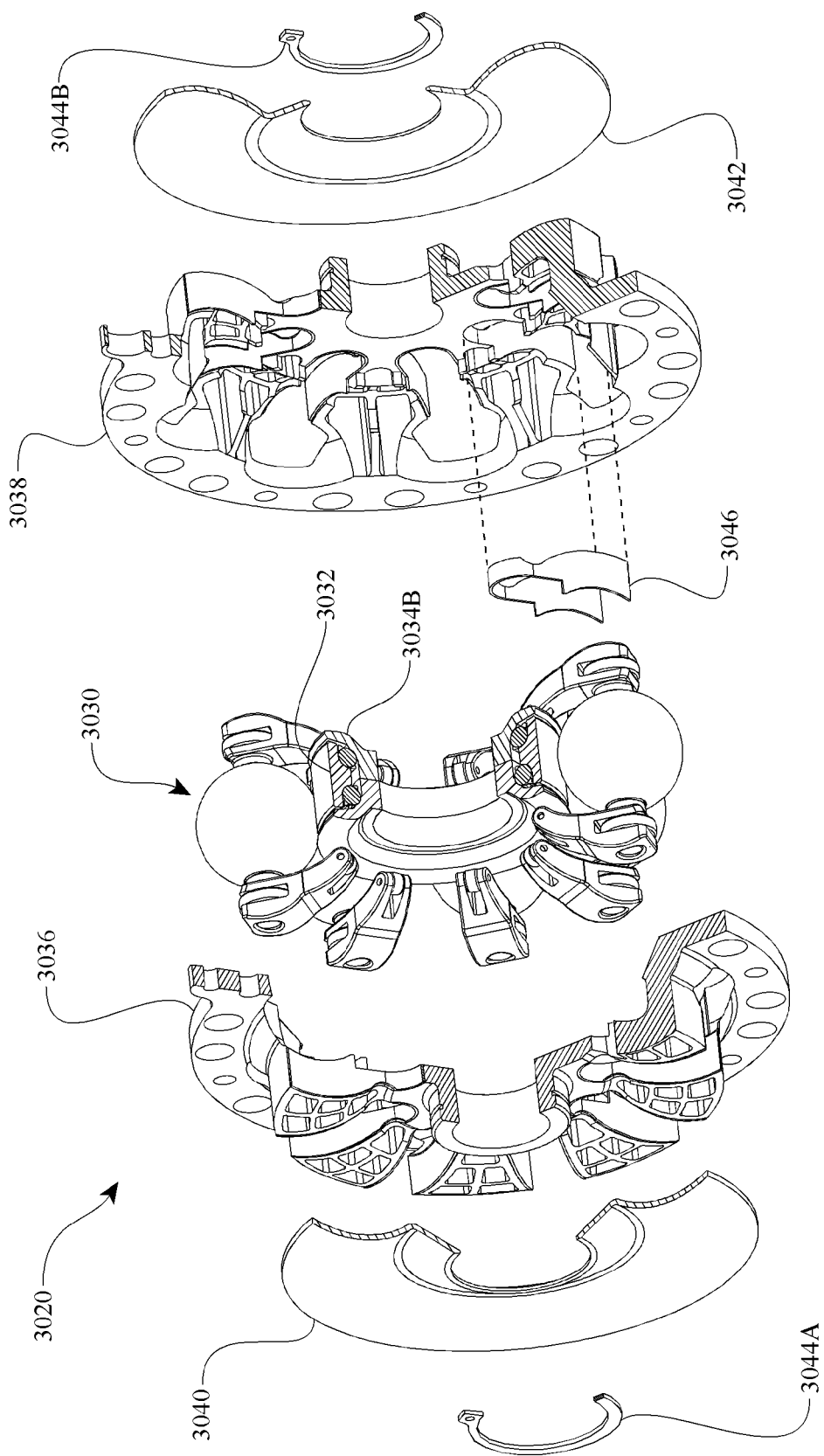
FIG. 35 is an exploded, cross-sectional, perspective view of the variator subassembly of FIG. 34.

Referring now to FIGS. 34 and 35, in one embodiment a variator assembly 3020 includes a number of traction planet assemblies 3030 arranged angularly about the longitudinal axis 3010. Each traction planet assembly 3030 is adapted to contact a traction sun 3032 at a radially inward location. The traction sun 3032 is operably coupled to a set of shift cams 3034. In one embodiment, the traction sun 3032 and the shift cams 3034 are adapted to translate axially along the longitudinal axis 3010 during operation of the CVT 3000. The shift cams 3034 can be configured to couple to each of the traction planet assemblies 3030. In one embodiment, the variator assembly 3020 is provided with a first carrier member 3036 and a second carrier member 3038. The first and second carrier members 3036 and 3038 are configured to support each of the traction planet assemblies 3030. In one embodiment, the second carrier member 3038 is configured to rotate with respect to the first carrier member 3036. The first and second carrier members 3036 and 3038 can be coupled to the skew driver 3007. The first and second carrier members 3036 and 3038 can be coupled to a first carrier cap 3040 and a second carrier cap 3042, respectively. The first and second carrier caps 3040 and 3042 are configured to couple to each of the traction planet assemblies 3030. The first and second carrier caps 3040 and 3042 can be attached to the first and second carrier members 3036 and 3038 with clips 3044.

Referring specifically now to FIG. 35, in one embodiment the variator assembly 3020 is provided with a number of carrier inserts 3046. The carrier inserts 3046 can be adapted to attach to the first and second carrier members 3036 and 3038. Once assembled, the carrier inserts 3046 can contact certain components of the traction planet assemblies 3030. In one embodiment, the carrier inserts 3046 are made of steel and the first and second carrier members 3036, 3038 are made of aluminum. In some embodiments, the carrier inserts 3046 are integral to the first and second carrier members 3036, 3038.

Turning now to FIGS. 36 and 37, in one embodiment the traction planet assembly 3030 includes a substantially spherical traction planet 3048 having a central bore adapted to receive a planet axle 3050. The traction planet 3048 can be coupled to the planet axle 3050 with bearings 3052. The traction planet assembly 3030 can include a first leg 3054 coupled to a first end of the planet axle 3050. The traction planet assembly 3030 can include a second leg 3056 coupled to a second end of the planet axle 3050, wherein the second end of the planet axle is at a distal location from the first end. The first and second legs 3054 and 3056 can each be adapted to receive a reaction roller 3058. In one embodiment, the reaction roller 3058 is received in a slot 3060 provided in each leg 3054, 3056. In one embodiment, the first leg 3054 can be attached to the planet axle 3050 with a press fit or by other suitable rigid coupling method. The roller 3058A can be configured to rotate about the planet axle 3050. In some embodiments, the second leg 3056 can be configured to rotate with respect to the planet axle 3050. The roller 3058B can be attached to the planet axle 3050 with a press fit or by other suitable rigid coupling methods, to thereby axially retain the second leg 3056 on the planet axle 3050. The rollers 3058 are configured to couple to the carrier members 3036 and 3038. In one embodiment, each of the first and second legs 3054 and 3056 are provided with a shift reaction roller 3062. The shift reaction roller 3062 can be received in a slot 3064 formed in each of the first and second legs 3054, 3056. In one embodiment, the slot 3064 is substantially perpendicular to the slot 3060. The shift reaction roller 3062 can be adapted to receive a shift roller axle 3066. The shift roller axle 3066 can be received in a bore 3068. During operation of the CVT 3000, the shift reaction rollers 3062 couple to the shift cams 3034.

Referring still to FIGS. 36 and 37, in one embodiment the first and second legs 3054 and 3056 are provided with a bore 3070 adapted to receive the planet axle 3050. The bore 3070 can be substantially perpendicular to the slot 3060. The first and second legs 3054 and 3056 can be provided with a shoulder 3072. The shoulder 3072 can be substantially aligned with, and extend from, the bore 3070. In one embodiment, the shoulder 3072 is configured to cooperate with the bearings 3052. The first and second legs 3054 and 3056 can be provided with a reaction surface 3074. The reaction surface 3074 can have a curved profile when viewed in the plane of the page of FIG. 37. The reaction surfaces 3074 can be adapted to slidingly engage the carrier caps 3040, 3042.

Passing now to FIG. 38, in one embodiment the carrier insert 3046 can have a substantially u-shaped body 3076. The carrier insert 3046 can have a reaction surface 3078 formed on the interior of the u-shaped body 3076. The reaction surface 3078 is configured to contact the roller 3058 during operation of the CVT 3000. The carrier insert 3046 can have an exterior surface 3080. The exterior surface 3080 is adapted to attach to the first or second carrier member 3036 or 3038.

Figure 40:
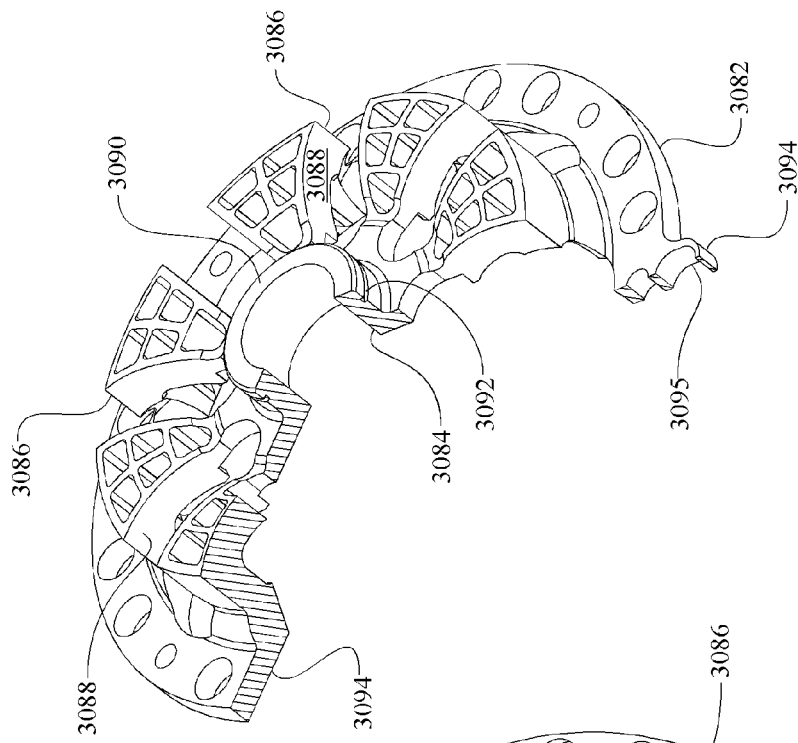
FIG. 40 is a cross-sectional perspective view of the carrier member of FIG. 39.
Figure 39:
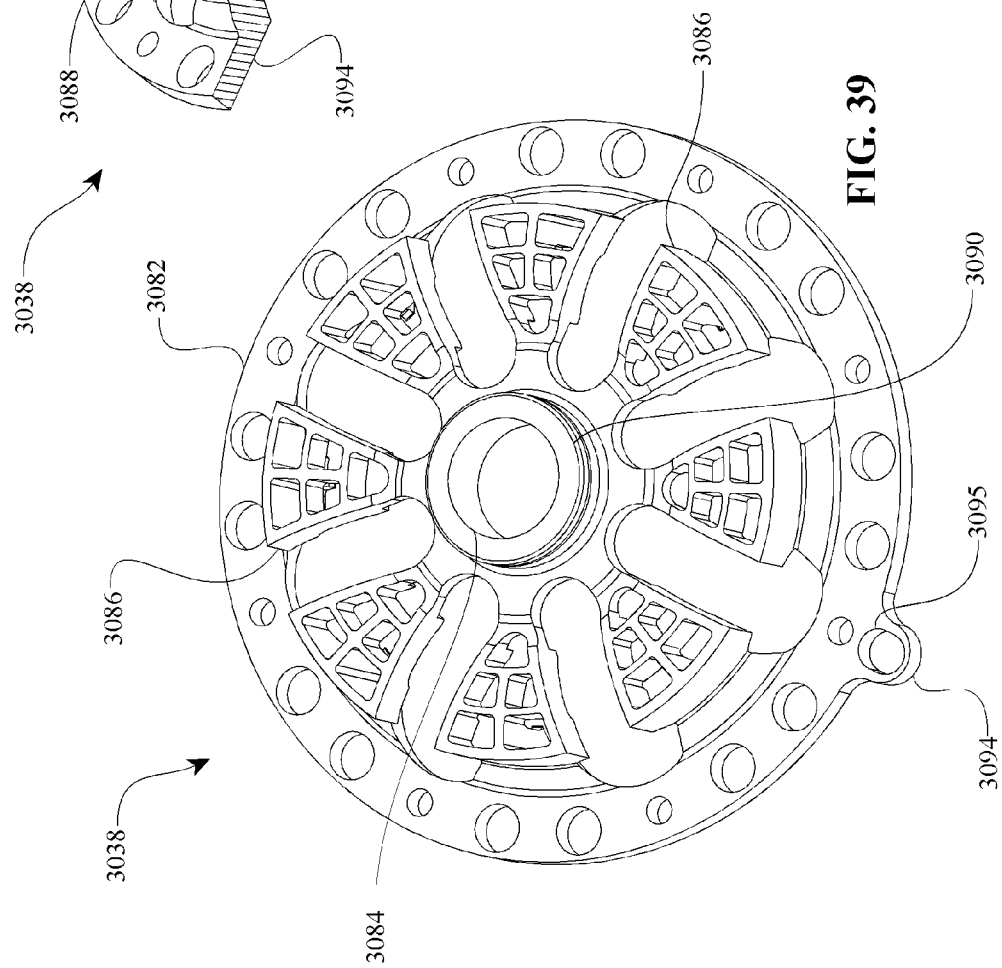
FIG. 39 is a perspective view of a carrier member that can be used with the variator subassembly of FIG. 34.

Referring now to FIGS. 39 and 40, in one embodiment the second carrier member 3038 can be a substantially bowl-shaped body 3082 having a central bore 3084. The bowl-shaped body 3082 can be provided with a number of radial slots 3086 arranged angularly about the central bore 3084. Each of the radial slots 3086 can have skew reaction surfaces 3088 configured to contact the rollers 3058. The second carrier member 3038 can be provided with a shoulder 3090 extending axially from the central bore 3084. The shoulder 3090 can be provided with a groove 3092 adapted to receive the clip 3044. The bowl shaped body 3082 can be provided with a substantially flat face 3094 formed about the outer periphery. The face 3094 can be configured to provide a sliding interface between the first and second carrier members 3036 and 3038. The second carrier member 3038 can be provided with a tab 3094 extending radially from the outer periphery of the bowl-shaped body 3082. The tab 3094 can be provided with an elongated hole 3095. The elongated hole 3095 can be configured to cooperate with the skew driver 3007 to provide a rotation of the second carrier member 3038 with respect to the first carrier member 3036 to thereby adjust the speed ratio during operation of the CVT 3000. In one embodiment, the first housing member 3002 is provided with a cavity 3096 (FIGS. 30 and 31) configured to surround the tab 3094 and facilitate the coupling of the first and second carrier members 3036 and 3038 to the skew driver 3007. In some embodiments, the first carrier member 3036 is substantially similar to the second carrier member 3038. The first carrier member 3036 can be provided with a bore 3098 (FIG. 34). Upon assembly of the CVT 3000, the bore 3098 can be arranged to substantially align with the elongated hole 3095 and can be adapted to cooperate with the skew driver 3007.

Figure 30:
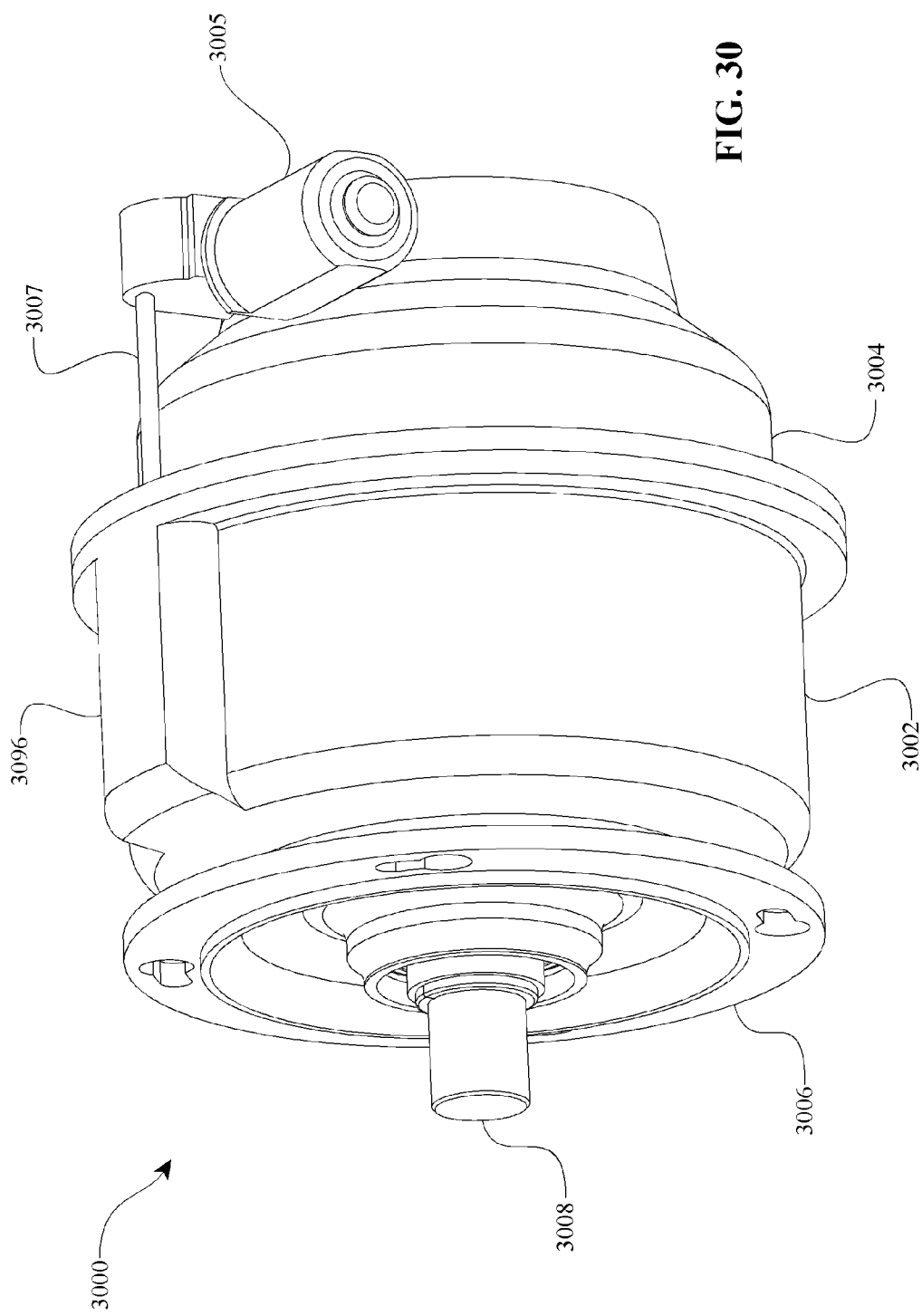
FIG. 30 is a perspective view of an inventive embodiment of a continuously variable transmission (CVT) having a skew-based control system.
Figure 31:
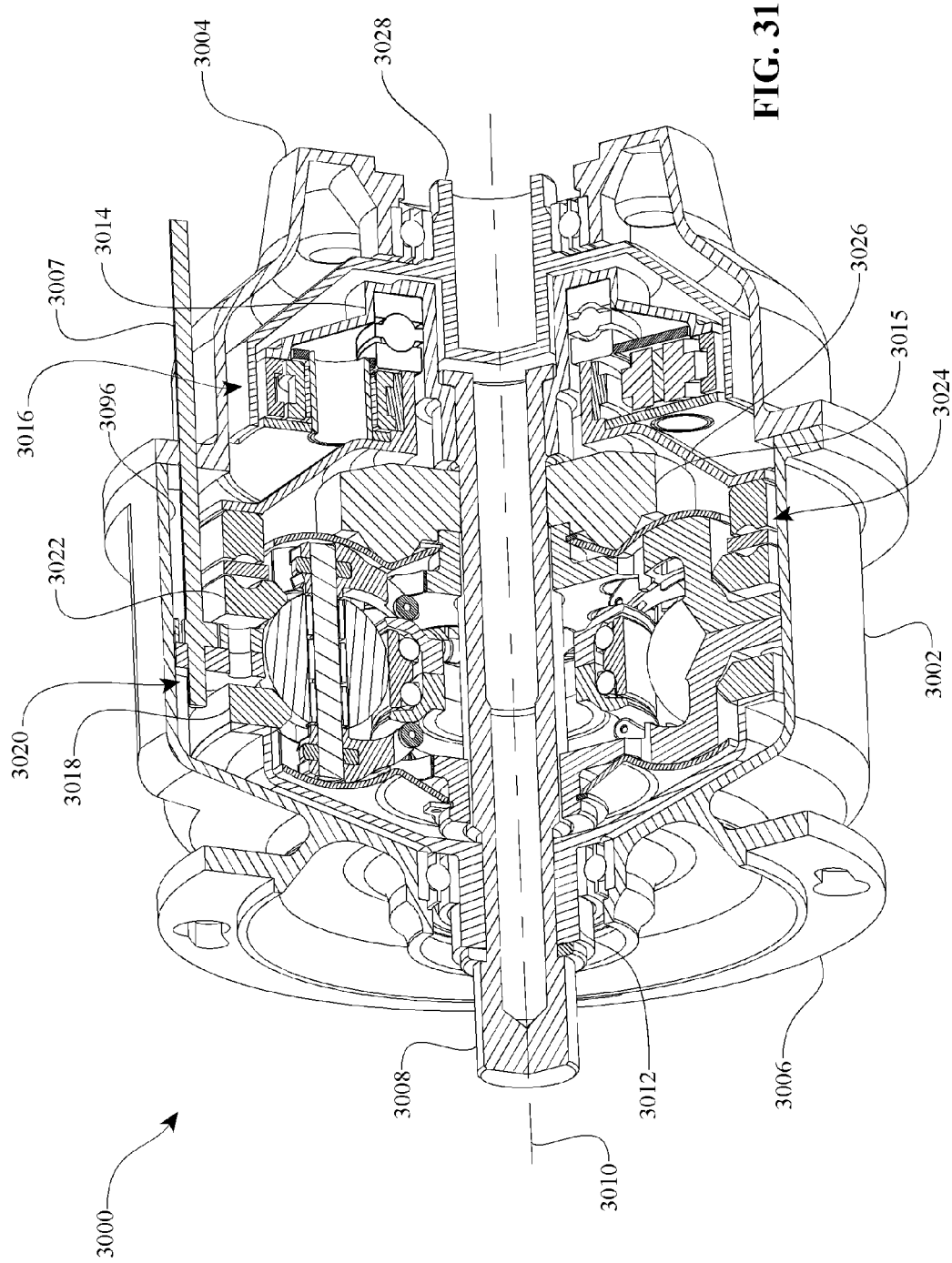
FIG. 31 is a cross-sectional perspective view of the CVT of FIG. 30.
Figure 32:
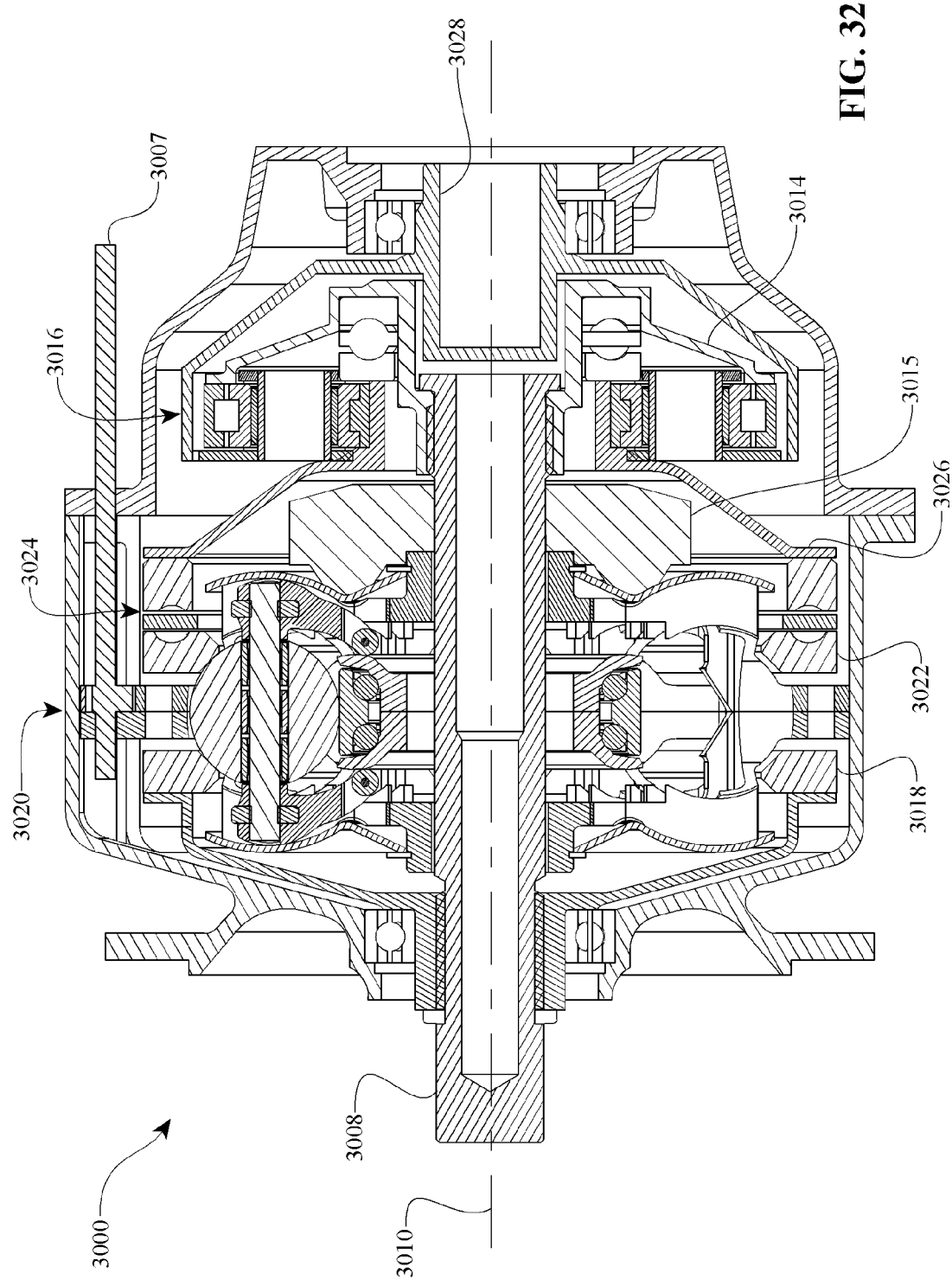
FIG. 32 is a cross-sectional view of the CVT of FIG. 30.
Figure 33:
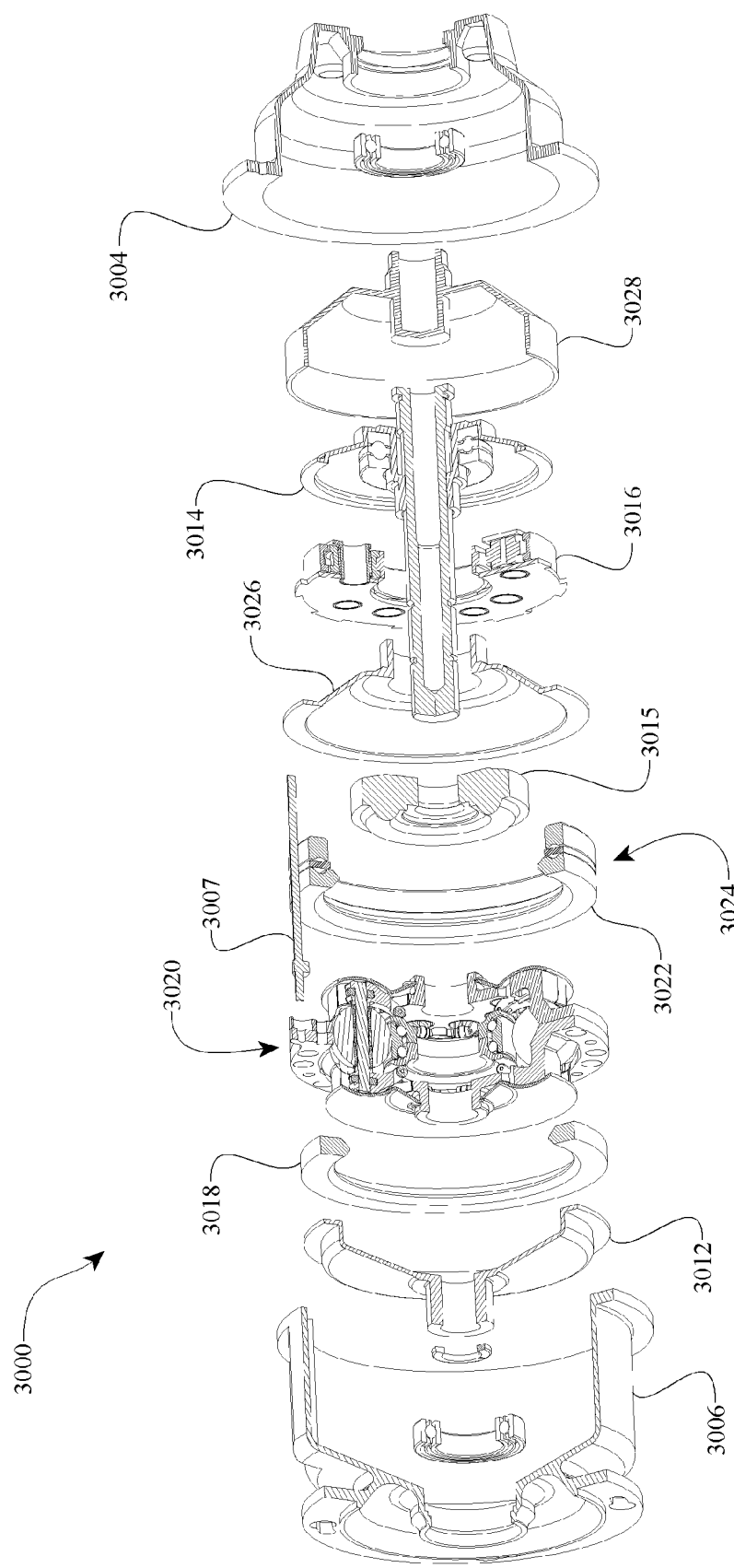
FIG. 33 is an exploded, cross-sectional, perspective view of the CVT of FIG. 30.

Turning now to FIGS. 41 and 42, in one embodiment the skew driver 3007 can be a substantially cylindrical rod 3100 having a first end 3102 and a second end 3104. The first end 3102 can be configured to facilitate the coupling of the skew driver 3007 to the skew actuator 3005 (FIG. 30). In some embodiments, the first end 3102 is provided with a set of threads adapted to couple to the skew actuator 3005. In other embodiments, the first end 3102 is provided with a spline configured to couple to the skew actuator 3005. The second end 3104 can be adapted to couple to the first carrier member 3036. In some embodiments, the second end 3104 is configured to rotate in the bore 3098 of the first carrier member 3036. The skew driver 3007 can be provided with an eccentric skew cam 3106 formed in proximity to the second end 3104. The eccentric skew cam 3106 can be arranged to have a center 3108 that is radially offset from a center 3110 of the cylindrical rod 3100. The eccentric skew cam 3106 can be configured to couple to the elongated hole 3095 of the second carrier member 3038 (FIG. 39). The eccentric skew cam 3106 is configured to slidingly engage the elongated hole 3095.

During operation of the CVT 3000, the skew driver 3007 can be rotated by the skew actuator 3007. The rotation of the skew driver 3007 tends to motivate a rotation of the second carrier member 3038 with respect to the first carrier member 3036. The rotation of the second carrier member 3038 with respect to the first carrier member 3036 induces a skew condition on each of the traction planet assemblies 3030. The skew condition tends to motivate a tilt in the planet axles 3050 of the traction planet assemblies 3030. The tilting of the planet axles 3050 adjusts the speed ratio of the CVT 3000.

Figure 43:
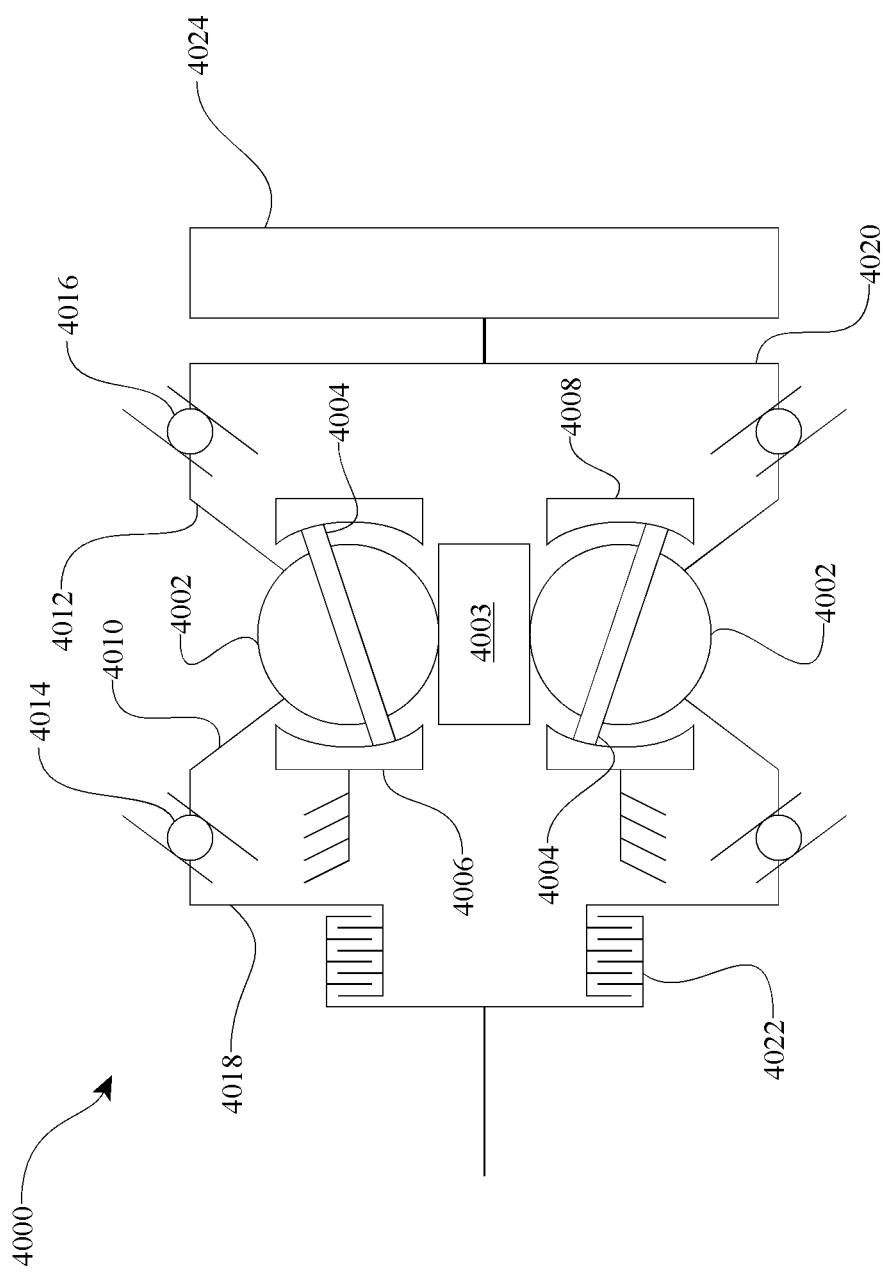
FIG. 43 is a schematic illustration of an inventive embodiment of a continuously variable transmission (CVT) having a skew-based control system.

Passing now to FIG. 43, in one embodiment a CVT 4000 can include a number of traction planets 4002 arranged angularly about a longitudinal axis. The CVT 4000 can be provided with a traction sun 4003 configured to contact each traction planet 4002 at a radially inward location. Each of the traction planets 4002 can be provided with a tiltable axis of rotation 4004 configured to be supported by first and second carrier members 4006 and 4008. In some embodiments, the first and second carrier members 4006 and 4008 are adapted to facilitate a skew condition on each of the traction planets 4002. In one embodiment, the first carrier member 4006 is substantially non-rotatable about the longitudinal axis of the CVT 4000. The CVT 4000 can include first and second traction rings 4010, 4012 in contact with each of the traction planets 4002. The first and second traction rings 4010, 4012 can be coupled to first and second axial force generators 4014, 4016, respectively. The first axial force generator 4014 can be coupled to an input driver 4018. The second axial force generator 4016 can be coupled to an output shaft 4020. In one embodiment, the input driver 4018 is coupled to a clutch 4022. The clutch 4022 can be adapted to receive an input power from, for example, an electric motor or other suitable prime mover.

During operation of the CVT 4000, the input power can be transferred from the clutch 4022 to the input driver 4018. The input driver 4018 delivers power to the first traction ring 4010 through the first axial force generator 4014. The first traction ring 4010 transfers power to each of the traction planets 4002. The traction planets 4002 transfer power to the second traction ring 4012. The power is delivered from the second traction ring 4012 to the output shaft 4020 via the second axial force generator 4016. In some embodiments, the output shaft 4020 is configured to supply power to a load 4024.

Figure 44:
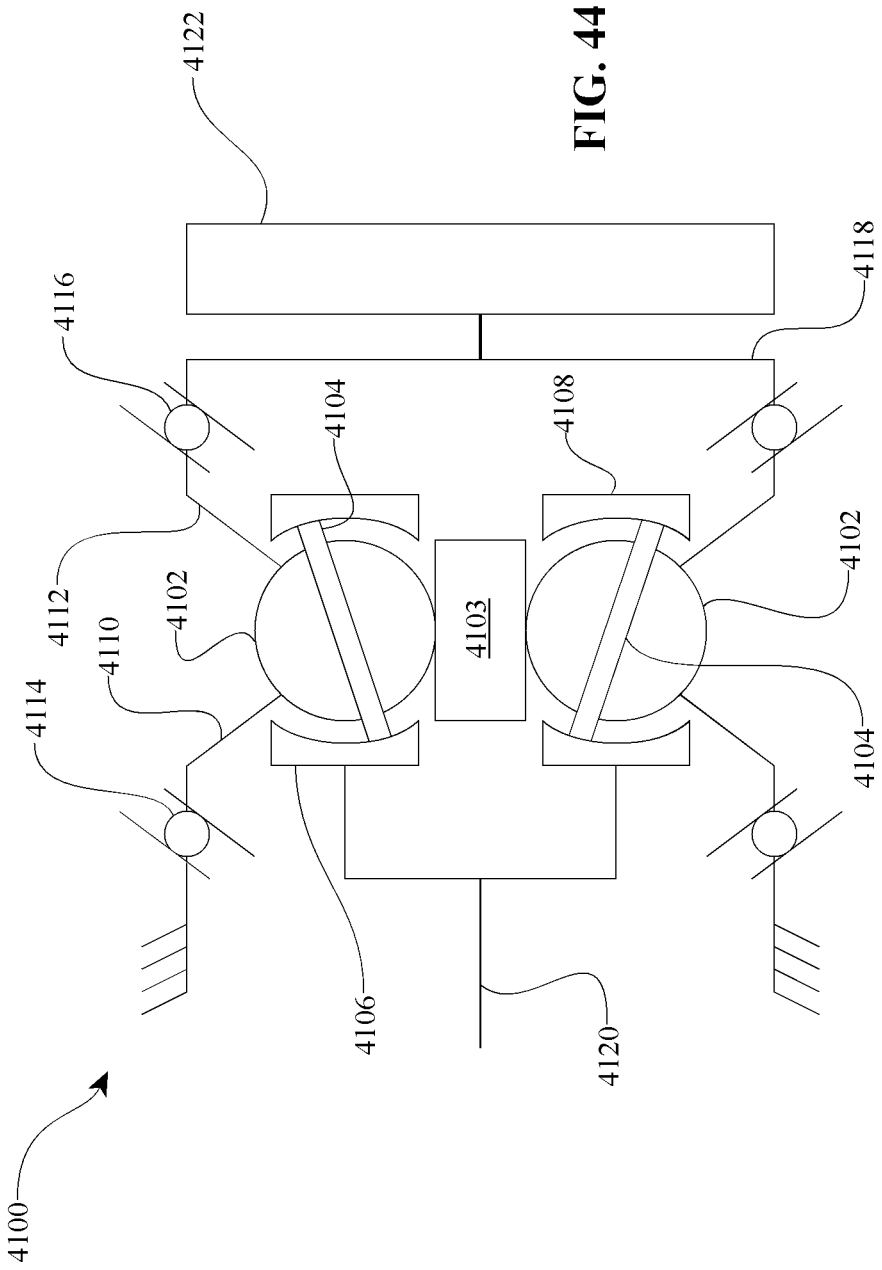
FIG. 44 is a schematic illustration of another inventive embodiment of a continuously variable transmission (CVT) having a skew-based control system.
Figure 45:
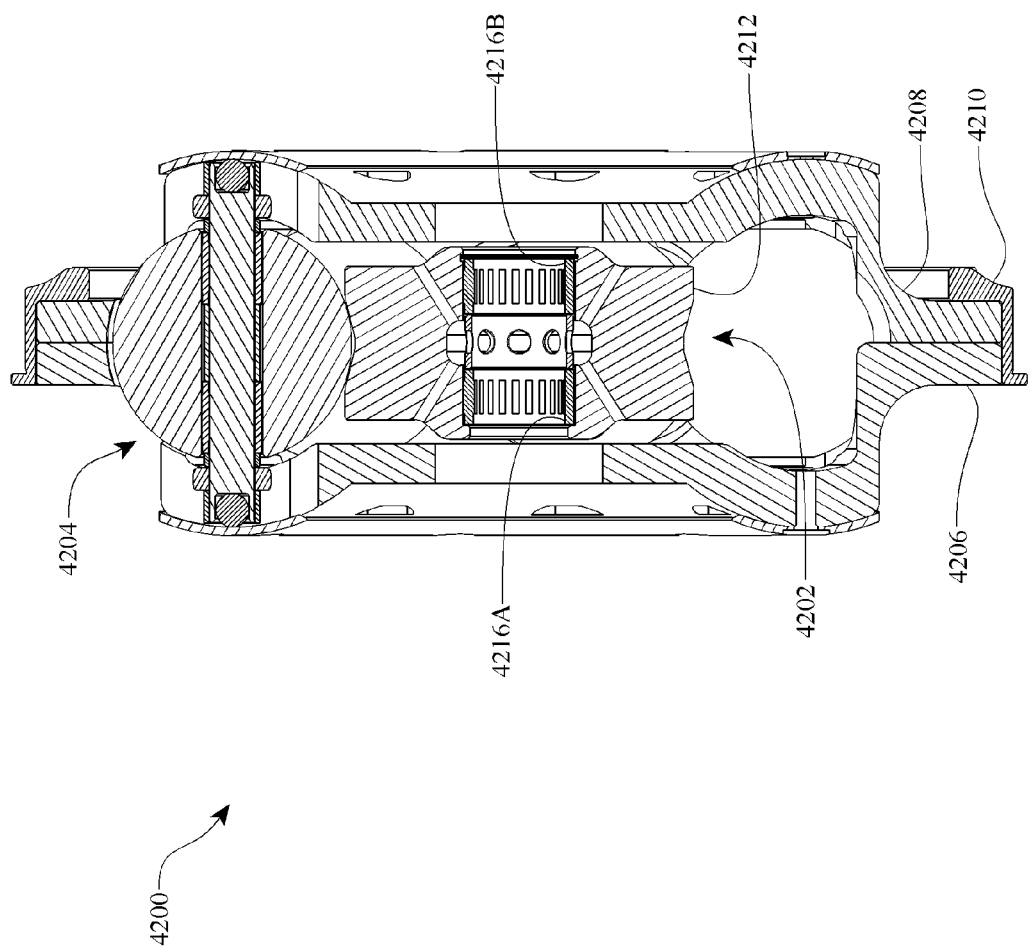
FIG. 45 is a cross-sectional view of an embodiment of a variator.

Turning now to FIG. 44, in one embodiment a CVT 4100 can include a number of traction planets 4102 arranged angularly about a longitudinal axis. The CVT 4100 can be provided with a traction sun 4103 configured to contact each traction planet 4102 at a radially inward location. Each of the traction planets 4102 can be provided with a tiltable axis of rotation 4104. The traction planets 4102 can be adapted to couple to first and second carrier members 4106 and 4108 respectively. In one embodiment, the first and second carrier members 4106 and 4108 are configured to facilitate a skew condition on each of the traction planets 4102. In one embodiment, the first and second carrier members 4106 and 4108 are configured to rotate about the longitudinal axis of the CVT 4100. The CVT 4100 can include first and second traction rings 4110 and 4112, respectively. The first and second traction rings 4110 and 4112 can be coupled to first and second axial force generators 4114 and 4116, respectively. In one embodiment, the first axial force generator 4114 is configured to be substantially non-rotatable with respect to the longitudinal axis of the CVT 4100. The second axial force generator 4116 can be coupled to an output shaft 4118.

During operation of the CVT 4100, the first carrier member 4106 can be adapted to receive a power from an input shaft 4120. The first carrier member 4106 delivers the power to each of the traction planets 4102. The traction planets 4102 orbit the traction sun 4103 and transfer power to the second traction ring 4112. The power is transferred from the second traction 4112 to the output shaft via the second axial force generator 4116. The output shaft 4118 is adapted to supply power to a load 4122.

Passing now to FIGS. 45-48, in one embodiment a variator 4200 can include a traction sun assembly 4202 coupled to a number of traction planet subassemblies 4204. The variator 4200 can be configured to be used in, for example, the CVT 12, the CVT 1000, or the CVT 3000. Each of the traction planet subassemblies 4204 are operably coupled to a first carrier member 4206 and a second carrier member 4208. In some embodiments, a carrier retaining ring 4210 can attach to the first and second carrier members 4206 and 4208. The traction sun subassembly 4204 can include a traction sun 4212. The traction sun 4212 can have a central bore 4214 adapted to receive bearings 4216. The central bore 4214 can be provided with a shoulder 4218 and a c-clip groove 4220 to facilitate the coupling of the bearings 4216 to the central bore 4214. The traction sun 4212 can be provided with a number of lubricant passages 4222 extending radially outward from the central bore 4214. In one embodiment, an outer periphery of the traction sun 4214 is provided with first and second contact surfaces 4224A and 4224B extending from a valley 4226. The first and second contact surfaces 4224A and 4224B can contact each of the traction planet subassemblies 4204. The first and second contact surfaces 4224A and 4224B can extend from the valley 4226 at an angle 4228 when viewed in cross-section in the plane of FIG. 48. In one embodiment, the angle 4228 is in the range of about 2 degrees to 45 degrees. In a preferred embodiment, the angle 4228 is about 5 degrees to 10 degrees. During operation of the variator 4200, the traction sun assembly 4202 is adapted to remain axially coupled to the traction planet subassemblies 4204 as the traction planet subassemblies 4204 tilt. In some embodiments, the bearings 4216 may be removed so that the sun assembly 4202 is no longer coupled to the central bore 4214, but remains radially coupled to the CVT 1000, for example, by contacting the traction planet assemblies 4204 through the contact surfaces 4224.

Turning now to FIGS. 49-51, in one embodiment a gear 5000 can be coupled to a first carrier member 5002 and to a second carrier member 5004. The gear 5000 can facilitate a rotation about a longitudinal axis between the first and second carrier members 5002, 5004. The gear 5000 can be provided with a shaft 5006. The shaft 5006 can extend radially outward from the first and second carrier members 5002, 5004. The shaft 5006 can be configured to couple to a skew actuator (not shown). In some embodiments, the gear 5000 can be a conical gear and the first and second carrier member 5002, 5004 can be adapted to accommodate the conical gear appropriately. During operation, the skew actuator can transmit a rotation to the shaft 5006 to thereby turn the gear 5000. The turning of the gear 5000 tends to rotate the first carrier member 5002 in a first rotational direction and tends to rotate the second carrier member 5004 in a second rotational direction substantially opposite to that of the first rotational direction.

Referring specifically now to FIGS. 50 and 51, in one embodiment a skew driver 5010 can be coupled to a first carrier member 5012 and to a second carrier member 5014. The first and second carrier members 5012, 5014 can be substantially similar to the first and second carrier members 5002, 5004. The first carrier member 5012 can be provided with threads to engage the skew driver 5010 at a first threaded interface 5016. The second carrier member 5014 can be provided with threads to engage to the skew driver 5010 at a second threaded interface 5018. The first threaded interface 5018 is typically a right-handed thread, while the second threaded interface 5018 is a left-handed thread. In one embodiment, the skew driver 5010 can be coupled to a skew actuator (not shown). In some embodiments, the skew driver 5010 is positioned to be tangent to the first and second carrier members 5012, 5014. During operation, the skew driver 5010 can be rotated to thereby induce a relative rotation between the first and second carrier members 5012, 5014. The threaded interfaces 5016 and 5018 can be adapted to accommodate a small radial displacement to facilitate the rotation of the first and second carrier member 5012, 5014 with respect to each other.

Referring specifically now to FIG. 52, in one embodiment a gear 5020 can be coupled to a first carrier member 5022 and to a second carrier member 5024. For clarity, the gear 5020 is shown in FIG. 52 without well-known gear teeth. The gear 5020 can facilitate a rotation about a longitudinal axis between the first and second carrier members 5022, 5024. The gear 5020 can be provided with a shaft 5026. The shaft 5026 can be configured to couple to a skew actuator (not shown). In one embodiment, the shaft 5026 extends axially from the gear 5020. The first carrier member 5022 can be provided with an engagement extension 5028 adapted to contact the gear 5020. During operation, the skew actuator can transmit a rotation to the shaft 5026 to thereby turn the gear 5020. The turning of the gear 5020 tends to rotate the first carrier member 5022 in a first rotational direction and tends to rotate the second carrier member 5024 is a second rotational direction substantially opposite to that of the first rotational direction.

It should be noted that the description above has provided dimensions for certain components or subassemblies. The mentioned dimensions, or ranges of dimensions, are provided in order to comply as best as possible with certain legal requirements, such as best mode. However, the scope of the inventions described herein are to be determined solely by the language of the claims, and consequently, none of the mentioned dimensions is to be considered limiting on the inventive embodiments, except in so far as anyone claim makes a specified dimension, or range of thereof, a feature of the claim.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

What we claim is:

1. A skew actuator for a continuously variable accessory drive (CVAD) having a skew control system, the skew actuator comprising:

a hydraulic piston coupled to the CVAD, the hydraulic piston operably coupled to a first carrier member of the CVAD, the first carrier member comprising a plurality of radially offset slots formed in the first carrier member and arranged angularly about a longitudinal axis of the CVAD;

a hydraulic control valve in fluid communication with the hydraulic piston; and a spool actuator coupled to the hydraulic control valve, the spool actuator configured to adjust the hydraulic control valve based at least in part on a desired skew condition of the CVT.

2. The skew actuator of claim 1, wherein the hydraulic control valve comprises a housing and a spool, the housing configured to translate with respect to the spool.

3. The skew actuator of claim 1, further comprising a pump in fluid communication with the hydraulic control valve.

4. The skew actuator of claim 3, further comprising an accumulator in fluid communication with the pump.

5. The skew actuator of claim 1, wherein the hydraulic control valve is a four-way directional control valve.

6. A skew control system for a continuously variable accessory drive (CVAD) having a plurality of traction planets, the skew control system comprising:

a sensor configured to receive data from the CVAD;

a skew actuator configured to communicate with a control module, the skew actuator further configured to apply a skew condition to each of the traction planets in a CVAD, wherein the skew actuator is operably coupled to a first carrier member of the CVAD, the first carrier member comprising a plurality of radially offset slots formed in the first carrier member and arranged angularly about a longitudinal axis of the CVAD;

a skew controller in communication with the control module, the skew controller configured to determine a skew actuator command signal based at least in part on a signal from the sensor, wherein the skew actuator command signal is configured to control an output speed of the CVAD.

7. The skew control system of claim 6, wherein the sensor is configured to communicate with an accessory device.

8. The skew control system of claim 6, wherein the skew actuator comprises a servo motor.

9. The skew control system of claim 6, wherein the skew actuator comprises a hydraulic control valve.

10. The skew control system of claim 9, wherein the hydraulic control valve is a four-way directional control valve.

11. The skew control system of claim 6, wherein the skew actuator comprises a lever.

12. A method of assembling a device for modulating power to an accessory device, the method comprising the steps of:

providing a continuously variable transmission (CVT) having a plurality of traction planets arranged angularly about a longitudinal axis, the CVT having a skew-based control system adapted to apply a skew condition to each of the traction planets;

providing a skew actuator coupled to the CVT, wherein the skew actuator is operably coupled to a first carrier member of the CVT, the first carrier member comprising a plurality of radially offset slots formed in the first carrier member and arranged angularly about a longitudinal axis of the CVT;

configuring the skew actuator to communicate with a skew controller, wherein the skew controller is adapted to control a speed ratio of the CVT or the speed of the accessory device; and operably coupling the CVT to the accessory device.

13. The method of claim 12, wherein operably coupling the CVT to the accessory device comprises coupling a main shaft of the CVT to a driven shaft of the accessory device.

14. The method of claim 12, further comprising the step of operably coupling the CVT to a prime mover.

* * * * *